(12) United States Patent
Ahn et al.

(10) Patent No.: US 12,127,123 B2
(45) Date of Patent: *Oct. 22, 2024

(54) WIRELESS COMMUNICATION METHOD USING WAKE-UP RADIO AND WIRELESS COMMUNICATION TERMINAL THEREFOR

(71) Applicant: WILUS INSTITUTE OF STANDARDS AND TECHNOLOGY INC., Gyeonggi-do (KR)

(72) Inventors: Woojin Ahn, Gyeonggi-do (KR); Juhyung Son, Gyeonggi-do (KR); Jinsam Kwak, Gyeonggi-do (KR)

(73) Assignee: WILUS INSTITUTE OF STANDARDS AND TECHNOLOGY INC., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/119,834

(22) Filed: Mar. 10, 2023

(65) Prior Publication Data

US 2023/0217371 A1 Jul. 6, 2023

Related U.S. Application Data

(63) Continuation of application No. 16/977,795, filed as application No. PCT/KR2019/002478 on Mar. 4, 2019, now Pat. No. 11,632,719.

(30) Foreign Application Priority Data

Mar. 3, 2018 (KR) .......................... 10-2018-0025505
Mar. 6, 2018 (KR) .......................... 10-2018-0026502
(Continued)

(51) Int. Cl.
*H04W 52/02* (2009.01)
*H04W 84/12* (2009.01)

(52) U.S. Cl.
CPC ... *H04W 52/0229* (2013.01); *H04W 52/0212* (2013.01); *H04W 52/0274* (2013.01); *H04W 84/12* (2013.01)

(58) Field of Classification Search
CPC ............. H04W 52/0229; H04W 12/06; H04W 52/0235; H04W 74/0808; H04W 84/12;
(Continued)

(56) References Cited

U.S. PATENT DOCUMENTS

2010/0317172 A1* 12/2010 Morikazu .......... B23K 26/0853
219/121.68
2018/0317172 A1* 11/2018 Lepp ................. H04W 52/0212
(Continued)

OTHER PUBLICATIONS

Huang, Po-kai et al.; "Spec Text for WUR Negotiation and WUR Mode". IEEE 802.11-18/0085r3, Jan. 18, 2018. See pp. 1-13.
(Continued)

*Primary Examiner* — Romani Ohri
(74) *Attorney, Agent, or Firm* — Womble Bond Dickinson (US) LLP

(57) ABSTRACT

Disclosed is a wireless communication terminal for performing communication wirelessly. The wireless communication terminal includes: a first wireless transceiver, which transmits/receives a signal through a first waveform; a second wireless receiver, which receives a signal through a second waveform different from the first waveform; and a processor. The processor receives, via the second wireless receiver, a first wake-up radio (WUR) frame from a base wireless communication terminal of a basic service set (BSS) to which the wireless communication terminal belongs, determines whether the wireless communication terminal is an intended recipient of the first WUR according to whether the BSS is one corresponding to a multiple BSS identifier (BSSID) set when an identifier field of the first WUR frame indicates a transmitter ID for identifying the base wireless
(Continued)

communication terminal, and wakes up the first wireless transceiver based on the first WUR frame when the wireless communication terminal is the intended recipient of the first WUR frame.

16 Claims, 18 Drawing Sheets

(30) Foreign Application Priority Data

| | | |
|---|---|---|
| Mar. 22, 2018 | (KR) | 10-2018-0033252 |
| Jan. 8, 2019 | (KR) | 10-2019-0002437 |
| Jan. 15, 2019 | (KR) | 10-2019-0005457 |

(58) Field of Classification Search
CPC ..... H04W 12/69; H04W 48/08; H04W 48/16; H04W 52/02; Y02D 30/70
See application file for complete search history.

(56) References Cited

U.S. PATENT DOCUMENTS

| | | | |
|---|---|---|---|
| 2019/0007904 A1* | 1/2019 | Asterjadhi | H04W 52/54 |
| 2020/0367236 A1* | 11/2020 | Xing | H04B 17/309 |
| 2021/0068054 A1 | 3/2021 | Ahn et al. | |

OTHER PUBLICATIONS

Kim, Jeongki et al.; "Further considerations on WUR frame format". IEEE 802.11-17/0103r3, Jan. 18, 2018. See slides 1-11.
Li, Guoqing et al. "WUR Discovery Frame Content" IEEE 802.11-18/0160r7, Jan. 18, 2018, See slides 1-8.
Li, Nan et al.: "Advertising WUR Discovery Frame Related Info for Fast Scanning". IEEE 802.11-18/0244r1, Feb. 12, 2018. See slides 1-13.
Ko, Geonjung et al.; BSS Color Settings for a Multiple BSSID Set:. IEEE 802.11-16/0042r2. Jan. 19, 2018. See slides 1-8.
International Search Report for PCT/KR2019/002478 mailed on Jun. 10, 2019 and its English translation from WIPO (now published as WO 2019/172589).
Written Opinion of the International Searching Authority for PCT/KR2019/002478 mailed on Jun. 10, 2019 and its English translation by Google Translate (now published as WO 2019/172589).
Notice of Allowance dated Dec. 16, 2022 for U.S. Appl. No. 16/977,795 (now published as 2021/0068054).
Corrected Notice of Allowance dated Aug. 17, 2022 for U.S. Appl. No. 16/977,795 (now published as 2021/0068054).
Notice of Allowance dated Aug. 10, 2022 for U.S. Appl. No. 16/977,795 (now published as 2021/0068054).
Office Action dated Apr. 28, 2022 for U.S. Appl. No. 16/977,795 (now published as 2021/0068054).

* cited by examiner

1) BSSID: 0x1A2B3C4D5E6F → TXID: E6F
2) BSSID: 0x1A2B3C4D5E6F → TXID: 1A2 xor B3C xor 4D5 xor E6F
3) BSSID: 0x1A2B3C4D5E6F → TXID: 1A2 xor E6F

| Element ID (Event Report) | Length | Event Token | Event Type (WUR ID duplication) | Event Report Status | Event Report |

Duplicated WUR ID

TXID bitmap

BSSID 1 ... BSSID n

WIRELESS COMMUNICATION METHOD USING WAKE-UP RADIO AND WIRELESS COMMUNICATION TERMINAL THEREFOR

CROSS-REFERENCE TO RELATED APPLICATIONS

This application is a continuation of U.S. patent application Ser. No. 16/977,795 filed on Oct. 30, 2020, which is the U.S. National Stage of International Patent Application No. PCT/KR2019/002478 filed on Mar. 4, 2019, which claims the priority to Korean Patent Application No. 10-2018-0025505 filed in the Korean Intellectual Property Office on Mar. 3, 2018, Korean Patent Application No. 10-2018-0026502 filed in the Korean Intellectual Property Office on Mar. 6, 2018, Korean Patent Application No. 10-2018-0033252 filed in the Korean Intellectual Property Office on Mar. 22, 2018, Korean Patent Application No. 10-2019-0002437 filed in the Korean Intellectual Property Office on Jan. 8, 2019, and Korean Patent Application No. 10-2019-0005457 filed in the Korean Intellectual Property Office on Jan. 15, 2019, the entire contents of which are incorporated herein by reference.

TECHNICAL FIELD

The present invention relates to a method for improving transmission efficiency, and more particularly, to a wireless communication method and a wireless communication terminal using a wake-up radio in a wireless LAN.

BACKGROUND ART

In recent years, with supply expansion of mobile apparatuses, a wireless communication technology that can provide a rapid wireless Internet service to the mobile apparatuses has been significantly spotlighted. The wireless communication technology allows mobile apparatuses including a smart phone, a smart pad, a laptop computer, a portable multimedia player, an embedded apparatus, and the like to wirelessly access the Internet in home or a company or a specific service providing area.

One of most famous wireless communication technology is wireless LAN technology. Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an Orthogonal Frequency Division Multiplexing (OFDM) technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHZ, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless communication technology standards after the 802.11ac and 802.11ad, discussion for providing a high-efficiency and high-performance wireless communication technology in a high-density environment is continuously performed. That is, in a next-generation wireless communication technology environment, communication having high frequency efficiency needs to be provided indoors/outdoors under the presence of high-density terminals and base terminals and various technologies for implementing the communication are required.

In addition, while developing technology that increases the speed and efficiency of a wireless LAN simultaneously, in order to extend the battery life of mobile devices equipped with a wireless LAN and to equip devices operating based on a very limited power source such as a battery with a wireless LAN, it is necessary to develop an efficient wireless LAN power saving technique. The existing WLAN power saving techniques are methods of periodically entering devices into a sleep mode to reduce power, but in this case, as the power saving efficiency of the device increases, the device wakes up in a longer period, so that communication with the device is further suspended. To solve this problem, it is necessary to study a power saving technique using a separate low-power wake-up receiver.

DISCLOSURE

Technical Problem

The embodiment of the present invention has an object to perform a power saving operation by utilizing a low-power wake-up receiver in a wireless LAN environment as described above.

Technical Solution

A wireless communication terminal for performing communication wirelessly according to an embodiment of the present invention includes a first wireless transceiver, which transmits/receives a signal through a first waveform, a second wireless receiver, which receives a signal through a second waveform different from the first waveform, and a processor. The processor may be configured to receive, via the second wireless receiver, a first wake-up radio (WUR) frame from a base wireless communication terminal of a basic service set (BSS) to which the wireless communication terminal belongs, determine whether the wireless communication terminal is an intended recipient of the first WUR frame according to whether the BSS is one corresponding to a multiple BSS identifier (BSSID) set when an identifier field of the first WUR frame indicates a transmitter ID for identifying the base wireless communication terminal, and wake up the first wireless transceiver based on the first WUR frame when the wireless communication terminal is the intended recipient of the first WUR frame. The multiple BSSID set may include each BSSID of a plurality of BSSs operated by one base wireless communication terminal and sharing an operating channel.

The processor may be configured to determine that the wireless communication terminal is the intended recipient of the first WUR frame when the BSS to which the wireless communication terminal belongs does not correspond to the multiple BSSID set, and determine that the wireless communication terminal is not the intended recipient of the first WUR frame when the BSS to which the wireless communication terminal belongs corresponds to any one of nontransmitted BSSIDs included in the multiple BSSID set. The BSSID set may be configured with one transmitted BSSID and one or more nontransmitted BSSIDs, the transmitted BSSID may be a representative BSSID used for transmitting a management frame to all of the plurality of BSSs operated by the base wireless communication terminal, transmission of the management frame may be performed through the first waveform, and the one or more nontransmitted BSSIDs may be BSSIDs except for transmitted BSSID among BSSIDs included in the multiple BSSID set.

When the BSS to which the wireless communication terminal belongs corresponds to any one of the nontransmitted BSSIDs included in the multiple BSSID set, the processor may be configured to determine whether the wireless communication terminal is the intended recipient of the first WUR frame based on a nontransmitted ID for identifying the BSS to which the wireless communication terminal belongs.

The processor may be configured to obtain the nontransmitted ID for identifying the BSS to which the wireless communication terminal belongs, based on the transmitter ID.

The processor may be configured to receive, via the first wireless transceiver, BSSID index information corresponding to the BSS to which the wireless communication terminal belongs, and obtain the nontransmitted ID based on the transmitter ID and the BSSID index information corresponding to the BSS to which the wireless communication terminal belongs.

The BSSID index information corresponding to the BSS to which the wireless communication terminal belongs may indicate any one of integers from 1 to K. Here, when the identifier field of the first WUR frame indicates a value obtained by adding the value indicated by the BSSID index information to the transmitter ID, the processor may be configured to determine that the wireless communication terminal is the intended recipient of the first WUR frame.

The K may indicate the number of the nontransmitted BSSIDs among the BSSIDs included in the multiple BSSID set.

The processor may be configured to obtain the transmitted BSSID via the first wireless transceiver, and obtain the transmitter ID based on the transmitted BSSID.

The transmitter ID may have a value configured based on a preset number of least significant bits (LSBs) among a plurality of bits included in the transmitted BSSID.

The processor may be configured to receive, via the second wireless receiver, a second WUR frame transmitted periodically, may determine whether the wireless communication terminal is an intended recipient of the second WUR frame based on an identifier field of the second WUR frame and the transmitter ID when a frame type field of the second WUR frame indicates a beacon, and perform a follow-up operation indicated by the second WUR frame based on the second WUR frame when the wireless communication terminal is the intended recipient of the second WUR frame.

The processor may be configured to determine that the wireless communication terminal is the intended recipient of the second WUR frame when the identifier field of the second WUR frame includes the transmitter ID, and update time information about the wireless communication terminal when the wireless communication terminal is the intended recipient of the second WUR frame.

When the identifier field of the first WUR frame indicates the nontransmitted ID, the first WUR frame may be one broadcast, through the second waveform, from the BSS to which the wireless communication terminal belongs.

The identifier field of the first WUR frame may include one identifier expressed as a preset number of bits, and the first WUR frame may be a fixed-length frame which does not include an additional field including another identifier in addition to the identifier field. The preset number may be 12.

The processor may be configured to generate a frame check sequence (FCS) value based on values of a plurality of fields included in the first WUR frame when the wireless communication terminal is the intended recipient of the first WUR frame, determine whether the first WUR frame is valid based on the generated FCS value and a value included in the FCS field, and wake up the first wireless transceiver based on the first WUR frame when the first WUR frame is valid.

An operation method of a wireless communication terminal which transmits/receives a signal through a first waveform and receives a signal through a second waveform different from the first waveform according to an embodiment of the present invention may include the steps of: receiving, via the second waveform, a wake-up radio (WUR) frame from a base wireless communication terminal of a basic service set (BSS) to which the wireless communication terminal belongs; determining whether the wireless communication terminal is an intended recipient of the WUR frame according to whether the BSS is one corresponding to a multiple BSS identifier (BSSID) set when an identifier field of the WUR frame indicates a transmitter ID for identifying the base wireless communication terminal; and waking up the wireless communication terminal based on the WUR frame when the wireless communication terminal is the intended recipient of the WUR frame. The multiple BSSID set may include each BSSID of a plurality of BSSs operated by one base wireless communication terminal and sharing an operating channel.

Advantageous Effects

An efficient power saving operation can be performed through a wake-up receiver in a wireless LAN, and a follow-up data exchange sequence can be efficiently performed after a device is woken up.

MODE FOR CARRYING OUT THE INVENTION

Figure 1:
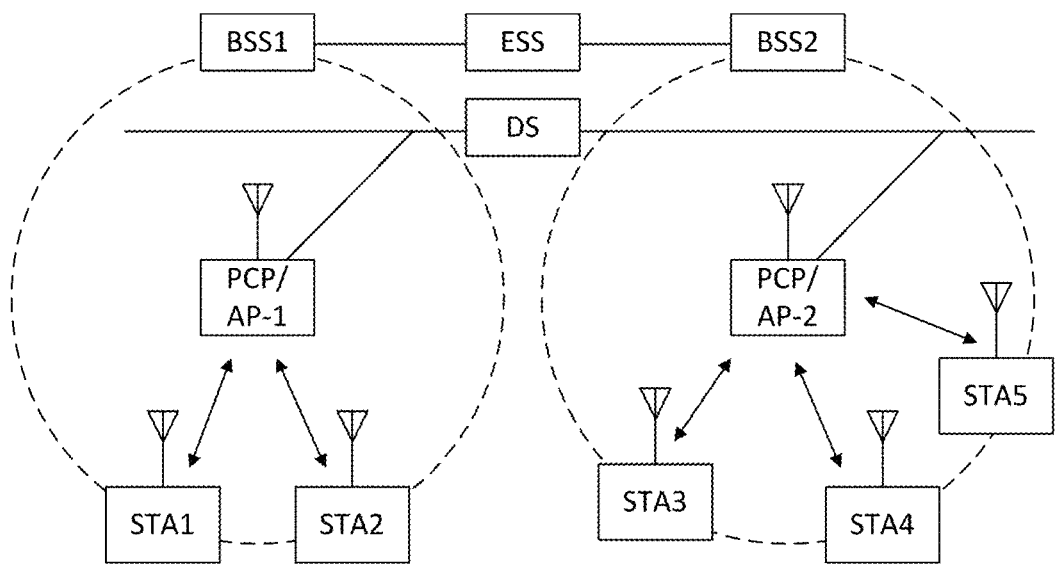
FIG. 1 is a diagram illustrating a wireless LAN system according to an embodiment of the present invention.

Preferred embodiments of the present invention will be described below in more detail with reference to the accompanying drawings. The present invention may, however, be embodied in different forms and should not be constructed as limited to the embodiments set forth herein. Parts not relating to description are omitted in the drawings in order to clearly describe the present invention and like reference numerals refer to like elements throughout.

Throughout the description, when one element is referred to as being "connected" to another element, the former may be "directly connected" to the latter or "electrically connected" thereto via another intervening element. In addition, the term "equal to or larger than" or "equal to or less than" used in relation to a specific threshold value may be appropriately replaced with the term "larger than" or "less than" according to embodiments.

FIG. 1 is a diagram illustrating a wireless communication system according to an embodiment of the present invention. For convenience of description, an embodiment of the present invention is described through the wireless LAN system. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a concept including a wireless LAN communication device such as non-AP STA, or an AP, or both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense.

A plurality of infrastructure BSSs may be connected with each other through the distribution system (DS). In this case, a plurality of BSSs connected through the distribution system is referred to as an extended service set (ESS).

Figure 2:
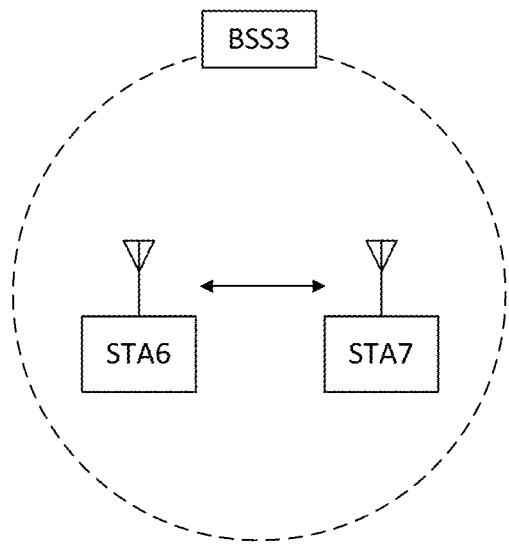
FIG. 2 illustrates an independent BSS that is a wireless LAN system according to another embodiment of the present invention.

FIG. 2 illustrates an independent BSS which is a wireless communication system according to another embodiment of the present invention. For convenience of description, another embodiment of the present invention is described through the wireless LAN system. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
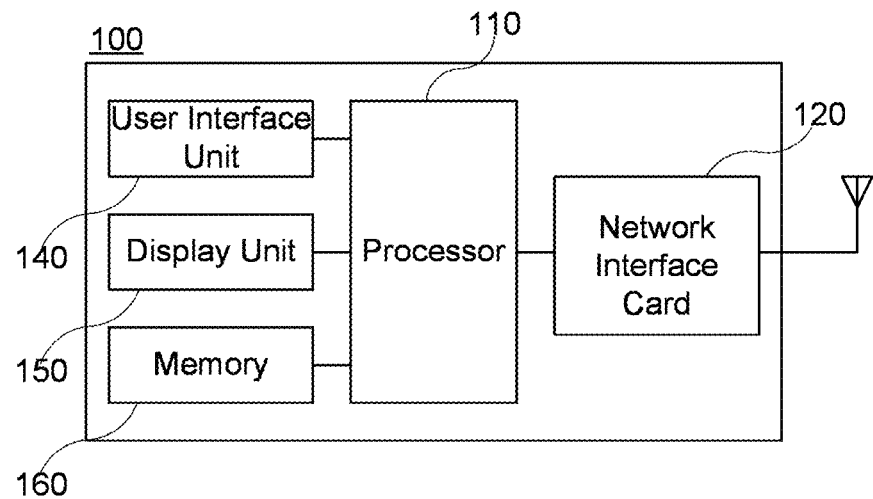
FIG. 3 is a block diagram illustrating a configuration of a station according to an embodiment of the present invention.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a wireless signal such as a wireless LAN physical layer frame, or the like and may be embedded in the station 100 or provided as an exterior. According to the embodiment, the transceiver 120 may include at least one transmit and receive module using different frequency bands. For example, the transceiver 120 may include transmit and receive modules having different frequency bands such as 2.4 GHz, 5 GHZ, and 60 GHz. According to an embodiment, the station 100 may include a transmit and receive module using a frequency band of 6 GHz or more and a transmit and receive module using a frequency band of 6 GHz or less. The respective transmit and receive modules may perform wireless communication with the AP or an external station according to a wireless LAN standard of a frequency band supported by the corresponding transmit and receive module. The transceiver 120 may operate only one transmit and receive module at a time or simultaneously operate multiple transmit and receive modules together according to the performance and requirements of the station 100. When the station 100 includes a plurality of transmit and receive modules, each transmit and receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 may be a modulator and/or demodulator which modulates wireless signal transmitted to the transceiver 120 and demodulates wireless signal received from the transceiver 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
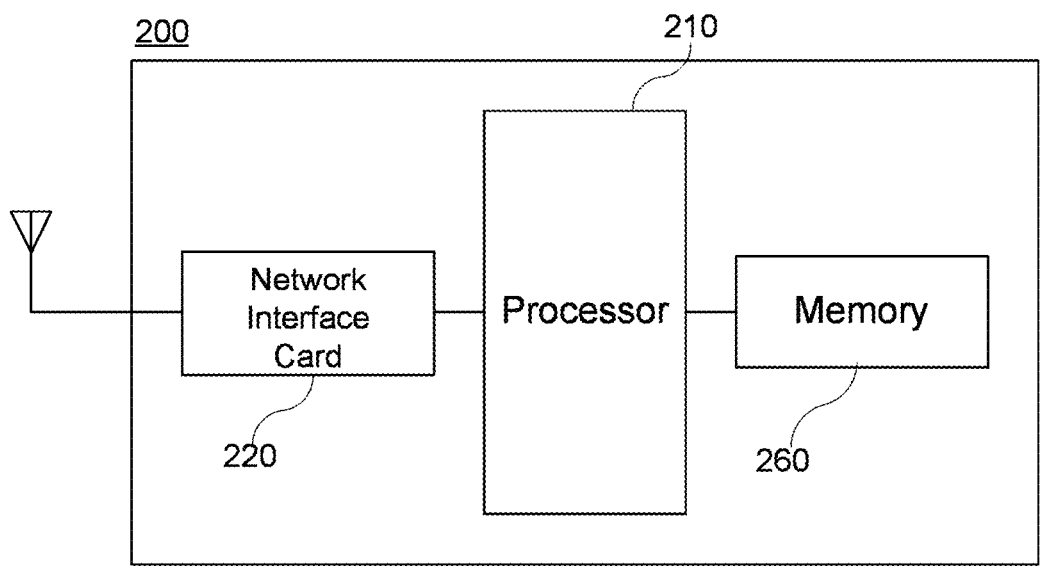
FIG. 4 is a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit and receive modules using different frequency bands. That is, the AP 200 according to the embodiment of the present invention may include two or more transmit and receive modules among different frequency bands, for example, 2.4 GHZ, 5 GHZ, and 60 GHz together. Preferably, the AP 200 may include a transmit and receive module using a frequency band of 6 GHz or more and a transmit and receive module using a frequency band of 6 GHz or less. The respective transmit and receive modules may perform wireless communication with the station according to a wireless LAN standard of a frequency band supported by the corresponding transmit and receive module. The transceiver 220 may operate only one transmit and receive module at a time or simultaneously operate multiple transmit and receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 may be a modulator and/or demodulator which modulates wireless signal transmitted to the transceiver 220 and demodulates wireless signal received from the transceiver 220. The processor 210 controls various operations such as radio signal transmission/reception of the AP 200 according to the embodiment of the present invention. A detailed embodiment thereof will be described below.

Figure 5:
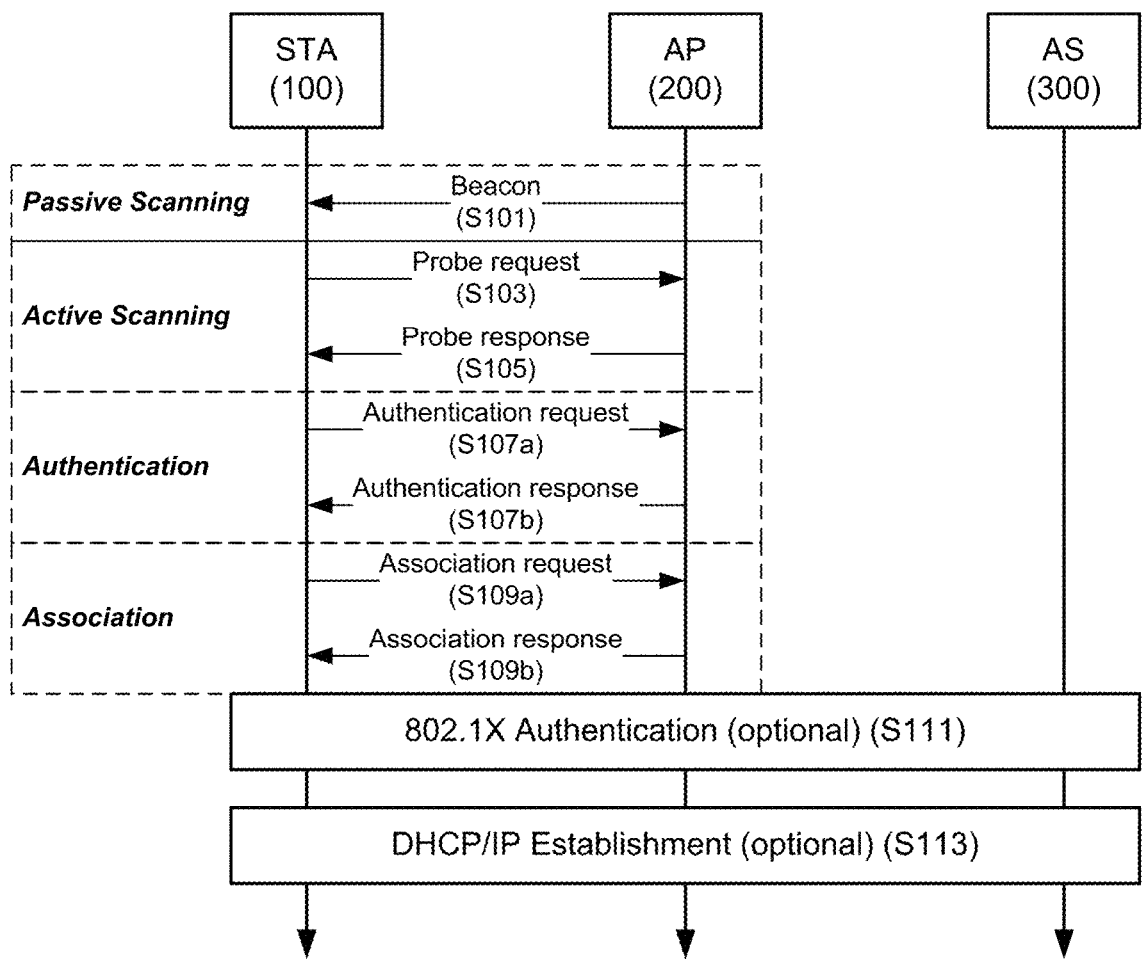
FIG. 5 is a diagram illustrating a process that a station configures an AP and a link according to an embodiment of the present invention.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107*a*) and receiving an authentication response from the AP 200 (S107*b*). After the authentication step is performed, the STA 100 performs the association step by transmitting an association request (S109*a*) and receiving an association response from the AP 200 (S109*b*).

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

In a specific embodiment, the AP 200 may be a wireless communication terminal that allocates a communication medium resource and performs scheduling in an independent network, such as an ad-hoc network, which is not connected to an external distribution service. In addition, the AP 200 may be at least one of a base station, an eNB, and a transmission point TP. The AP 200 may also be referred to as a base wireless communication terminal.

The wireless communication terminal may stop transmitting and receiving a wireless LAN radio and receive a wake-up radio (WUR) to increase energy efficiency. In this case, the magnitude of the power used for the wake-up radio transmission and reception may be smaller than the magnitude of the power used for the wireless LAN signal transmission. A general wireless LAN radio distinguished from the WUR may be referred to as a primary connectivity radio (PCR). A typical wireless LAN may indicate a radio capable of transmitting and receiving a 20 MHz non-high throughput (HT) physical layer protocol data unit (PPDU) defined in IEEE 802.11.

In the existing power save mode (hereinafter referred to as 'PS mode'), the wireless communication terminal may enter a PCR doze state that blocks power supply for some functions including a PCR transmission and reception function. In addition, in the PS mode, the wireless communication terminal may stop the PCR dose state to receive a radio signal from an external device and enter a PCR awake state, which is a state in which PCR transmission and reception can be performed. In the PCR doze state, supplying the power blocked by the wireless communication terminal again is referred to as PCR wake-up. In the existing PS mode, the wireless communication terminal may periodically wake up to receive a wireless signal from an external device. This operation may lower the operation efficiency of the wireless communication terminal.

When the wireless communication terminal wakes up according to the WUR signal triggering the wake-up of the PCR transceiver, it is possible to increase the operation efficiency of the wireless communication terminal. This power save operation is referred to as a WUR-based power save operation. Through the WUR-based power save operation, the wireless communication terminal can reduce unnecessary wake-up operation. In addition, when WUR is used, the time during which the wireless communication terminal stays in the PCR dose state may be increased. Thus, the power efficiency of the wireless communication terminal may be increased. For WUR-based power save operation, the wireless communication terminal may include a wake-up receiver (hereinafter referred to as 'WURx') that operates at a lower power than a PCR transceiver. In addition, when the wireless communication terminal needs to transmit a WUR signal, the wireless communication terminal may include a wake-up transmitter.

A part of the WUR signal may be transmitted in a waveform different from the waveform of the PCR signal. For example, a part of the WUR signal may be transmitted through On-Off Keying (OOK). Specifically, the PCR transceiver may transmit and receive modulated signals through a wave-form modulation method using WURx and other wave forms. Hereinafter, an operation of a wireless communication terminal including a WURx and a wireless communication method using WUR will be described according to an embodiment of the present invention.

Figure 6:
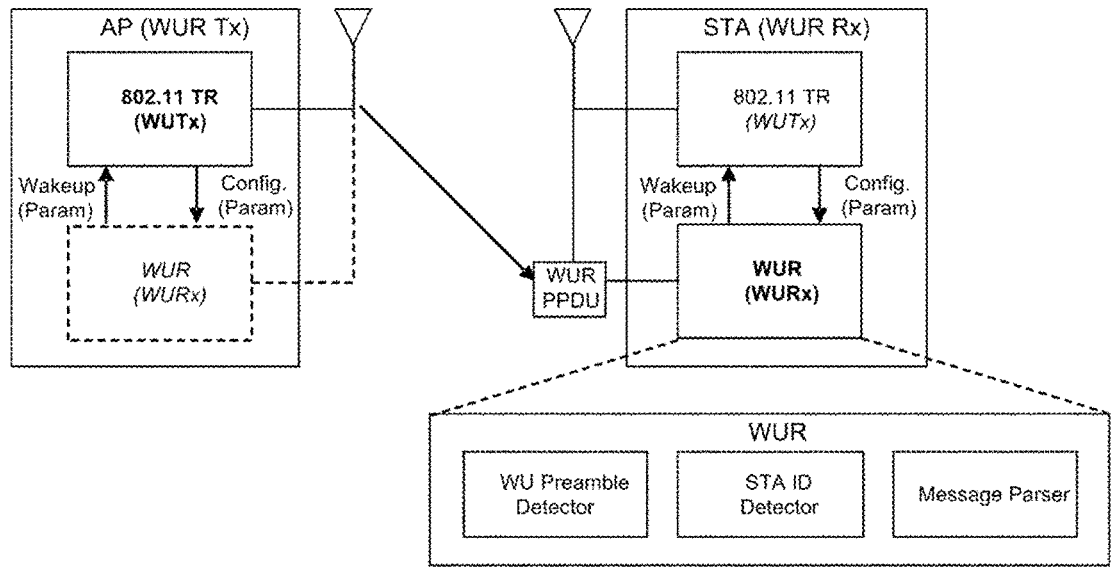
FIGS. 6 and 7 are diagrams illustrating a network including wireless communication terminals supporting WUR based power save according to an embodiment of the present invention.
Figure 7:
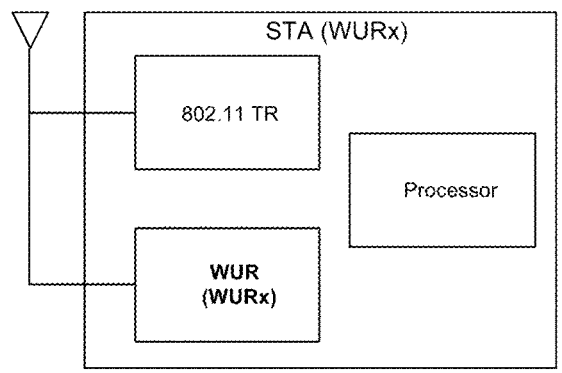

FIGS. 6 and 7 are diagrams illustrating a network including wireless communication terminals supporting WUR based power save according to an embodiment of the present disclosure. Referring to FIG. 6, the network may include an AP and a station supporting WUR based power save. The AP may transmit a WUR frame to the WUR terminal. Here, the WUR frame may include at least one of the wake-up frame or the WUR beacon frame. Specifically, the AP may wake-up the terminal by transmitting the wake-up frame to the WUR terminal. In the present specification, unless otherwise specified, a frame indicates a MAC frame. Meanwhile, the AP and the station of FIG. 6 may include a PCR transmission/reception function supporting at least one of 802.11a/b/g/n/ac/ax, which is a general wireless LAN standard. In addition, the AP and the station in FIG. 6 may coexist in one network and a general station that supports only PCR transmission/reception without supporting WUR transmission/reception. For example, the network of FIG. 6 may include a general station that does not have a WUR function.

According to an embodiment, the AP may include a first wireless transceiver (TR) supporting a communication method using PCR. The first wireless transceiver may transmit and receive PPDU through PCR. The AP may include a second wireless transmitter that performs WUR PPDU transmission. The second wireless transmitter may be referred to as a wake-up transmitter (WUTx). Here, a part of the WUR signal may be a signal transmitted in a second modulation method different from the first modulation method used in the PCR signal. Specifically, a part of the WUR signal may be transmitted through OOK. For example, the second wireless transmitter may transmit the WUR PPDU to the station through WUR. Also, if the AP additionally includes WURx, the AP may receive the WUR PPDU from the outside through the WURx.

Meanwhile, according to another embodiment, the first wireless transceiver and the second wireless transmitter may be implemented as one transceiver. For example, an AP may perform transmission and reception of a PCR signal and transmission of a WUR signal through one transceiver.

As shown in FIG. 6, the AP may transmit the WUR PPDU including a wake-up frame that triggers a wake-up of the PCR transceiver of the station to a station that supports WUR-based power save. According to an embodiment, the AP may wake up only a station entering a WUR based power save mode among a plurality of stations belonging to the AP's BSS. In addition, when the station receives a wake-up frame including an identifier indicating the station, the station may wake-up in the PCR doze state. For example, the WUR frame may include identification information identifying at least one station. The wake-up frame may include identification information identifying at least one station to wake-up. When the first station receives a wake-up frame including identification information indicating the first station, the first station may wake-up. Also, a station other than the first station belonging to the AP's BSS or another BSS may not wake-up.

According to an embodiment, a station supporting the WUR-based power save may include a WURx for receiving a wake-up frame. The station may include a first wireless transceiver that supports PCR transmission and reception and a WURx, that is, a second wireless receiver that exists separately. Here, the first wireless transceiver may be referred to as a PCR transceiver. The wireless communication terminal may transmit and receive PCR signals using a PCR transceiver. Also, the second wireless receiver may receive a signal transmitted in a second wave-form different from the first wave-form of the signal transmitted/received through the first wireless transceiver. The WURx may receive a wake-up frame from the AP and wake-up the PCR transceiver. If the WURx receives a wake-up frame while the PCR transceiver of the station operates in the PCR doze state, the WURx may wake-up the PCR transceiver by using an internal wake-up signal.

For example, the station may have an interface between the PCR transceiver and the WURx. At this point, the WURx may wake-up the PCR transceiver of the station by using the internal interface. Specifically, the WURx may wake-up a PCR transceiver by transmitting an internal signal to the PCR transceiver, but it is not limited thereto. For example, the station may have a processor that controls the overall operation of the station. At this point, the WURx may wake-up the PCR transceiver over the processor. Specifically, the station may cut off the power supply of the PCR and the processor in the PCR doze state. In this case, the WURx may operate in a manner that stops cutting off the power supply of the processor and wakes-up the PCR transceiver over the processor by receiving a wake-up frame.

According to an embodiment, the WURx may deliver information received through the wake-up frame to the PCR transceiver. The WURx may transmit information on subsequent operations following the wake-up to the PCR transceiver by using the internal interface. Specifically, the information on the subsequent operations may be a Sequence ID (SID) that identifies each of the subsequent operations. In addition, PCR may set WURx parameters required for the WUR based power save operation by using the internal interface.

For example, the WURx may include a wake-up preamble detector (WU Preamble Detector), a wireless communication terminal identifier detector (STA ID Detector), and a message parser. The WU preamble detector detects a wake-up frame by identifying a sequence of signal patterns included in the wake-up frame. In addition, the WU preamble detector may perform automatic gain control (AGC) and synchronization on WUR based on the detected signal pattern sequence.

The wireless communication terminal identifier detector WUR detects a recipient of a WUR frame. Here, the recipient of a WUR frame indicates a recipient intended by the wireless communication terminal which has transmitted the WUR frame. Furthermore, the wireless communication terminal identifier detector may obtain information for identifying the recipient of the WUR frame based on WUR DATA of WUR PPDU. Furthermore, the wireless communication terminal identifier detector may obtain information for identifying the recipient of the WUR frame based on WUR DATA and WUR SYNC of WUR PPDU. WUR DATA and WUR SYNC of WUR PPDU will be described later with reference to FIG. 8. The message parser parses a message included in a WUR frame. In detail, the message parser may obtain a message indicated by the WUR frame by parsing the message included in the WUR frame.

According to an embodiment, the wireless communication terminal may determine a condition for maintaining the wireless communication terminal in a state where WUR PPDU reception is possible through the WURx of the communication terminal. In a specific embodiment, the wireless communication terminal may maintain WURx to be available for reception until a certain condition is satisfied. For example, until the wireless communication terminal recognizes that the PCR transceiver of the wireless communication terminal succeeds in wake-up, the wireless communication terminal may maintain the WURx in a state capable of transmitting and receiving.

For convenience of explanation, the following description will be made on the premise that the wireless communication terminal and the base wireless communication terminal are wireless communication terminals and base wireless communication terminals that support power save based on WUR, unless otherwise stated.

For WUR-related operations, information exchange on whether the base wireless communication terminal and the wireless communication terminal support WUR operation, and a negotiation process for WUR operation are required. The base wireless communication terminal and the wireless communication terminal may exchange information on whether to support the WUR operation and negotiate the WUR operation by using PCR. This will be described with reference to FIG. 8.

Figure 8:
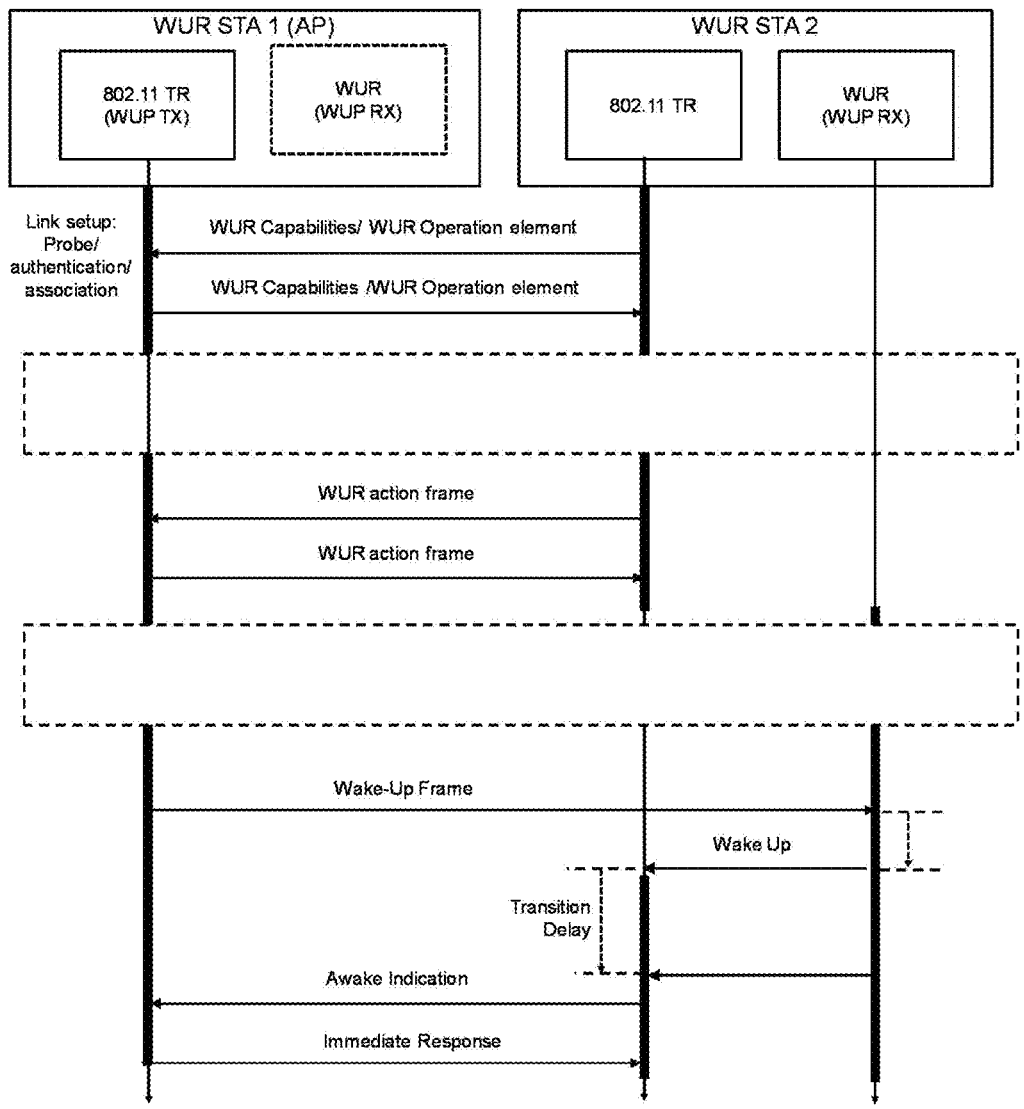
FIG. 8 is a diagram illustrating a method for a wireless communication terminal and a base wireless communication terminal to perform agreement for a WUR related operation and perform the WUR related operation according to an embodiment of the present invention.

FIG. 8 is a diagram illustrating a format of a WUR PPDU (PLCP protocol data unit) according to an embodiment of the present invention. The WUR PPDU may include a legacy part that the PCR transceiver is capable of demodulating. Specifically, the WUR PPDU may be divided into a legacy part that the PCR transceiver is capable of demodulating and a wake-up part that the PCR transceiver is not capable of demodulating. As described above, the BSS may simultaneously include a wireless communication terminal that supports WUR-based power save and a legacy wireless communication terminal that does not support WUR-based power save. In this case, it is necessary that the operation of the wireless communication terminal supporting the WUR-based power save does not prevent the operation of the legacy wireless communication terminal existing in the BSS.

Specifically, the legacy part may include a legacy preamble (L-Preamble) used in the existing 802.11 standard. Specifically, the legacy preamble may include an L-STF including a short training signal, an L-LTF including a long training signal, and an L-SIG including signaling information for a legacy wireless communication terminal. The legacy wireless communication terminal may determine the length of the WUR PPDU using the legacy preamble. Accordingly, the legacy wireless communication terminal may not access the frequency band in which the WUR PPDU is transmitted while the WUR PPDU is transmitted. Though the legacy wireless communication terminal prevents interference with signals including the WUR part following the legacy part.

In addition, the WUR PPDU may include a WUR symbol. For example, the WUR symbol may be one OFDM symbol following L-SIG. The WUR symbol may be an OFDM symbol modulated by a Binary Phase Shift Keying (BPSK) scheme. The WUR symbol may include information indicating a BSSID. In addition, the WUR symbol may include information indicating the transmission type of the WUR part. For example, the transmission type may be unicast, multicast, or broadcast. When the transmission type is unicast, a WUR part to be described later may include identification information indicating a wireless communication terminal to be waked up. In this case, the identification information may be an association identifier (AID) used in the PCR. Alternatively, the identification information may be a WUR unique identifier (WUR ID) used in the WUR.

A wireless communication terminal supporting WUR-based power save can demodulate the WUR part through WURx. In this case, the WUR part may be divided into a WUR SYNC and a WUR frame. The WUR SYNC may include a signal pattern sequence indicating WUR PPDU. Specifically, the base wireless communication terminal may insert a pseudo noise sequence based on WURx modulation into the WUR preamble. The base wireless communication terminal can insert a pseudo noise sequence using OOK in the WUR preamble. The signal pattern sequence may be a pattern applied equally regardless of the wireless communication terminal receiving the WUR PPDU. A wireless communication terminal supporting WUR-based power save can check whether a signal received through a signal pattern sequence is a WUR PPDU. In addition, the wireless communication terminal may determine whether the WUR PPDU is High Data-Rate (HDR) or Low Data-Rate (LDR) through a signal pattern sequence.

The WUR frame may be divided into a MAC header, a frame body, and a frame check sequence (FCS) field. The wireless communication terminal supporting WUR-based power save can parse the WUR frame of the WUR PPDU to determine the receiver of the received WUR PPDU. For example, the MAC header may include an ID field indicating the recipient of the WUR PPDU.

Specifically, the MAC header may include a WUR identifier (WUR ID) that identifies a wireless communication terminal receiving a WUR frame. When the wireless communication terminal receives a wake-up frame including a WUR ID indicating the wireless communication terminal, the wireless communication terminal can wake-up the PCR transceiver. In order to wake-up a PCR transceiver of a specific wireless communication terminal among a plurality of wireless communication terminals included in the BSS using a wake-up frame, the base wireless communication terminal may allocate different WUR IDs to the plurality of wireless communication terminals, respectively.

According to one embodiment, when the wake-up frame triggers the wake-up of the PCR transceiver of a plurality of wireless communication terminals, the MAC header of the WUR signaling part may include a group identifier (Group ID) that identifies a group including a plurality of wireless communication terminals. Further, the base wireless communication terminal may insert subsequent operation information indicating a subsequent operation of the wireless communication terminal to be the target of wake-up in the MAC header of the WUR signaling part. For example, the WUR signaling part may additionally include a subsequent operation identifier (SID) that identifies subsequent operations after wake-up.

For convenience of explanation, in the following, unless otherwise stated, it is assumed that the wireless communication terminal and the base wireless communication terminal are a wireless communication terminal and a base wireless communication terminal supporting WUR-based power save.

Figure 9:
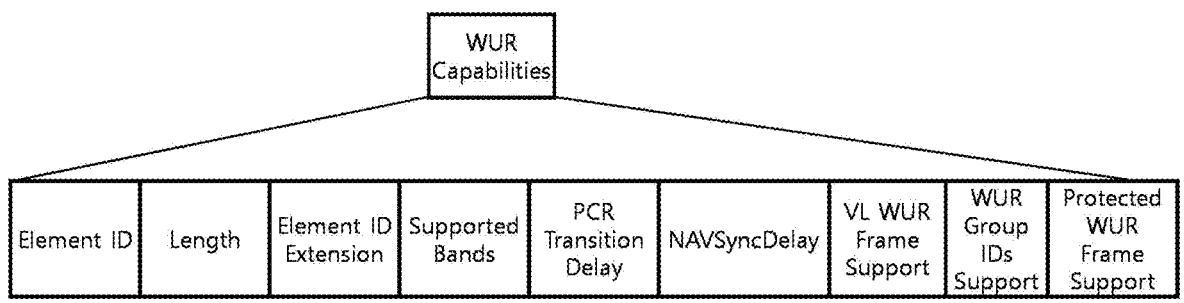
FIG. 9 illustrates a configuration of a WUR capability element according to an embodiment of the present invention.
Figure 10:
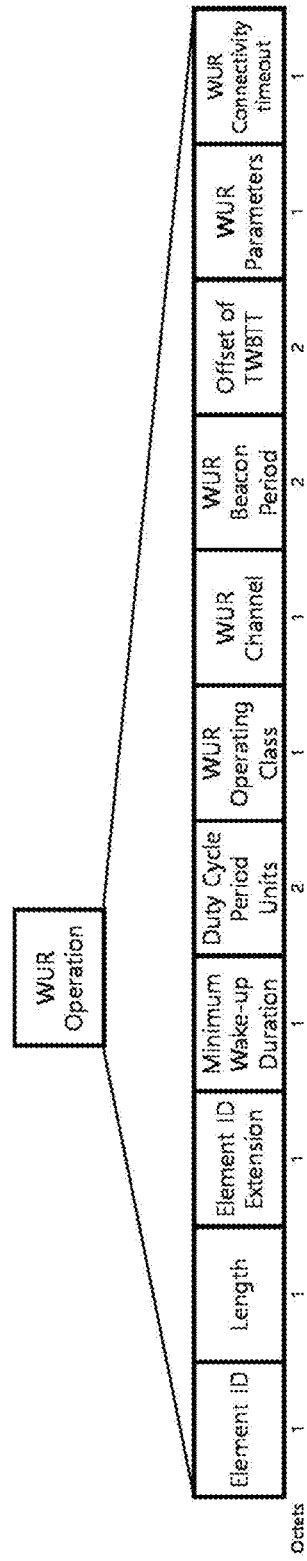
FIG. 10 illustrates a configuration of a WUR operation element according to an embodiment of the present invention.

FIGS. 9 to 10 show a specific format of a WUR frame according to an embodiment of the present invention.

The MAC header of the WUR signaling field described through FIG. 8 may be divided into a frame control field, an ID field, and a type dependent control field. In this case, the Frame Control field indicates basic control information on the WUR frame. In addition, the ID field may indicate information on the address of the transmitter of the WUR frame or the address of the recipient. Specifically, the ID field may include at least one of information indicating the address of the transmitter of the WUR frame and information indicating the address of the recipient. In addition, the Type Dependent Control field indicates variable control information changed according to the type of the WUR frame.

The Frame Control field may include information on the protocol version followed by the WUR frame. In this case, a field indicating information on a protocol version followed by the WUR frame may be referred to as a Protocol Version field. In addition, the Frame Control field may include information indicating the type of WUR frame. In this case, the information indicating the type of the WUR frame may indicate whether the length of the WUR frame is a predetermined fixed length or variable. Or, information indicating the type of the WUR frame may indicate the role of the WUR frame. For example, information indicating the type of the WUR frame may indicate that the WUR frame is a WUR beacon. Further, information indicating the type of the WUR frame may indicate that the WUR frame is a wake-up frame. A field indicating information indicating the type of the WUR frame may be referred to as a Type field.

In addition, the Frame Control field may include a field indicating the length of the WUR frame or a subtype of the WUR frame. When the length of the WUR frame is fixed, a field indicating the length of the WUR frame or a subtype of the WUR frame may indicate a subtype of the WUR frame. This is because when the length of the WUR frame is fixed, the WUR frame has a predetermined length. The field indicating the subtype of the WUR frame may indicate whether the WUR frame is a WUR frame for unicast, a WUR frame is a WUR frame for broadcast, or a WUR frame is a WUR frame for groupcast. When the WUR frame is a WUR frame for unicast, the ID field of the WUR frame may indicate a unique WUR ID. When the WUR frame is a WUR frame for groupcast, the ID field of the WUR frame may indicate a group WUR ID that identifies a plurality of WUR wireless communication terminals. When the WUR frame is a WUR frame for broadcast, the ID field of the WUR frame may indicate a broadcast WUR ID. A field indicating a subtype of the WUR frame may indicate that the WUR frame is a WUR beacon frame. In this case, the ID field of the WUR frame may include an identifier of the base wireless communication terminal. Specifically, the ID field of the WUR frame may include the WUR ID of the base wireless communication terminal. A field indicating a subtype of the WUR frame may indicate that the frame indicates a duty-cycle end. When the wireless communication terminal receives a frame indicating the duty-cycle end, the wireless communication terminal may determine that there is no WUR frame to be transmitted to the wireless communication terminal until On Duration corresponding to the next transmission period. In this case, the wireless communication terminal may enter a WUR doze state that turns off the WURx when the WUR frame is received.

In addition, the Frame Control field may include information indicating that there is no additional WUR frame transmission to a terminal operating according to a duty-cycle among terminals associated with the base wireless communication terminal within a corresponding period after a corresponding WUR frame. In this case, the absence of additional WUR frame transmission may indicate that there is no additional wake-up frame transmission. Further, the absence of additional WUR frame transmission may indicate that there is no additional WUR beacon frame transmission. A field indicating information indicating that there is no additional WUR frame transmission may be referred to as a More WUR field.

As described above, the ID field may indicate a unique WUR ID. Also, the ID field may indicate the group WUR ID. In addition, when the WUR frame is transmitted in a broadcast, the ID field may indicate the identifier of the base wireless communication terminal.

The Type Dependent Control field (TD field) may include information on a partial timing synchronization function for time synchronization between terminals receiving a WUR frame according to the type of the WUR frame. In addition, the Type Dependent Control field may include information indicating whether to change the BSS management parameter according to the type of the WUR frame. In this case, information indicating whether the BSS management parameter is changed may be referred to as a BSS update counter. Also, when the WUR frame is a unicast wake-up frame, the Type Dependent Control field may include information indicating how many WUR frames the base wireless communication terminal has transmit to the recipients of the WUR frame. Information indicating how many WUR frames the base wireless communication terminal has transmit to the corresponding terminal may be referred to as packet number information. The packet number information may indicate how many WUR frames the base wireless communication terminal has transmitted to the recipients of the WUR frame in a circular counter format. When the base wireless communication terminal successfully receives the response of the wireless communication terminal for the WUR frame, the base wireless communication terminal may increase the counter value indicated by the packet number information. When the WURx operation starts after receiving the wake-up frame and performing the PCR operation, the wireless communication terminal may store the counter value obtained by incrementing the counter obtained from the WUR frame. Also, the wireless communication terminal may store the counter value obtained from the WUR frame. In addition, when the packet number information of the WUR frame does not indicate the counter value expected by the wireless communication terminal, the wireless communication terminal may request the base wireless communication terminal to change the WUR ID of the wireless communication terminal. In this case, the wireless communication terminal may transmit a frame requesting the WUR ID change of the wireless communication terminal to the base wireless communication terminal using PCR. When the packet number information of the WUR frame does not indicate the counter value expected by the wireless communication terminal, this is because the wireless communication terminal may determine that the base wireless communication terminal associated with the wireless communication terminal has not transmitted the corresponding WUR frame. For example, the wireless communication terminal may determine that there is an external attack.

In another specific embodiment, the Type Dependent Control field may include a TID or Access Category (AC) of data that the base wireless communication terminal intends to transmit to the wireless communication terminal together with a sequence number. In this case, the sequence number is the lowest number among the sequence numbers of the MAC service data unit (MSDU) corresponding to the TID corresponding to the highest user priority among the TIDs of data that the base wireless communication terminal intends to transmit to the wireless communication terminal. In another specific embodiment, the sequence number may correspond to the TID corresponding to the highest user priority among the TIDs of data that the base wireless communication terminal intends to transmit to the wireless communication terminal, and may be a sequence number of an MSDU that successfully transmitted among the MSDUs corresponding to the TID. In a WURx doze state, the wireless communication terminal may determine whether a WUR frame received according to the sequence number of the MSDU successfully received from the base wireless communication terminal for each TID is a WUR frame transmitted by a base wireless communication terminal associated with the corresponding wireless communication terminal. In the Type Dependent Control field, the number of bits in the field indicating the sequence number may be 12 bits.

In addition, the AC of the data may be the AC of the TID having the highest user priority among the TIDs of data that the base wireless communication terminal intends to transmit to the wireless communication terminal. In the Type Dependent Control field, the number of bits of the field indicating AC may be 2 bits. The TID of data may be a TID having the highest user priority among TIDs of data that the base wireless communication terminal intends to transmit to the wireless communication terminal. In the Type Dependent Control field, the number of bits indicating the TID may be 3 bits. The value of the field indicating the sequence number of the Type Dependent Control field may be a partial bit of the sequence number. In this case, the value of the field indicating the sequence number may be a value corresponding to the number of bits of the field indicating the sequence number from the least significant bit (LSB). The wireless communication terminal receiving the WUR frame can access the channel based on the AC indicated by the WUR frame. In addition, the wireless communication terminal receiving the WUR frame may determine a method of transmitting a response frame for data depending on whether data corresponding to the TID indicated by the WUR frame is transmitted in unscheduled-automatic power save delivery (U-APSD) mode or normal PS mode.

When the sequence number indicated by the WUR frame does not indicate the sequence number expected by the wireless communication terminal, the wireless communication terminal may request the base wireless communication terminal to change the WUR ID of the wireless communication terminal. In this case, the wireless communication terminal may transmit a frame requesting the WUR ID change of the wireless communication terminal to the base wireless communication terminal using PCR. When the sequence number indicated by the WUR frame does not indicate the sequence number expected by the wireless communication terminal, this is because the wireless communication terminal may determine that the base wireless communication terminal associated with the wireless communication terminal has not transmitted the corresponding WUR frame. For example, the wireless communication terminal may determine that there is an external attack.

When the WUR frame is a WUR frame for groupcast transmission or a WUR frame for broadcast transmission, the Type Dependent Control field may not include packet number related information. In this case, the Type Dependent Control field may include Predictive Timer Synchronization Function (PTSF) related information instead of packet number information. In addition, even if the WUR frame is a WUR frame for unicast transmission, when the More WUR field indicates that there is no additional WUR frame transmission within a corresponding period, the Type Dependent Control field may include PTSF-related information instead of packet number information. This is because the operation of the wireless communication terminal receiving the WUR frame may affect the operation of other wireless communication terminals in duty cycle operation.

When the WUR frame corresponds to a WUR frame format of variable length, the length of the Frame Body field may be variable. In this case, the Type field may indicate that the length of the WUR frame is variable. In addition, the subtype field indicating the subtype of the WUR frame may indicate the length of the Frame Body field. Specifically, the subtype field may indicate the length of the WUR frame based on a predetermined information unit, not a bit unit. For example, the Frame Body field may include a plurality of subfields indicating information on each of the plurality of WUR wireless communication terminals. Specifically, the Frame Body field may include a first subfield indicating information on the first WUR wireless communication terminal and a second subfield indicating information on the second WUR wireless communication terminal. In addition, one subfield may indicate information on a plurality of WUR IDs corresponding to the group WUR ID. When the Frame Body field includes a plurality of subfields indicating information on each of the plurality of WUR wireless communication terminals, the subtype field may indicate information on the length of the Frame Body field using the number of subfields. For example, when the Frame Body field includes subfields for each of the two WUR IDs, the subtype field may indicate that the number of subfields included in the Frame Body field is 2. When the WUR frame is a WUR Beacon frame and corresponds to a variable length WUR frame format, the Frame Body field may include information related to management. In this case, the length of the Frame Body field may be indicated based on a predetermined information unit as described above.

FIG. 9 shows a specific format of a MAC header of a WUR frame according to a specific embodiment of the present invention. FIG. 10 shows a specific format of a MAC header of a WUR frame according to another specific embodiment of the present invention.

The Frame Control field may include a Type field. The Type field may indicate whether the WUR frame is a WUR beacon frame, a wake-up frame, a WUR discovery frame for discovering a BSS using WUR, or a vendor specific frame. Also, the Frame Control field may include a Length Present field. The Length Present field may indicate whether the corresponding WUR frame corresponds to a fixed-length WUR frame format not including the Frame Body field, or whether the corresponding WUR frame corresponds to a variable-length WUR frame format including the Frame Body field.

In addition, the Frame Control field may include a Length/Misc field. The Length/Misc field may indicate the length of the WUR frame or additional information other than the length of the WUR frame depending on whether the WUR frame corresponds to the variable length WUR frame format. Specifically, when the WUR frame corresponds to a variable-length WUR frame format, the Length/Misc field may indicate information on the length of the WUR frame. The information on the length of the WUR frame may indicate the length of the WUR frame. When the WUR frame corresponds to a variable-length WUR frame format, the Length/Misc field may indicate a length of 2 to 16 octets in units of 2 octets. When the WUR frame corresponds to the variable length WUR frame format, the Length/Misc field may indicate the length of the WUR frame based on a predetermined information unit. For example, the frame body may include a subfield indicating information on a wireless communication terminal corresponding to the WUR ID for each WUR ID. In this case, the Length/Misc field may indicate the number of subfields included for each WUR ID in the Frame Body.

In addition, the Frame Control field may include a Protected field indicating whether the frame requires verification by a message integrity check (MIC). In this case, the Protected field may be a 1-bit field. When the Protected field indicates that MIC is required, the wireless communication terminal receiving the WUR frame may check whether the WUR frame is valid using the MIC. When the wireless communication terminal determines that the WUR frame is not valid through the MIC, the wireless communication terminal may process the WUR frame. The wireless communication terminal may discard the WUR frame. Specifically, when frame validation is required through the MIC, the FCS field of the WUR frame may indicate a message integrity value. The wireless communication terminal receiving the WUR frame may perform MIC using the encryption key previously received.

The ID field may indicate information on the address of the transmitter of the WUR frame or the address of the recipient. The identifier included in the ID field may vary depending on the role of the WUR frame. When the WUR frame is a WUR beacon frame, the ID field may indicate a transmission ID (TXID) that is an identifier of the base wireless communication terminal. In addition, when the WUR frame is a wake-up frame for broadcast transmission, the ID field may indicate TXID. In addition, when the WUR frame is a wake-up frame to wake-up a plurality of wireless communication terminals corresponding to a specific group, the ID field may indicate the group WUR ID. In another specific embodiment, when the WUR frame is a wake-up frame for waking up a specific plurality of wireless communication terminals, the Frame Body field of the corresponding WUR frame may indicate at least one WUR ID among the plurality of wireless communication terminals. When the WUR frame is a wake-up frame to wake-up a specific wireless communication terminal, the ID field may indicate the WUR ID of the corresponding wireless communication terminal.

The WUR frame may include an FCS field indicating a value used to validate the WUR frame. The wireless communication terminal receiving the WUR frame may determine whether an error is included in the process of transmitting and receiving the WUR frame based on the values of the fields included in the WUR frame and the values of the FCS field. Specifically, the wireless communication terminal receiving the WUR frame performs a CRC operation based on the values of the fields included in the WUR frame to generate the FCS value, and compares the generated FCS value with the value of the FCS field. When the generated FCS value and the value of the FCS field are the same, the wireless communication terminal may determine that no error is included in the process of transmitting and receiving the WUR frame. When the generated FCS value and the value of the FCS field are different, the wireless communication terminal may determine that an error is included in the process of transmitting and receiving the WUR frame. The WUR frame may not include the identifier of the base wireless communication terminal. Also, the WUR frame may be transmitted without being encrypted. Therefore, an external wireless communication device can copy the field value of the WUR frame and retransmit it. Through this, an external wireless communication device can induce a power consumption by allowing the wireless communication terminal to wake-up unnecessarily. In order to prevent this, the following embodiments can be applied to a wireless communication terminal and a base wireless communication terminal.

In a specific embodiment, the wireless communication terminal receiving the WUR frame may perform the CRC operation to generate the FCS value considering not only the values of the fields included in the WUR frame, but also the values of virtual fields not included in the WUR frame. The wireless communication terminal may compare the generated FCS value with the FCS field value. Therefore, the base wireless communication terminal may also perform the CRC operation to configure the value of the FCS field considering not only the values of the fields included in the WUR frame, but also the values of virtual fields not included in the WUR frame. In this case, the value of the virtual field may be a value previously negotiated between the base wireless communication terminal and the wireless communication terminal. In addition, when there is no Frame Body field of the WUR frame, when generating the FCS value, the wireless communication terminal and the base wireless communication terminal may consider that the virtual field is located after the MAC header. In addition, if there is a Frame Body field of the WUR frame, when generating the FCS value, the wireless communication terminal and the base wireless communication terminal may consider that the virtual field is located after the MAC header. The virtual field may be referred to as an embedded BSSID field. Through this operation, the wireless communication terminal may determine whether the WUR frame includes an error and also determine whether a WUR frame is transmitted from a base wireless communication terminal associated with the wireless communication terminal. The specific format of the WUR frame may be the same as that shown in FIG. 10.

For WUR-related operations, it is necessary to exchange information on whether the base wireless communication terminal and the wireless communication terminal support the WUR operations and to negotiate the WUR operations. The base wireless communication terminal and the wireless communication terminal may use PCR to exchange information on whether to support the WUR operation and negotiate the WUR operation. This will be described with reference to FIG. 11.

Figure 11:
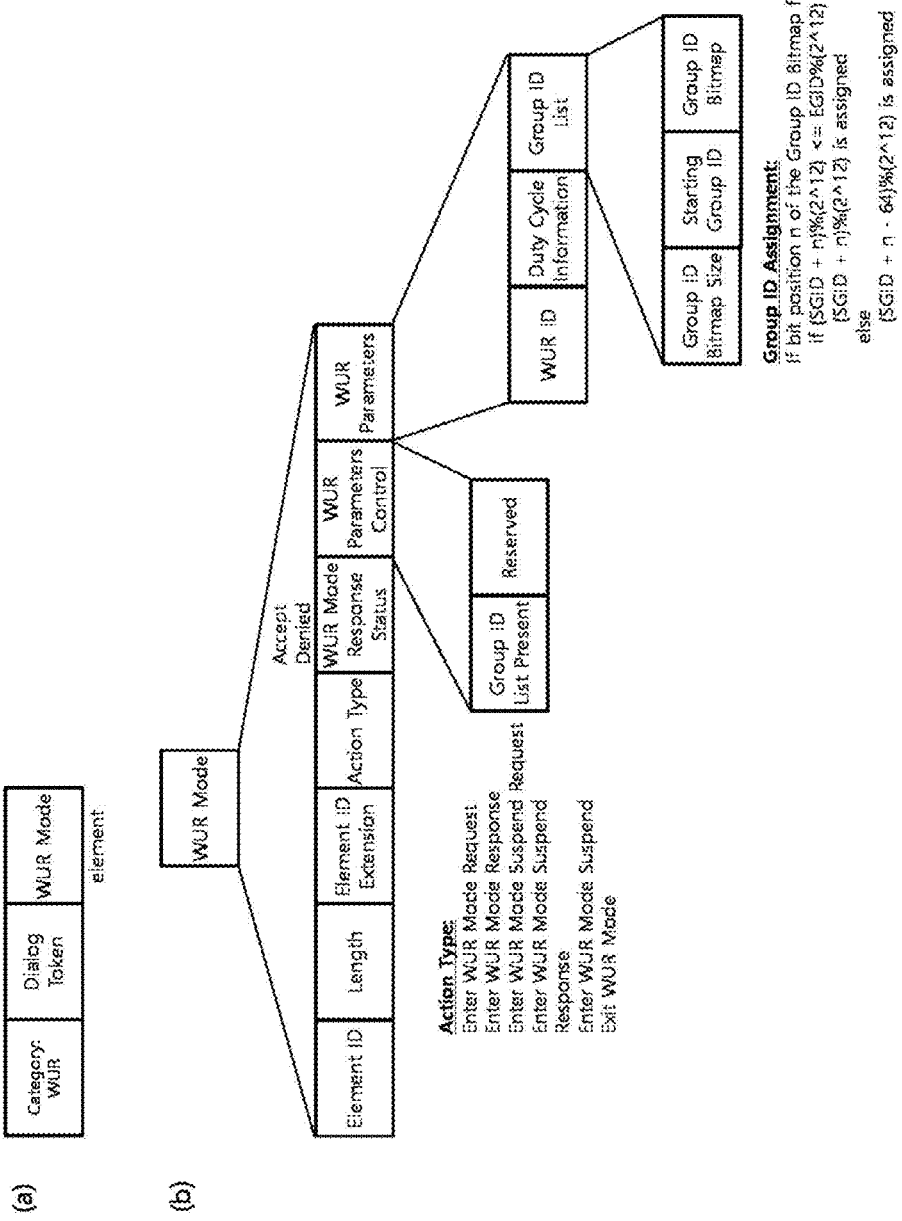
FIG. 11 illustrates an exemplary configuration of a WUR action frame and an exemplary configuration of a WUR mode element.

FIG. 11 shows that a wireless communication terminal and a base wireless communication terminal according to an embodiment of the present invention perform negotiations for WUR-related operations and perform WUR-related operations.

The base wireless communication terminal and the wireless communication terminal may exchange information on whether to support WUR operation in a link setup procedure. Specifically, the wireless communication terminal may transmit a WUR capability element to the base wireless communication terminal through a probe request frame, an authentication request frame, and an association request frame. The WUR capability element is an element indicating the capabilities supported by the wireless communication terminal in relation to WUR operation. In addition, the wireless communication terminal may transmit a WUR capability element to the base wireless communication terminal using a separate action frame. In addition, the base wireless communication terminal and the wireless communication terminal may transmit a WUR mode element including information on WUR operation-related parameters in a link setup procedure. In addition, the base wireless communication terminal and the wireless communication terminal may transmit WUR mode elements through an action frame. The WUR mode element will be described in detail with reference to FIG. 11.

The wireless communication terminal may perform WUR-related operations after connection with the base wireless communication terminal. When the wireless communication terminal intends to enter the PCR doze state, the wireless communication terminal may transmit a WUR action frame to the base wireless communication terminal. WUR action frames are exchanged to configure parameters related to WUR operation of the wireless communication terminal and the base wireless communication terminal. WUR action frames can be exchanged through PCR. Further, the WUR action frame may request an ACK from the recipient of the WUR action frame. When it is determined that the base wireless communication terminal receiving the WUR action frame needs to change or check the parameters related to the WUR operation, the base wireless communication terminal may transmit an additional WUR action frame to the base wireless communication terminal. The parameter related to the WUR operation may include at least one of a WUR duty-cycle period and a length of on duration. The exchange process of the WUR action frame may be repeated until the configuration of parameters related to the WUR operation is completed. When the parameter agreement related to the WUR operation is completed, the wireless communication terminal may change the power management mode to the power save mode and enter the PCR doze state.

When the wireless communication terminal of the PCR doze state receives a wake-up frame indicating a WUR station identifier (WUR STA ID) that identifies the wireless communication terminal or a WUR group identifier (WUR Group ID) that identifies a plurality of wireless communication terminals including the wireless communication terminal, the wireless communication terminal stores the information indicated by the wake-up and turns on the PCR transceiver. Specifically, the wireless communication terminal stores the information indicated by the wake-up and transmits a signal for turning on the PCR transceiver to the PCR transceiver. When the PCR transceiver is turned on, the wireless communication terminal may transmit information obtained from the wake-up frame to the PCR transceiver. In this case, the information obtained from the wake-up frame may include at least one of the packet number and Timer Synchronization Function (TSF) described above.

After the PCR transceiver is turned on, the wireless communication terminal may transmit an awake indication to the base wireless communication terminal. In this case, the wireless communication terminal may indicate the first transmission frame to the base wireless communication terminal through the PCR transceiver after the PCR transceiver wakes up. The awake frame may be a frame indicating that the PCR transceiver of the wireless communication terminal transmitting the awake frame is in the awake state. This is because the base wireless communication terminal needs to check whether the wireless communication terminal wakes up successfully.

Specifically, when a WUR PPDU is transmitted through WUR, 1 bit is transmitted through one OFDM symbol. Therefore, the transmission time of the WUR PPDU through WUR is very long. In addition, PCR transition delay, which is the time required to turn on the PCR transceiver in the PCR doze state, may also be a relatively long time. Therefore, even if the wireless communication terminal fails to wake up, when the base wireless communication terminal attempts transmission through PCR, the wake-up process needs to be performed again and it takes a relatively long time again until the wireless communication terminal wakes up. The wireless communication terminal can reduce the time required to transmit the awake frame by transmitting the awake frame using PCR rather than WUR. The wireless communication terminal may transmit an awake frame according to a channel access method for PCR.

The awake frame may be a separate control frame defined for the WUR operation. In addition, the awake frame may be a frame used in an existing wireless LAN standard, such as a PS-poll frame. When the base wireless communication terminal wants to receive an awake frame after designating a specific wireless time, the wireless communication terminal may attempt channel access for awake frame transmission after a corresponding time elapses after wake-up. In this case, the wireless communication terminal may obtain information on a specific time through the WUR capability element. As described above, the WUR capability element may be transmitted through a probe request frame, an authentication request frame, and an association request frame. Also, the wireless communication terminal may obtain information on a specific time through a WUR action frame.

The base wireless communication terminal receiving the awake frame may transmit an awake response frame (hereinafter referred to as an 'AW response frame') to the wireless communication terminal. The AW response frame may be an immediate response frame. Specifically, the AW response frame may be an ACK frame. Further, the AW response frame may be a separately defined control frame for WUR operation. Further, the AW response frame may be QoS data. The wireless communication terminal receiving the AW response frame can perform a general PCR operation.

When the base wireless communication terminal does not receive an awake frame from a time point of transmitting a wake-up frame to a predetermined time, the base wireless communication terminal may determine that the wake-up of the wireless communication terminal fails. In this case, the base wireless communication terminal may transmit a wake-up frame to the wireless communication terminal again. In order to determine whether a predetermined time elapses, the base wireless communication terminal may configure a timer after transmitting a wake-up frame. The predetermined time may be a time longer than the sum of the PCR transition delay and the NAVSyncDelay value of the wireless communication terminal. NAVSyncDelay indicates a time during which the transmission of the wireless communication terminal is prohibited so that the wireless communication terminal can configure the NAV based on a frame or PPDU transmitted through PCR after wake-up.

In the embodiment of FIG. 8, the first WUR station WUR STA1 and the second WUR station WUR STA2, which are APs, perform a link setup procedure. In this case, the first WUR station WUR STA1 and the second WUR station WUR STA2 exchange WUR capability elements and WUR mode elements. In addition, the second WUR station WUR STA2 transmits a WUR action frame to the first WUR station, WUR STA1 to enter the WURX doze state. The first WUR station WUR STA1 and the second WUR station WUR STA2 exchange action frames to configure WUR operation-related parameters. When the first WUR station WUR STA1 has data to be transmitted to the second WUR station WUR STA2, the first WUR station WUR STA1 transmits a wake-up frame to the second WUR station WUR STA2. The second WUR station WUR STA2 receives the wake-up frame and turns on the PCR transceiver. In this case, it takes as long as the PCR switching delay until the PCR transceiver is turned on. After the PCR transceiver is turned on, the second WUR station WUR STA2 transmits an awake frame to the first WUR station, WUR STA1. The first WUR station WUR STA1 transmits an AW response frame to the second WUR station WUR STA2. Through these operations, the wireless communication terminal can enter the PCR doze state and wake-up again.

Hereinafter, the format of the WUR capability element described with reference to FIG. 8 will be described in detail with reference to FIG. 9. FIG. 9 illustrates a format of a WUR capability element according to an embodiment of the present invention. The WUR capability element may follow the format of the general extension element of the 802.11 standard. Specifically, the WUR capability element may include an Element ID field, a Length field, and an Element ID extension field. Further, the WUR capability element may include information indicating a frequency band through which the wireless communication terminal transmitting the WUR capability element can transmit and receive WUR frames. Specifically, the WUR capability element may include a Supported Bands field. The Supported Bands field may include bits corresponding to each of a plurality of frequency bands. For example, the Supported Bands field may include at least one bit indicating whether WUR frame transmission/reception is possible through the first frequency band. Furthermore, the Supported Bands field may include at least one bit indicating whether WUR frame transmission/reception is possible through the second frequency band. In this case, the first frequency band and the second frequency band may be different from each other. Also, the plurality of frequency bands may include frequency bands of 2.4 GHz and 5 GHz. In addition, when the terminal transmitting the Supported Bands field is a base wireless communication terminal, the Supported Bands field may be used as a reserved field.

In addition, the WUR capability element may further include WUR capability information. For example, the WUR capability element may include PCR transition delay information, which is the time required for the wireless communication terminal that transmits the WUR capability element to turn on the PCR transceiver in the PCR doze state. The base wireless communication terminal transmitting the wake-up frame may determine whether the wake-up failure is based on a time longer than the sum of the PCR transition delay and the time required to transmit the awake frame. After transmitting the wake-up frame, the base wireless communication terminal may configure a timer having a period longer than the sum of the PCR transition delay and the time required to transmit the awake frame. When the timer expires, the base wireless communication terminal may determine that the wake-up fails.

The WUR capability element may include a NAVSyncDelay field. The NAVSyncDelay field may include the individual NAVSyncDelay of a wireless communication terminal described above with reference to FIG. 8. According to another embodiment, the NAVSyncDelay may be included in a single field together with the above-described PCR transition delay information. For example, the WUR capability element may include a field indicating a value obtained by adding the NAVSyncDelay to the PCR transition delay.

The WUR capability element may include information indicating whether the wireless communication terminal that transmits the WUR capability element can receive a WUR frame of variable length. Specifically, the WUR capability element may include a VL WUR Frame Support field. When the VL WUR Frame Support field is activated, the wireless communication terminal may receive a WUR frame of variable length. Conversely, when the VL WUR Support field is deactivated, the wireless communication terminal can receive only the fixed length WUR frame transmitted in a predefined length without a Frame Body. In this case, the fixed length WUR frame may be referred as the minimum length (ML) wake-up frame.

The WUR capability element may include a WUR Group IDs Support field. The WUR Group IDs Support field may indicate whether the wireless communication terminal transmitting the WUR capability element can receive the WUR frame identified by the group ID. The base wireless communication terminal may transmit a WUR frame identifying the recipient with a unique WUR STA ID to the wireless communication terminal signaling that the WUR frame identifying the recipient by the group ID cannot be received through the WUR Group IDs Support field. The base wireless communication terminal cannot transmit the WUR frame identifying the recipient by the WUR group WUR ID to the wireless communication terminal signaling that the recipient cannot receive the WUR frame identifying the recipient by the group ID through the WUR Group IDs Support field.

In addition, the WUR Group IDs Support field may indicate the maximum number of WUR group IDs that can be processed by the wireless communication terminal that has transmitted the WUR capability element. The base wireless communication terminal may allocate a WUR group ID of a maximum number or less that the corresponding wireless communication terminal signals through the group-address WUR frame information to the wireless communication terminal that transmits the WUR capability element. In addition, the base wireless communication terminal cannot allocate a WUR group ID of more than the maximum number that the corresponding wireless communication terminal signals through the group-address WUR frame information to the wireless communication terminal that transmits the WUR capability element. Here, the size of a group ID bitmap may be determined based on the maximum number of WUR group IDs that can be processed by the wireless communication terminal. A base wireless communication terminal may use the group ID bitmap to transmit a WUR group ID allocated to a specific wireless communication terminal. Furthermore, the wireless communication terminal may obtain WUR STA ID of the wireless communication terminal based on the size of a group ID bitmap. In this case, the base wireless communication terminal may not separately transmit the WUR STA ID of the wireless communication terminal.

The WUR capability element may include information indicating whether the wireless communication terminal transmitting the WUR capability element supports Message Integrity Check (MIC) operation. This information may be referred to as a Protected WUR Frame Support field. The base wireless communication terminal may transmit a WUR frame using the MIC instead of the FCS to the wireless communication terminal signaled to support MIC operation through the Protected WUR Frame Support field. The base wireless communication terminal may not be allowed to transmit the WUR frame using the MIC instead of the FCS to the wireless communication terminal signaling not to support the MIC operation through the Protected WUR Frame Support field. A wireless communication terminal supporting MIC can detect an external attack or the like through MIC operation. In this case, the wireless communication terminal may transmit an action frame requesting a new WUR STA ID to the base wireless communication terminal.

Hereinafter, a WUR operation element including parameters related to WUR operation of the wireless communication terminal will be described with reference to FIG. 10. FIG. 10 illustrates a configuration of a WUR operation element according to an embodiment of the present invention. The WUR operation element may include parameters related to the WUR operation that the base wireless communication terminal is operating in the BSS. Parameters signaled through the WUR operation element may be commonly applied to wireless communication terminals operating in the WUR mode. In addition, parameters individually applied to each wireless communication terminal may be configured through a WUR mode element to be described later.

The WUR operation element may follow the general extension element format of the 802.11 standard. Specifically, the WUR capability element may include an Element ID field, a Length field, and an Element ID extension field. In addition, the WUR operation element may include a WUR operation parameter composed of WUR duty-cycle operation and related parameters.

The WUR operation element may include information indicating the minimum awake duration of the wireless communication terminal in on-duration when the WUR duty cycle is operated. This information may be referred to as minimum wake-up duration information. In this case, the minimum awake holding time may be indicated in units of 256 microseconds (us). The WUR operation element may include information indicating a unit for indicating the period of the duty cycle. This information may be referred to as WUR duty-cycle period units.

The WUR operation element may include information indicating at least one channel that the base wireless communication terminal can use to transmit the WUR frame. This information may be referred to as WUR operating class information. The WUR operation element may include information indicating a channel being used for WUR frame transmission among at least one available channel. This information may be referred to as WUR channel information.

The WUR operation element may include information related to a WUR beacon frame reception period. Specifically, the WUR operation element may include information indicating the number of time units between successive target WUR beacon transmission times (TWBTTs). In addition, the WUR operation element may include information indicating a target WUR beacon transmission time that arrives most quickly based on the current time point. In addition, the WUR operation element may include additional WUR parameter fields. For example, the WUR parameter field may include a PCR BSS parameter update counter value that the base wireless communication terminal inserts and transmits in a WUR beacon frame.

The WUR operation element may include a WUR Connectivity Timeout field. The WUR Connectivity Timeout field may indicate a maximum time during which the wireless communication terminal is able to maintain a WUR mode without exchanging frames through PCR with the base wireless communication terminal. In the WUR mode, the wireless communication terminal may operate in a PCR doze state. For example, the wireless communication terminal operating in the WUR mode may maintain the PCR doze state except when receiving a wake-up frame from the base wireless communication terminal or attempting to perform uplink transmission. The wireless communication terminal according to an embodiment of the present invention may configure a timer for maintaining the PCR doze state without exchanging PCR frames with the base wireless communication terminal. This is because when the wireless communication terminal maintains the PCR doze state for a long time, it may be difficult for the base wireless communication terminal to identify whether the wireless communication terminal is outside a BSS corresponding to the base wireless communication terminal.

When the base wireless communication terminal does not exchange PCR frames with the corresponding wireless communication terminal until the timer indicated by the WUR Connectivity Timeout field expires, the base wireless communication terminal may determine that a connection to the corresponding wireless communication terminal has lost. Furthermore, when the base wireless communication terminal fails to receive a PCR frame from the corresponding wireless communication terminal until the timer expires, the base wireless communication terminal may discard information about association with the wireless communication terminal. In detail, the base wireless communication terminal may transmit a wake-up frame to the wireless communication terminal. Next, the base wireless communication terminal may transmit a disassociation request frame for requesting disassociation to the wireless communication terminal via a PCR. Alternatively, the base wireless communication terminal may suspend transmission of the disassociation request frame until a timer for determining a transmission failure of a transmitted wake-up frame expires. In this case, when a response is not received from the wireless communication terminal until the timer for determining a transmission failure of a wake-up frame expires, the base wireless communication terminal may discard the information about association with the wireless communication terminal. Alternatively, the base wireless communication terminal may disassociate from the wireless communication terminal immediately when the timer indicated by the WUR Connectivity Timeout field expires.

According to an embodiment, when the wireless communication terminal requires a continuous connection to the base wireless communication terminal, the wireless communication terminal may attempt to transmit a PCR frame before the timer indicated by the WUR Connectivity Timeout field expires. When the wireless communication terminal fails to transmit a frame before the timer expires, the wireless communication terminal may determine that the wireless communication terminal has been disconnected from the base wireless communication terminal. The timer indicated by the WUR Connectivity Timeout field may be updated when PCR frames have been successfully exchanged between the wireless communication terminal and the base wireless communication terminal. Furthermore, when the wireless communication terminal enters the WUR mode, the timer indicated by the WUR Connectivity Timeout field may be configured from a time at which the wireless communication terminal transmits a response frame Ack for an action frame for approving entry of the wireless communication terminal to the WUR mode.

Hereinafter, a WUR action frame transmitted from the wireless communication terminal to set a parameter related to a WUR operation will be described with reference to FIG. 11. Furthermore, a WUR mode element used to set the parameter related to the WUR operation will also be described. FIG. 11 illustrates an exemplary configuration of a WUR action frame and an exemplary configuration of a WUR mode element.

According to an embodiment of the present invention, the wireless communication terminal may transmit the WUR mode element to the base wireless communication terminal to set the parameter related to the WUR operation. As described above, the wireless communication terminal may transmit the WUR mode element during a link setup process. Furthermore, the wireless communication terminal may transmit the WUR mode element through an action frame.

FIG. 11A illustrates a format of the WUR action frame according to an embodiment of the present invention. The format of the WUR action frame may comply with a general action frame format of a 802.11 standard. Here, a Category field of the WUR action frame may be set to WUR. Furthermore, the WUR action frame may include a Dialog Token field and a WUR mode element field. A Dialog Token value may indicate a transmission order of WUR action frames transmitted sequentially. The WUR mode element may include a parameter related to operation of the wireless communication terminal in the WUR mode. For example, the wireless communication terminal may transmit the WUR mode element through the WUR action frame.

FIG. 11B illustrates an exemplary format of the WUR mode element according to an embodiment of the present invention. The WUR mode element may include information indicating a role of the WUR action frame. The information indicating the role of the WUR action frame may be signaled through an Action Type field. The wireless communication terminal and the base wireless communication terminal, which have changed WUR action frames, may perform operations according to the Action Type fields of the exchanged WUR action frames. The Action Type field may indicate, for each operation, any one of Enter WUR Mode Request/Response, Enter WUR Mode Suspend Request/Response, Enter WUR Mode Suspend, and Enter WUR Mode.

The WUR mode element may include information indicating a response to values included in a previously received first WUR mode element. This information may be signaled through a WUR Mode Response Status field. Here, the wireless communication terminal which has transmitted the first WUR mode element may be referred to as a requesting terminal. Furthermore, the wireless communication terminal which receives the first WUR mode element from the requesting terminal and transmits a new second WUR mode element as a response to the first WUR mode element may be referred to as a response terminal. Here, the requesting terminal may be either AP or non-AP station. Likewise, the response terminal may be either AP or non-AP station. The WUR Mode Response Status field may be set to Accept or Denied.

The WUR mode element may include information indicating a configuration of following WUR parameters. This information may be referred to as WUR parameters Control. For example, a WUR parameters Control field may include a Group ID List Present field indicating that there is WUR group ID allocation to the wireless communication terminal which has transmitted the WUR mode element. According to an embodiment, when the Group ID List Present is activated, a following WUR parameter field may include a Group ID List field indicating a WUR group ID allocated to the wireless communication terminal.

The WUR mode element may include WUR mode related parameters indicated in the WUR parameters Control field. For example, the WUR mode element may include information indicating a WUR identifier allocated to the wireless communication terminal. Furthermore, the WUR mode element may include information indicating a parameter related to a WUR duty-cycle operation of the wireless communication terminal. For example, the parameter related to the WUR duty-cycle operation may include a TSF value indicating a start time of the WUR duty-cycle of the wireless communication terminal.

As described above, when the Group ID List Present is activated in the WUR Parameters Control field, the WUR mode element may include information indicating a WUR group ID allocated to the wireless communication terminal. The information indicating the WUR group ID allocated to the wireless communication terminal may be signaled in a bitmap form. The WUR mode element may include a group ID bitmap field. For example, the WUR mode element may include a Group ID Bitmap Size field indicating the size of a group ID bitmap. Here, the size of the group ID bitmap including WUR group ID information may have a value less than the maximum number of group IDs that can be processed by the wireless communication terminal. The maximum WUR group ID may be signaled through the above-described WUR capability element.

Furthermore, the WUR mode element may include a Starting Group ID (SGID) field indicating a range of a location corresponding to a WUR group ID in a bitmap. The wireless communication terminal may obtain a WUR group ID allocated to a group including the wireless communication terminal based on a Group ID Bitmap Size field value and a Starting Group ID value. The wireless communication terminal may obtain WUR group ID allocation information using a combination of an SGID value and an Ending Group ID (EGID) value. Here, the EGID may be calculated based on a signaled group ID bitmap size value and the SGID value. According to an embodiment, when a value of an nth bit is 1 in the group ID bitmap and SGID+n is less than or equal to the EGID, it may be indicated that the WUR group ID corresponding to SGID+n has been allocated to a terminal. On the contrary, when the value of SGID+n is larger than the EGID, it may be indicated that the WUR group ID corresponding to SGID+n−64 has been allocated to a terminal. The WUR group ID in WUR BSS may be any one of 64 consecutive values among 12-bit values. Here, one or more wireless communication terminals included in the WUR BSS may be terminals operating in the WUR mode. Therefore, through the above-described method, the group ID bitmap size included in the WUR mode element may be minimized.

According to an additional embodiment, the base wireless communication terminal may allocate a WUR group ID and WUR STA ID as consecutive values based on TXID in order to minimize a WUR STA ID storage space and WUR STA ID allocation complexity. When a TXID value determined based on PCR BSSID approximates to a value of 0xFFF, it may be difficult to obtain 64 consecutive values based on the TXID. In this case, an additional rule for allocating the WUR group ID and the WUR STA ID according to a location of the TXID value may be required. According to an embodiment, the base wireless communication terminal may use a modulo operation with $2^{12}$ as a divisor in order to allocate the WUR group ID. For example, when the nth value of the group ID bitmap is 1 and (SGID+n) % ($2^{12}$) is less than or equal to EGID %($2^{12}$), it may be indicated that the WUR group ID corresponding to (SGID+n) % ($2^{12}$) has been allocated to a terminal. On the contrary, when the value of (SGID+n) % ($2^{12}$) is larger than EGID % ($2^{12}$), it may be indicated that the WUR group ID corresponding to (SGID+n)−61) % ($2^{12}$) has been allocated to a terminal. In this manner, the base wireless communication terminal may allocate the WUR group ID and WUR STA ID to wireless communication terminals using the same rule regardless of the TXID value of BSS.

Figure 12:
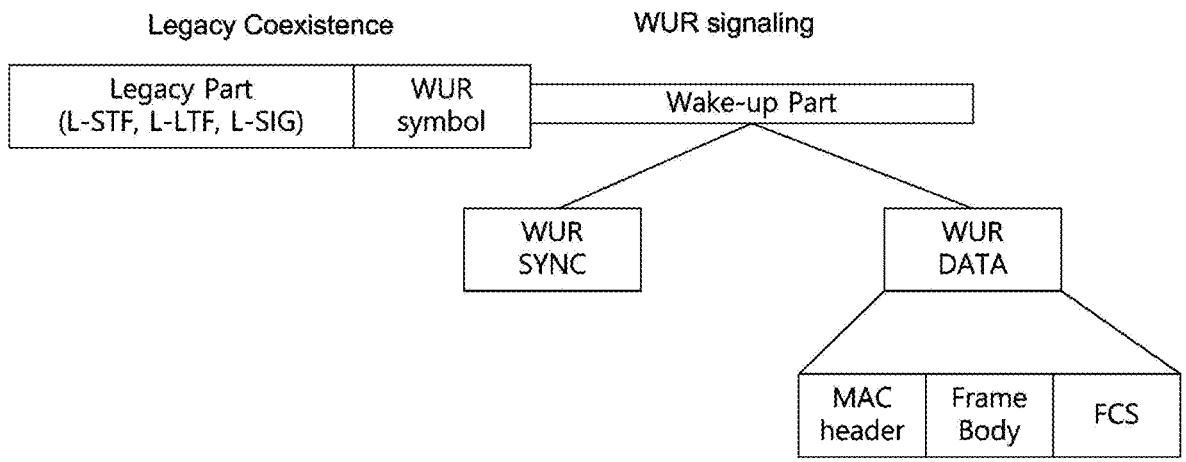
FIG. 12 illustrates a format of WUR PCLP protocol data unit (PPDU) according to an embodiment of the present invention.

FIG. 12 illustrates a format of WUR PCLP protocol data unit (PPDU) according to an embodiment of the present invention. The WUR PPDU may include a legacy part that can be demodulated by a PCR transceiver. In detail, the WUR PPDU may be divided into a legacy part that can be demodulated by the PCR transceiver and a wake-up part that cannot be demodulated by the PCR transceiver. As described above, a BSS may simultaneously include a wireless communication terminal that support WUR-based power saving and a legacy wireless communication terminal that does not support WUR-based power saving. Here, it is necessary that operation of the wireless communication terminal that supports WUR-based power saving should not interfere with operation of the legacy wireless communication terminal that is present in the BSS.

In detail, the legacy part may include a legacy preamble (L-Preamble) used in an existing 802.11 standard. In detail, the legacy preamble may include L-STF including a short training signal, L-LTF including a long training signal, and L-SIG including signaling information for the legacy wireless communication terminal. The legacy wireless communication terminal may determine a length of WUR PPDU using the legacy preamble. Accordingly, while the WUR PPDU is transmitted, the legacy wireless communication terminal may not access a frequency band in which the WUR PPDU is transmitted. In this manner, the legacy wireless communication terminal may be prevented from interfering with a signal including a WUR part subsequent to the legacy part.

Furthermore, the WUR PPDU may include a WUR symbol. For example, the WUR symbol may be one OFDM symbol subsequent to L-SIG. The WUR symbol may be an OFDM symbol modulated using a binary phase shift keying (BPSK) method. Furthermore, the WUR symbol may include information indicating a transmission type of the WUR part. For example, the transmission type may be any one of unicast, multicast, and broadcast. When the transmission type is unicast, the WUR part that will be described later may include identification information indicating a wireless communication terminal to be woken up. Here, the identification information may be an association identifier (AID) used in a PCR. Alternatively, the identification information may be a WUR identifier (WUR ID) used in a WUR. In the present disclosure, the WUR identifier may be an identifier for identifying an intended recipient of a frame transmitted/received through a waveform used in a WUR.

The wireless communication terminal that supports WUR-based power saving may demodulate the WUR part through WURx. Here, the WUR part may be divided into WUR SYNC and WUR DATA. The WUR SYNC may include a signal pattern sequence indicating WUR PPDU. In detail, the base wireless communication terminal may insert, into the WUR SYNC, a pseudo noise sequence based on WURx modulation. The base wireless communication terminal may insert the pseudo noise sequence to the WUR SYNC using OOK. A signal pattern sequence may be a pattern which is equally applied regardless of a wireless communication terminal which receives the WUR PPDU. The wireless communication terminal that supports WUR-based power saving may confirm whether a signal received through the signal pattern sequence is the WUR PPDU. Furthermore, the wireless communication terminal may determine whether the WUR PPDU has high data-rate (HDR) or low data-rate (LDR).

The WUR DATA indicates a WUR frame which is a MAC frame included in the WUR PPDU. The WUR DATA may be divided into a MAC header, a frame body field, and a frame check sequence (FCS) field. The wireless communication terminal that supports WUR-based power saving may determine a recipient of a received WUR PPDU by parsing the WUR DATA of the WUR PPDU. For example, the MAC header may include an ID field indicating the recipient of the WUR PPDU. Furthermore, the frame body field may include pieces of variable-length information according to the type of the WUR PPDU. Hereinafter, the WUR DATA of the WUR frame will be described in detail with reference to FIG. 13.

Figure 13:
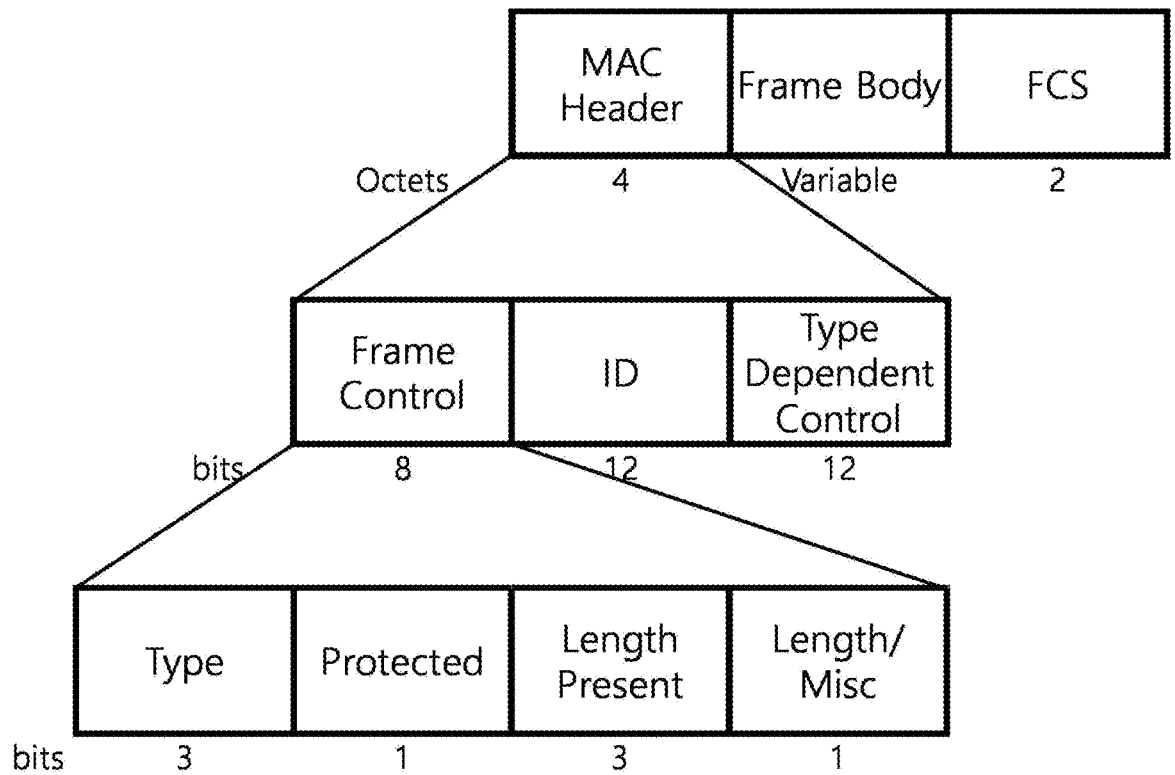
FIG. 13 illustrates a specific format of a WUR frame according to an embodiment of the present invention.

FIG. 13 illustrates a specific format of a WUR frame according to an embodiment of the present invention. The MAC header of WUR DATA described with reference to FIG. 12 may be divided into a Frame Control field, an ID field, and a Type Dependent Control field. Here, the Frame Control field indicates basic control information about a WUR frame. Furthermore, the ID field may indicate information about an address of a recipient or an address of a transmitter of the WUR frame. In detail, the ID field may include at least one of information indicating the address of the recipient and information indicating the address of the transmitter of the WUR frame. Furthermore, the Type Dependent Control field indicates variable control information which is changed according to the type of the WUR frame.

According to an embodiment, the Frame Control field may include a Type field. The Type field may indicate a frame type of the corresponding WUR frame. In detail, the Type field may indicate whether the WUR frame is a WUR beacon frame, a wake-up frame, a WUR discovery frame for discovering a BSS using WUR, or a vendor specific frame.

Furthermore, the Frame Control field may include a Protected field. The Protected field may indicate whether the WUR frame is a frame which is protected by applying additional encryption. For example, the Protected field may indicate whether a frame requires verification through a message integrity check (MIC). The Protected field may be a 1-bit field. When the Protected field indicates that the MIC is required, the wireless communication terminal which has received the WUR frame may use the MIC to confirm whether the WUR frame is valid. When the wireless communication terminal determines that the WUR frame is valid through the MIC, the FCS field of the WUR frame in which the Protected field is activated may include a value calculated through the MIC, rather than a value calculated through CRC. When the wireless communication terminal determines that the WUR frame is not valid through the MIC, the wireless communication terminal may discard the WUR frame. In detail, when it is necessary to confirm frame validity through the MIC, the FCS field of the WUR frame may indicate a message integrity value. The wireless communication terminal which has received the WUR frame may perform the MIC using a previously received encryption key.

Furthermore, the Frame Control field may include a Length Present field. The Length Present field may indicate whether the corresponding WUR frame includes the Frame Body field. When the Length Present field of the WUR frame indicates that the WUR frame does not include the Frame Body field, the WUR frame may be a fixed-length frame. When the Length Present field of the WUR frame indicates that the WUR frame includes the Frame Body field, the WUR frame may be a variable-length frame.

Furthermore, the Frame Control field may include a Length/Misc field. The Length/Misc field may indicate the length of the WUR frame or indicate additional information other than the length of the WUR frame according to whether the WUR frame corresponds to a variable-length WUR frame format. In detail, when the WUR frame corresponds to the variable-length WUR frame format, the Length/Misc field may indicate information about the length of the WUR frame. The information about the length of the WUR frame may indicate at least one of the length of the WUR frame or the length of the Frame body field. According to an embodiment, when the WUR frame corresponds to the variable-length WUR frame format, the Length/Misc field may indicate a length within a range of a preset bit number. When the Length/Misc field uses 3 bits, the Length/Misc field may indicate the length of the Frame body field of 2 to 16 octets in units of 2 octets. According to another embodiment, the length of the WUR frame may be indicated using a method of indicating the number of pieces of preset unit information included in the Frame Body field. For example, the Frame Body field may include an additional WUR identifier (e.g., WUR STA ID or WUR group ID) in addition to an identifier included in the ID field. In this case, the Length/Misc field may indicate the number of individual identifiers included in the Frame Body. When the WUR frame corresponds to the fixed-length WUR frame format, the Length/Misc field may include predefined additional information. The order of the above-described Protected field, Length present field, and Length/Misc field in the MAC header may be changed according to the implementation.

The ID field may include a WUR identifier indicating an intended recipient of the WUR frame. For example, the ID field may indicate either an ID of a transmitter or an ID of a recipient. The ID field of the WUR frame may not differentiate the ID of a transmitter and the ID of a recipient. In detail, the WUR frame may not include information indicating whether the WUR identifier indicated by the ID field is the identifier of a transmitter or the identifier of a recipient. For example, the ID field of the WUR frame may indicate any one of a transmitter ID (TXID), WUR STA ID, and WUR group ID. Here, each of the TXID, WUR STA ID, and WUR group ID may have a value determined in the single WUR identifier space that will be described later.

The wireless communication terminal may determine whether the wireless communication terminal is the intended recipient of the corresponding WUR frame based on the ID field of the WUR frame. Furthermore, when the wireless communication terminal is the intended recipient of the received WUR frame, the wireless communication terminal may perform a follow-up operation according to the received WUR frame. Here, a method of determining WUR identifiers to be inserted into the ID field and a method for the wireless communication terminal to interpret the ID field will be described in detail with reference to FIGS. 14 to 18.

According to an embodiment, the type of an identifier included in the ID field may be changed according to a role of the WUR frame. For example, when the WUR frame indicates individual wake-up of a single wireless communication terminal, the ID field of the WUR frame may include WUR STA ID for identifying a specific wireless communication terminal. In detail, upon receiving a wake-up frame including the WUR STA ID indicating the wireless communication terminal, the wireless communication terminal may wake up the PCR transceiver. The base wireless communication terminal may allocate, to each of a plurality of wireless communication terminals associated with the base wireless communication terminal, different WUR identifiers (WUR STA IDs) for identifying each of the plurality of wireless communication terminals.

Furthermore, when the WUR frame is a WUR beacon frame, the ID field may include a transmitter ID (TXID) for identifying the base wireless communication terminal. When the WUR frame is a wake-up frame which is broadcast to a specific BSS, the ID field may include a specific WUR identifier for identifying the BSS. When the WUR frame is a wake-up frame for waking up a plurality of wireless communication terminals corresponding to a specific group, the ID field may indicate a WUR group ID.

According to an embodiment, when the WUR frame has a variable-length frame format, the Frame Body field of the WUR frame may include at least one WUR STA ID. In this case, the ID field may include a WUR identifier corresponding to any one of a group to which WUR identifiers included in the Frame Body field commonly belong, and a BSS and TXID to which the WUR identifiers commonly belong.

The Type Dependent Control field (TD field) may include a Counter field and a Sequence number field. In a specific embodiment, the Counter field may indicate whether a BSS related parameter is updated. For example, the Counter field may include BSS update counter information. When the wireless communication terminal receives a counter field indicating a counter value different from a previously received counter value, the wireless communication terminal may trigger PCR beacon reception. Furthermore, the Sequence number field may include information about partial timing synchronization function (TSF) for time synchronization between the base wireless communication terminal and the wireless communication terminal.

Furthermore, the TD field may be differently configured according to a protection method of the WUR frame. For example, when the above-described Protected field of the WUR frame is activated, the TD field may be differently configured according to whether a common IPN method is used to detect a replay attack. For example, when the common IPN method is used, the Counter field may be used as a reserved field, and the Sequence number field may include 8 bits of a specific location among bits indicating a TSF. On the contrary, when the common IPN method is not used, the TD field may include the Counter field including 4 bits of 12-bit PPN and the Sequence number field including 8 bits of the 12-bit PPN. Here, the PPN may indicate 12 bits of a specific location among the bits indicating the TSF.

When the WUR frame corresponds to the variable-length WUR frame format, the length of the Frame Body field may be variable. Here, the Type field may indicate that the length of the WUR frame is variable. Furthermore, a subtype field indicating a subtype of the WUR frame may indicate the length of the Frame Body field. In detail, the subtype field may indicate the length of the WUR frame based on a pre-specified information unit other than a bit unit. For example, the Frame Body field may include a plurality of subfields indicating information about each of a plurality of WUR wireless communication terminals. in detail, the Frame Body field may include a first subfield indicating information about a first WUR wireless communication terminal and a second subfield indicating information about a second WUR wireless communication terminal. Furthermore, one subfield may indicate information about a plurality of WUR STA IDs corresponding to the WUR group ID. When the Frame Body field includes a plurality of subfields indicating information about each of a plurality of WUR wireless communication terminals, the subtype field may indicate information about the length of the Frame Body field using the number of subfields. For example, when the Frame Body field includes subfields for two WUR STA IDs respectively, the subtype field may indicate that the number of subfields included in the Frame Body field is two. When the WUR frame is a WUR beacon frame and corresponds to the variable-length WUR frame format, the Frame Body field may include information about management. Here, as described above, the length of the Frame Body field may be indicated based on a pre-specified information unit. When the WUR frame corresponds to the fixed-length WUR frame format, the WUR frame may not include the Frame Body field.

The WUR frame may include the FCS field indicating a value used to verify the validity of the WUR frame. The wireless communication terminal which has received the WUR frame may determine, based on values of fields included in the WUR field and a value of the FCS field, whether an error has been included during a transmission and reception process of the WUR frame. In detail, the wireless communication terminal which has received the WUR frame generates an FCS value by performing a CRC operation based on the values of the fields included in the WUR frame, and compares the generated FCS value with the value of the FCS field. When the generated FCS value and the value of the FCS field are equal, the wireless communication terminal may determine that an error has not occurred during a transmission and/or reception process of the WUR frame. When the generated FCS value and the value of the FCS field are different, the wireless communication terminal may determine that an error has occurred during a transmission and/or reception process of the WUR frame. The WUR frame may not include an identifier of the base wireless communication terminal. Furthermore, the WUR frame may be transmitted without being encrypted. Therefore, an external wireless communication terminal may copy a field value of the WUR frame and may retransmit the WUR frame. Therefore, the external wireless communication terminal may cause power consumption by unnecessarily waking up the wireless communication terminal. To prevent this phenomenon, the following embodiment may be applied to the wireless communication terminal and the base wireless communication terminal.

In a specific embodiment, the wireless communication terminal which has received the WUR frame may generate the FCS value by performing the CRC operation in consideration of not only the values of the fields included in the WUR frame but also a value of a virtual field not included in the WUR frame. The wireless communication terminal may compare the generated FCS value with the value of the FCS field. Therefore, the base wireless communication terminal may also set the value of the FCS field by performing the CRC operation in consideration of not only the values of the fields included in the WUR frame but also a value of a virtual field not included in the WUR frame. Here, the value of the virtual field may be pre-agreed between the base wireless communication terminal and the wireless communication terminal. Furthermore, if there is no Frame Body field of the WUR frame, the wireless communication terminal and the base wireless communication terminal may presume that the virtual field is located behind the MAC header when generating the FCS value. Furthermore, if there is the Frame Body field of the WUR frame, the wireless communication terminal and the base wireless communication terminal may presume that the virtual field is located behind the Frame Body field when generating the FCS value.

The virtual field may be referred to as an embedded BSSID field. The wireless communication terminal may compare the generated FCS value with the value of the received FCS field to determine whether the embedded BSSIDs match. That is, the wireless communication terminal may compare the generated FCS value with the value of the received FCS field to determine whether the embedded BSSID identifies the base wireless communication terminal associated with the wireless communication terminal. This is because even if an error does not occur during a transmission/reception process of the WUR frame, the FCS value may vary when the embedded BSSID used by the wireless communication terminal to generate the FCS does not match the embedded BSSID used to generate the value of the received FCS field.

For example, a first base wireless communication terminal may insert, into the WUR frame, the FCS value based on the BSSID of the first base wireless communication terminal. Furthermore, the wireless communication terminal may generate the FCS value using the BSSID of a second base wireless communication terminal associated with the wireless communication terminal. Here, when the first base wireless communication terminal and the second base wireless communication terminal are different, the FCS generated by the wireless communication terminal may not match the FCS value of the WUR frame. Through this operation, the wireless communication terminal may determine not only whether the WUR frame includes an error but also whether the WUR frame is one transmitted from the base wireless communication terminal associated with the wireless communication terminal.

Figure 14:
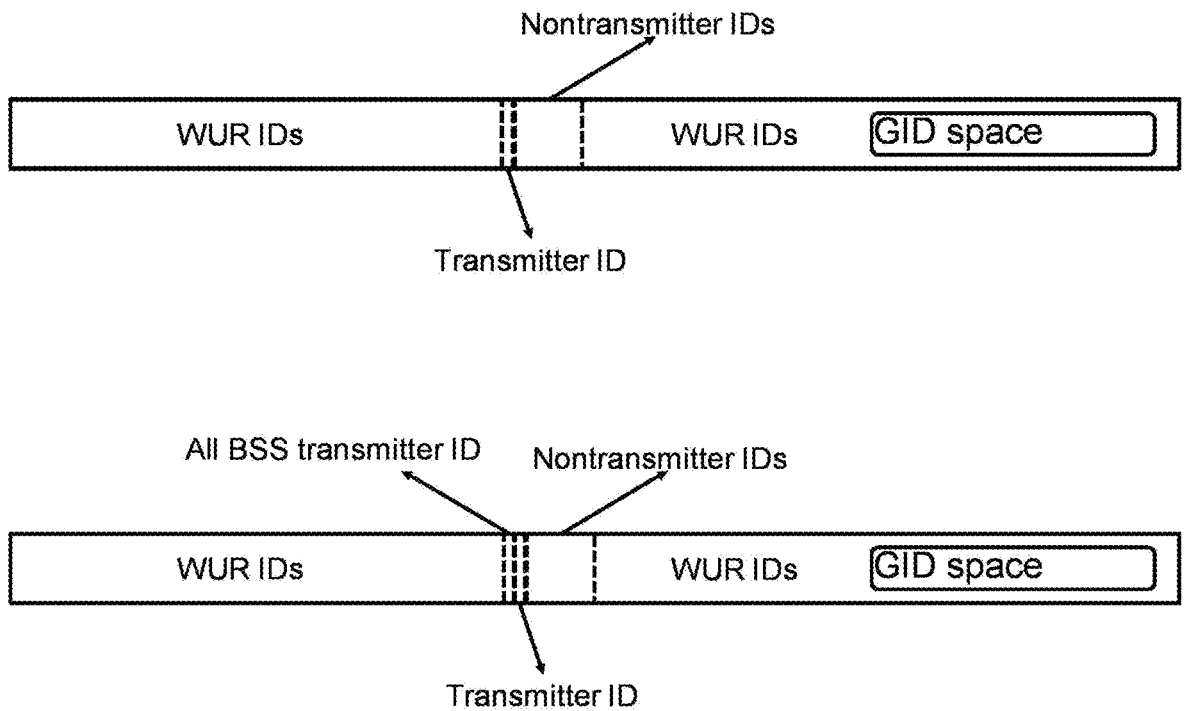
FIG. 14 is a diagram illustrating a WUR identifier space according to an embodiment of the present invention.

FIG. 14 is a diagram illustrating a WUR identifier space according to an embodiment of the present invention. According to an embodiment, WUR identifiers inserted into the ID field of the WUR frame and/or the frame body field may have a value determined in a single WUR identifier space. For example, the WUR identifier may include at least one of TXID, WUR STA ID, or WUR group ID. When the base wireless communication terminal uses a multiple basic service set identifier (BSSID) set, the WUR identifier may include at least one of TXID, WUR STA ID, WUR group ID, or nontransmitter ID (NTXID). In the present disclosure, the multiple BSSID set may represent a BSSID set including the BSSID of each of a plurality of BSSs operated by one base wireless communication terminal. In detail, the multiple BSSID set may represent a BSSID set including the BSSID of each of a plurality of BSSs which share an operating channel. Furthermore, the multiple BSSID set may represent a BSSID set including the BSSID of each of a plurality of BSSs which share a probe response frame or a beacon frame. One of TXID, NTXID, WUR STA ID, and WUR group ID may be determined based on one WUR identifier space. Furthermore, WUR identifiers which respectively differentiate unicast, groupcast, and broadcast in a BSS may be determined to have different values. When duplicate values are used as two or more WUR identifiers in the same BSS, it may be difficult for the wireless communication terminal to recognize whether the wireless communication terminal is the intended recipient of the WUR frame. This is because the ID field of the WUR frame does not differentiate the ID of a transmitter and the ID of a recipient. Furthermore, this is because the WUR frame does not include an additional field into which the WUR group ID is inserted. Here, the WUR identifier space may indicate a region of values expressible using a preset number of bits. According to an embodiment, bits equivalent to the preset number of bits may be 12 bits. For example, the TXID may have an arbitrary value among values expressible using 12 bits.

According to an embodiment, the WUR identifier for identifying a BSS may be either the TXID or at least one NTXID according to the BSSID corresponding to the BSS. When the base wireless communication terminal uses the multiple BSSID set, the base wireless communication terminal may communicate with a plurality of wireless communication terminals using a plurality of BSSs. Here, when the BSSID of a first BSS is a transmitted BSSID which is transmitted from the base wireless communication terminal to the wireless communication terminal, the WUR identifier for identifying the first BSS may be TXID. Furthermore, the BSSID of a second BSS which is operated by the base wireless communication terminal and different from the first BSS is not a BSSID which is transmitted from the base wireless communication terminal to the wireless communication terminal, the WUR identifier for identifying the second BSS may be NTXID. Here, the BSSID of the second BSS may be referred to as a nontransmitted BSSID. For example, the multiple BSSID set may be configured with one transmitted BSSID and at least one nontransmitted BSSID.

The base wireless communication terminal may determine, based on the WUR identifier space, the WUR identifier for identifying each of the base wireless communication terminal, a BSS, and the wireless communication terminal communicating with the base wireless communication terminal. The base wireless communication terminal may determine the TXID for identifying the base wireless communication terminal in the WUR identifier space. For example, the base wireless communication terminal may select an arbitrary value among the values expressible using 12 bits, and may use the selected value as the TXID. Furthermore, according to an embodiment, the base wireless communication terminal may determine the WUR identifier for identifying a BSS in the WUR identifier space. In detail, when the base wireless communication terminal operates the multiple BSSID, the base wireless communication terminal may determine the NTXID for identifying a specific BSS in the WUR identifier space.

The WUR identifier used in wireless communication through WUR is not a unique identifier of a device. Therefore, an identifier indicating a BSS to which the wireless communication terminal belongs may be the same as an identifier for identifying an adjacent overlapping BSS (OBSS). Furthermore, the same WUR identifier may be shared between wireless communication terminals belongs to adjacent different BSSs. According to an embodiment, the wireless communication terminal belonging to a specific BSS may receive a WUR beacon frame or a wake-up frame from the base wireless communication terminal of an OBSS which uses the same identifier as the BSS. In this case, the wireless communication terminal may determine whether the wireless communication terminal is not an intended recipient only after confirming the embedded BSSID through an FCS calculation for the received WUR beacon frame or wake-up frame. Therefore, unnecessary power consumption may increase. This is because the operation in which the wireless communication terminal performs the FCS calculation by detecting the WUR frame may consume a larger amount of power compared to maintaining the power of the PCR transceiver during a certain time. Furthermore, a probability that an unintended wake-up of the wireless communication terminal will be induced may increase. Therefore, it is necessary for the base wireless communication terminal to determine WUR identifiers using an efficient method. For example, a WUR identifier allocation method for reducing situations in which the same WUR identifier is used in a single WUR identifier space may be used. Hereinafter, a method of determining TXID, NTXID, WUR STA ID, and WUR group ID will be described in detail.

According to an embodiment, the WUR STA ID and WUR group ID for identifying wireless communication terminals or a wireless communication terminal group associated with the base wireless communication terminal may be determined based on the TXID of the base wireless communication terminal. Therefore, it may be advantageous that TXIDs for identifying each of different base wireless communication terminals are distributed as much as possible in the WUR identifier space. This is because a probability that overlapping WUR STA IDs or WUR group IDs will be used may increase as the difference between values of the TXIDs for identifying different base wireless communication terminals in the WUR identifier space decreases.

Figure 15:
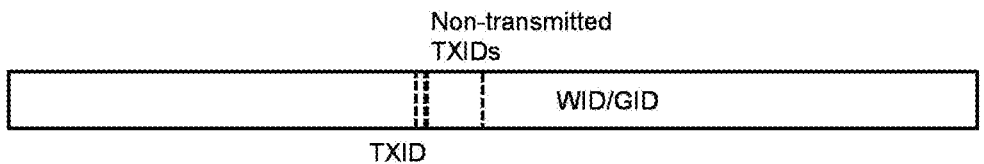
FIG. 15 is a diagram illustrating a method of obtaining TXID based on the BSSID of a base wireless communication terminal.

FIG. 15 is a diagram illustrating a method of obtaining TXID based on the BSSID of a base wireless communication terminal. According to an embodiment of the present invention, the TXID may have a value determined based on the BSSID of the base wireless communication terminal. For example, the wireless communication terminal and the base wireless communication terminal may determine the TXID for identifying the base wireless communication terminal based on the BSSID of the base wireless communication terminal.

Furthermore, when the wireless communication terminal operates the multiple BSSID set, the TXID may have a value obtained based on a transmitted BSSID among a plurality of BSSIDs. Here, the transmitted BSSID may be a unique MAC address of the base wireless communication terminal. The transmitted BSSID may be a representative BSSID that represents the multiple BSSID set operated by the base wireless communication terminal. In detail, the transmitted BSSID may be a representative BSSID used to transmit a management frame for all of a plurality of BSSs operated by the base wireless communication terminal. Here, transmission of the management frame may be performed through PCR. The multiple BSSID set may be configured with one transmitted BSSID and at least one nontransmitted BSSID. Here, the transmitted BSSID may be a BSSID used regardless of whether the base wireless communication terminal operates the multiple BSSID set. That is, when the base wireless communication terminal operates the multiple BSSID set, the transmitted BSSID of the base wireless communication terminal may indicate a BSSID of the case where the base wireless communication terminal does not operate the multiple BSSID set. The BSSID of the base wireless communication terminal may be a transmission address signaled in a MAC layer. Here, the BSSID (or transmitted BSSID) may be transmitted from the base wireless communication terminal to the wireless communication terminal through a beacon frame. Here, the beacon frame may be a PCR beacon frame transmitted through PCR. In the embodiment of FIG. 15, the BSSID may represent the transmitted BSSID.

According to an embodiment, the TXID may have a value obtained based on a portion of the transmitted BSSID. For example, the TXID may be obtained from a bit of a preset location among bits constituting the BSSID. The preset location may be a location configured based on either a most significant bit (MSB) or a least significant bit (LSB). For example, the TXID may be a preset number of MSBs among the bits of the BSSID. Alternatively, the TXID may be a preset number of LSBs among the bits of the BSSID. Here, the preset number may be 12.

According to another embodiment, the TXID may have a value obtained based on a compressed BSSID of the base wireless communication terminal. Here, the compressed BSSID may have a value obtained by performing 32-bit CRC operation on the original BSSID. For example, the TXID may be obtained from a bit of a preset location among bits constituting the compressed BSSID. The preset location may be a location configured based on either an MSB or LSB. For example, the TXID may be a preset number of MSBs among the bits constituting the compressed BSSID. Alternatively, the TXID may be a preset number of LSBs among the bits constituting the compressed BSSID. Here, the preset number may be 12.

According to another embodiment, the TXID may have a value obtained by hashing the BSSID. For example, the base wireless communication terminal may generate a plurality of sequence sets by dividing the bits representing the BSSID by a preset unit. Furthermore, the base wireless communication terminal may obtain the TXID by hashing the plurality of sequence sets. In detail, the preset unit may be 12 bits. in this case, four sequence sets may be generated. The TXID may have a value obtained by performing an XOR operation on two or more sets among the generated four sequence sets.

Figure 16:
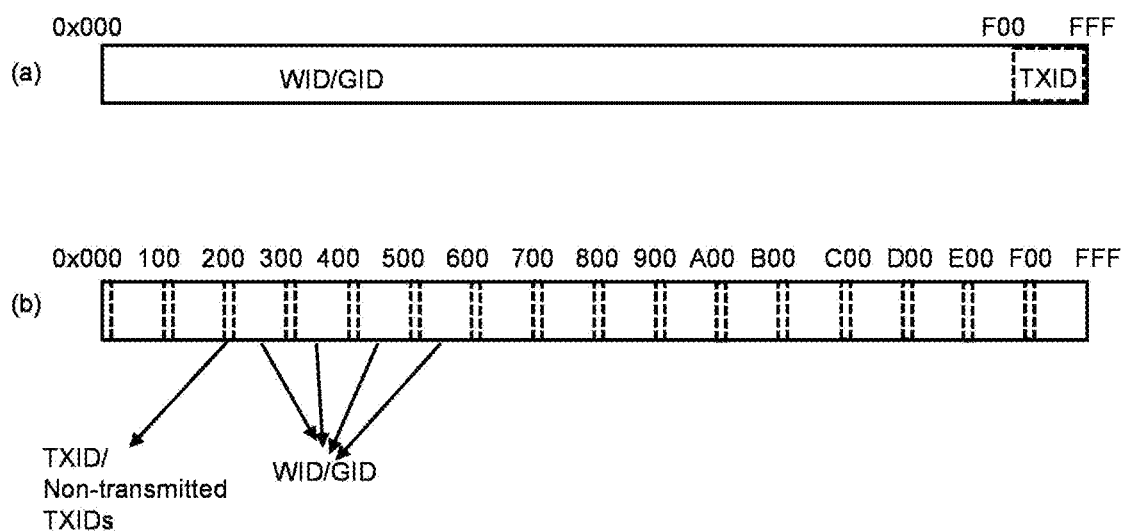
FIG. 16 is a diagram illustrating a method of obtaining TXID according to an embodiment of the present invention.

FIG. 16 is a diagram illustrating a method of obtaining TXID according to another embodiment of the present invention. According to an embodiment of the present invention, an additional TXID set including a plurality of preset values for the TXID may be managed. Here, the preset value may be a value set not to be used as a WUR identifier other than the TXID among values in the WUR identifier space. The preset value may be a 12-bit value. The TXID set may be portion of values expressible using 12 bits. The TXID of a specific base wireless communication terminal may have any one of the plurality of preset values. For example, the base wireless communication terminal may obtain the TXID by selecting any one of the plurality of preset values. In this manner, the TXID of the specific base wireless communication terminal may not be used as at least the WUR group ID of a specific group or WUR STA ID of a specific terminal belonging to an OBSS. The TXID may be a WUR identifier which is most frequently transmitted through WUR.

According to an embodiment, the plurality of preset values included in the TXID set may include a common portion. The common portion may indicate a preset location in which the plurality of preset values have the same bit value. For example, when the plurality of preset values are expressed as N bits, at least M bits of a preset location among the N bits may have the same value. Here, N may be an integer, and M may be an integer smaller than M. Referring to FIG. 16A, the common portion may be a specific number of MSBs of consecutive 0 or 1. In this case, the TXID may include a specific number of MSBs of consecutive 0 or 1. Referring to FIG. 16B, the common portion may be a specific number of LSBs of consecutive 0 or 1. In this case, the TXID may include a specific number of LSBs of consecutive 0 or 1. Referring back to FIG. 16A, when the common portion is MSB, the plurality of preset values may be located in a specific portion in the WUR identifier space. On the contrary, when the common portion is LSB, the wireless communication terminal may identify the TXID using MSB of the TXID. Therefore, the wireless communication terminal may more efficiently determine whether the TXID of a received WUR frame is the TXID of an OBSS when the common portion is LSB compared to when the common portion is LSB. For example, when it is determined that the TXID of the received WUR frame is the TXID of an OBSS through the MSB of the TXID, the wireless communication terminal may stop reception of the WUR frame to thereby further reduce power consumption.

According to an additional embodiment, when the base wireless communication terminal of a BSS complies with standards after IEEE 802.11ax, the other portion of the TXID of the base wireless communication terminal, except for the common portion, may be determined based on a BSS color of the base wireless communication terminal. For example, when the BSS color of the base wireless communication terminal is '101010', and the common portion is LSBs of six bits of consecutive 0 or 1, the TXID of the base wireless communication terminal may be '101010000000' or '101010111111'.

Figure 17:
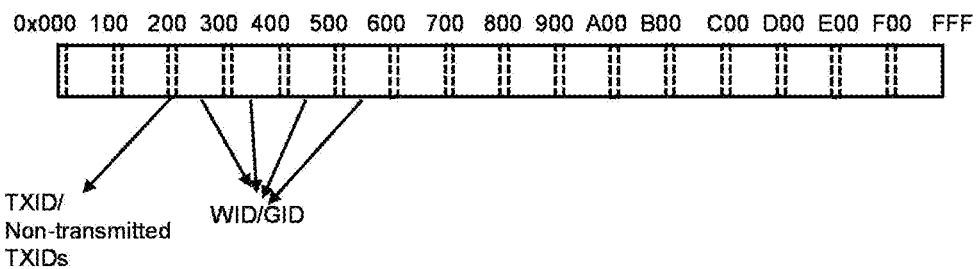
FIG. 17 is a diagram illustrating a method of obtaining TXID according to another embodiment of the present invention.

FIG. 17 is a diagram illustrating a method of obtaining TXID according to another embodiment of the present invention. According to an embodiment of the present invention, the TXID of a specific base wireless communication terminal may be determined based on the above-described common portion and the BSSID of the base wireless communication terminal. In the embodiment of FIG. 17, the BSSID may represent the transmitted BSSID. For example, the common portion of the TXID may be determined using a method that is the same as or equivalent to the method described with reference to FIG. 16. The other portion of the TXID, except for the common portion, may be determined based on the BSSID. In detail, when the common portion is LSBs or MSBs of 8 bits among 12 bits constituting the TXID, the other portion of the TXID, i.e., 4 bits, may be generated using the BSSID of the base wireless communication terminal.

According to an embodiment, the other portion of the TXID may be obtained from a bit of a preset location among bits of the BSSID. The preset location may be a location configured based on either an MSB or LSB. For example, the TXID may have a preset number of consecutive bits of the BSSID from the MSB of the BSSID. Alternatively, the TXID may have a preset number of consecutive bits of the BSSID from the LSB of the BSSID. The preset number may be a number N-M obtained by subtracting the number M of bits corresponding to the common portion from the total number N of bits constituting the TXID.

According to another embodiment, the other portion of the TXID may have a value obtained by hashing the BSSID. For example, the base wireless communication terminal may generate a plurality of sequence sets by dividing the bits representing the BSSID by a preset unit. Furthermore, the base wireless communication terminal may obtain the other portion of the TXID by hashing the plurality of sequence sets. The preset unit may be a number N-M obtained by subtracting the number M of bits corresponding to the common portion from the total number N of bits constituting the TXID. In detail, when the preset unit is 4 bits, 12 sequence sets may be generated. The other portion of the TXID may have a value obtained by performing an XOR operation on two or more sets among the generated 12 sequence sets.

In this manner, the base wireless communication terminal may estimate a region in which WUR identifiers of an OBSS are distributed in the WUR identifier space, based on the BSSID of another base wireless communication terminal belonging to the OBSS. Here, the base wireless communication terminal may receive the BSSID of the base wireless communication terminal belonging to the OBSS from the wireless communication terminal connected to the base wireless communication terminal. For example, the wireless communication terminal may receive a RCR beacon frame transmitted from the OBSS through the PCR transceiver. In this case, the wireless communication terminal may transmit, through a report procedure such as an event report, the BSSID of the base wireless communication terminal belonging to the OBSS to the base wireless communication terminal of a BSS to which the wireless communication terminal belongs.

According to an embodiment of the present invention, the TXID may be used to transmit at least one of a WUR beacon frame or a broadcast wake-up frame of a BSS operated by the corresponding base wireless communication terminal. For example, the base wireless communication terminal may insert the TXID into the ID field of at least one of the broadcast wake-up frame or the WUR beacon frame. Furthermore, the wireless communication terminal may obtain the TXID from the BSSID of the base wireless communication terminal associated with the wireless communication terminal using a method predetermined between the base wireless communication terminal and the wireless communication terminal. Here, the predetermined method may be any one of the above-described methods. The wireless communication terminal may determine whether the wireless communication terminal is the intended recipient of the WUR frame based on the obtained TXID. Furthermore, the wireless communication terminal may perform an operation indicated by the WUR frame based on a determination result.

When the base wireless communication terminal operates the multiple BSSID set, the base wireless communication terminal may communicate with a plurality of wireless communication terminals using a plurality of BSSIDs included in the multiple BSSID set. Here, the multiple BSSID set may be configured with one transmitted BSSID and at least one nontransmitted BSSID. A BSS corresponding to each of the at least one nontransmitted BSSID may be referred to as a nontransmitted BSS. As described above, a plurality of BSSs operated by one base wireless communication terminal may be identified through different WUR identifiers. Furthermore, each of the plurality of BSSs may be identified using one TXID and a specific number of NTXIDs. Here, the number of NTXIDs may be the number of nontransmitted BSSs.

Like the TXID, each NTXID is a WUR identifier for identifying a specific BSS operated by the base wireless communication terminal. Furthermore, the NTXID may be used to transmit a broadcast wake-up frame for inducing wake-up of all of the wireless communication terminals belonging to a BSS indicated by the NTXID. Here, the broadcast wake-up frame may not include a frame body field. For example, the base wireless communication terminal may insert the NTXID into the ID frame of the broadcast wake-up frame which addresses all of the wireless communication terminals associated with the BSS indicated by the NTXID. Furthermore, the base wireless communication terminal and the wireless communication terminal may obtain the NTXID of the BSS associated with the wireless communication terminal using a method predetermined between the base wireless communication terminal and the wireless communication terminal. Hereinafter, a method of obtaining the NTXID will be described in detail.

According to an embodiment of the present invention, the NTXID may be obtained based on the TXID of the base wireless communication terminal. For example, the base wireless communication terminal may determine, based on the TXID, NTXIDs respectively corresponding to one or more BSSs. The wireless communication terminal may obtain the TXID from the base wireless communication terminal. For example, the NTXID of a nontransmitted BSS corresponding to the base wireless communication terminal may be a peripheral value of the TXID of the base wireless communication terminal in the WUR identifier space. According to an embodiment, the NTXID of the nontransmitted BSS corresponding to the base wireless communication terminal may be allocated, in descending order, values that are closest to and smaller than the TXID of the base wireless communication terminal. For example, the NTXID of a specific nontransmitted BSS may be any one of k number of adjacent values that are smaller than the TXID. Here, k may be the number of nontransmitted BSSs (or nontransmitted BSSIDs) operated by the base wireless communication terminal.

According to another embodiment, the NTXID of the nontransmitted BSS corresponding to the base wireless communication terminal may be allocated, in ascending order, values that are closest to and larger than the TXID of the base wireless communication terminal. The NTXID of a specific nontransmitted BSS may be any one of k number of adjacent values that are larger than the TXID. Here, k may be the number of nontransmitted BSSs (or nontransmitted BSSIDs) operated by the base wireless communication terminal. The values from the TXID to TXID+k in the WUR identifier space may be used as values for identifying each of a plurality of BSSs operated by the base wireless communication terminal. Each of the values from the TXID to TXID+k may be used as a WUR identifier for inducing wake-up of all of the wireless communication terminals associated with each of the plurality of BSSIDs operated by the base wireless communication terminal. The base wireless communication terminal may induce wake-up of the wireless communication terminals associated with each of the plurality of BSSs operated by the base wireless communication terminal. Here, the base wireless communication terminal may use the values from the TXID to TXID+k as a WUR identifier for identifying each of the plurality of BSSs operated by the base wireless communication terminal.

In detail, the NTXID of a nontransmitted BSS may be obtained based on the TXID and a BSSID index. Here, the BSSID index includes integers from 1 to k allocated to each of nontransmitted BSSs included in the multiple BSSID set operated by the base wireless communication terminal. The BSSID index may be a value allocated by the base wireless communication terminal to each of the nontransmitted BSSs included in the multiple BSSID set. Furthermore, the base wireless communication terminal may transmit, to wireless communication terminals belonging to a specific BSS, BSSID index information allocated to the BSS. The base wireless communication terminal may determine the NTXID of each of the nontransmitted BSSs operated by the base wireless communication terminal, based on the TXID and BSSID index of the base wireless communication terminal. For example, NTXID(n) of an nth nontransmitted BSS may be TXID+n.

The wireless communication terminal may obtain, from the base wireless communication terminal, BSSID index information about a nontransmitted BSS to which the wireless communication terminal belongs. For example, the wireless communication terminal may receive, from the base wireless communication terminal, an element including the BSSID index of the nontransmitted BSS to which the wireless communication terminal belongs. Here, the element including the BSSID index may be referred to as a multiple BSSID index element. The wireless communication terminal may obtain the NTXID of the nontransmitted BSS to which the wireless communication terminal belongs, based on the TXID and the BSSID index information about the nontransmitted BSS to which the wireless communication terminal belongs. For example, the wireless communication terminal may calculate the NTXID of the nontransmitted BSS to which the wireless communication terminal belongs by adding the BSSID index to the TXID. Furthermore, the wireless communication terminal may determine whether the wireless communication terminal is the intended recipient of a received WUR frame using the NTXID of the nontransmitted BSS to which the wireless communication terminal belongs. A method of determining whether the wireless communication terminal is the intended recipient of the received WUR frame will be described later.

The NTXID of a nontransmitted BSS obtained using the above-described method may be used as a WUR identifier for inducing wake-up of all of the wireless communication terminals belonging to the nontransmitted BSS. For example, the base wireless communication terminal may insert a first NTXID of a first nontransmitted BSS into the ID field of a WUR frame. Here, the WUR frame may not include a frame body field. The WUR frame may be a frame of a fixed length fixed to a preset value. That is, the Length Present field of the WUR frame may indicate that the WUR frame does not include the frame body field. Furthermore, the frame type of the WUR frame may be a wake-up frame. The base wireless communication terminal may transmit the WUR frame including the first NTXID to trigger wake-up of wireless communication terminals belonging to the first nontransmitted BSS. The base wireless communication terminal may broadcast the WUR frame including the first NTXID to all of the wireless communication terminals belonging to the first nontransmitted BSS. When the wireless communication terminal belonging to the first nontransmitted BSS receives the WUR frame including the first NTXID, the wireless communication terminal may be woken up based on the WUR frame.

According to an additional embodiment, when the base wireless communication terminal uses the multiple BSSID set, all BSS transmitter ID (ATXID) for identifying all of the wireless communication terminals associated with the base wireless communication terminal may be additionally defined. According to an embodiment, the ATXID may have a value determined based on the TXID of the base wireless communication terminal corresponding to the ATXID. The ATXID may have a 12-bit value. For example, the ATXID may have a value adjacent to the TXID and/or NTXID of the base wireless communication terminal corresponding to the ATXID in the WUR identifier space. For example, when the NTXID is determined as a value larger than the TXID, the ATXID may be TXID−1. When the NTXID is determined as a value smaller than the TXID, the ATXID may be TXID+1. The TXID, NTXID, and ATXID may be determined as values adjacent to each other, and the order of the values in the WUR identifier space may be changed according to the implementation.

According to an embodiment of the present invention, values other than the values from the TXID to TXID+k (including the ATXID when the ATXID is included) in the WUR identifier space may be used as a WUR identifier for identifying an individual wireless communication terminal or group. According to a specific embodiment, when the common portion of the TXID is LSB as illustrated in FIGS. 16B and 17, the values other than the values from the TXID to TXID+k in the WUR identifier space may be used as the WUR STA ID or WUR group ID. Here, the WUR STA ID or WUR group ID may have an arbitrary value among the values other than the values from the TXID to TXID+k.

According to an embodiment, the WUR STA ID and WUR group ID may also be determined based on the TXID of the base wireless communication terminal. A first WUR STA ID of a first wireless communication terminal may have a value closest to the TXID of the base wireless communication terminal to which the first wireless communication terminal belongs in the WUR identifier space. In detail, the first WUR STA ID may be determined based on a first TXID of a first base wireless communication terminal associated with the first wireless communication terminal. For example, the first WUR STA ID may have a value obtained by adding a preset offset to the first TXID. Here, when the first base wireless communication terminal uses the multiple BSSID set, the preset offset may be a value larger than the number k of nontransmitted BSSs operated by the first base wireless communication terminal.

For example, when the common portion of the first TXID is LSBs of eight bits of consecutive 0 and the other portion is 0xA00, the WUR STA ID and/or WUR group ID of wireless communication terminals associated with the first base wireless communication terminal may be determined as a value between 0xA01 and 0xAFF. In this manner, situations in which WUR identifiers overlap with each other between BSSs having different transmitted BSSID may be reduced by using WUR identifiers within a concentrated range for each transmitted BSSID. This may be more efficient in a dense environment. Furthermore, the wireless communication terminal may estimate which WUR identifiers are used in an external BSS through a WUR beacon frame transmitted from the external BSS.

Furthermore, when the WUR STA ID and/or WUR group ID is allocated to the wireless communication terminals based on the TXID, the base wireless communication terminal may transmit a changed TXID to change the WUR STA ID of all of the terminals associated with the base wireless communication terminal. The base wireless communication terminal may transmit the changed TXID through a PCR broadcast WUR action frame. Here, the base wireless communication terminal may not transmit a change in the WUR STA ID allocated to each of the wireless communication terminals. The wireless communication terminals may obtain a changed WUR STA ID and/or WUR group ID based on the changed TXID.

For example, a first terminal may calculate the changed WUR STA ID and/or WUR group ID of the first terminal based on a location relationship between the ante-change WUR STA ID of the first terminal and the ante-change TXID in the WUR identifier space. In detail, when the ante-change WUR STA ID of the first terminal is 0xB03, and the TXID of the base wireless communication terminal is changed from 0xB00 to 0x700, the changed WUR STA ID of the first terminal may be determined as 0x703.

Furthermore, the preset offset may be a value within a preset range. All of the values within the preset range from the TXID of the base wireless communication terminal may be exhausted to allocate a WUR identifier associated with the base wireless communication terminal. In this case, the base wireless communication terminal may preferentially use adjacent values outside the preset range from the TXID of the base wireless communication terminal in the WUR identifier space. In detail, the base wireless communication terminal may allocate, to wireless communication terminals associated with the base wireless communication terminal, values within a range configured based on a TXID other than the TXID of the base wireless communication terminal as values for identifying each of the wireless communication terminals. For example, the base wireless communication terminal may use an additional second TXID in addition to the first TXID.

When the base wireless communication terminal uses the first TXID and the second TXID, the base wireless communication terminal may transmit the first TXID and the second TXID to all of the wireless communication terminals associated with the base wireless communication terminal. Alternatively, the base wireless communication terminal may transmit the first TXID to wireless communication terminals identified through a WUR identifier within a range configured based on the first TXID. Furthermore, the base wireless communication terminal may transmit the second TXID to wireless communication terminals identified through a WUR identifier within a range configured based on the second TXID. Furthermore, the base wireless communication terminal may transmit an additional beacon frame based on each of the first TXID and the second TXID.

According to an embodiment, the first base wireless communication terminal may allocate WUR STA ID to a plurality of wireless communication terminals associated with the first base wireless communication terminal based on AID. For example, the preset offset which is added to the first TXID may be sequentially increased. The first base wireless communication terminal may allocate, to each of the plurality of wireless communication terminals associated with the first base wireless communication terminal, WUR STA IDs which sequentially increase from the next value of (first TXID+k). In this manner, WUR STA IDs which do not overlap with each other may be allocated to each of the plurality of wireless communication terminals associated with the first base wireless communication terminal.

According to an embodiment, a value obtained by adding the preset offset to the TXID may be a value used as the TXID of a second base wireless communication terminal different from the first base wireless communication terminal or the NTXID of the second base wireless communication terminal. In this value, the first base wireless communication terminal may exclude the corresponding value from the WUR identifier space. For example, the first base wireless communication terminal may allocate, to a specific wireless communication terminal, the next value of the corresponding value in the WUR identifier space. Furthermore, an S-bit modulo operation may be used during a process of allocating the WUR STA ID or WUR group ID. This is because the WUR identifier space is limited to a range expressible using a preset number of bits. Therefore, S may be a preset number defining the WUR identifier space. According to an embodiment, S may be '12'.

According to another embodiment, the WUR STA ID may be randomly allocated to each wireless communication terminal. Also in this case, WUR STA IDs which do not overlap with each other may be configured to be allocated to the plurality of wireless communication terminals associated with the first base wireless communication terminal. The WUR group ID for identifying a group of wireless communication terminals associated with a specific base wireless communication terminal may be determined using a method that is the same as or equivalent to the above-described methods of determining the WUR STA ID.

Figure 18:
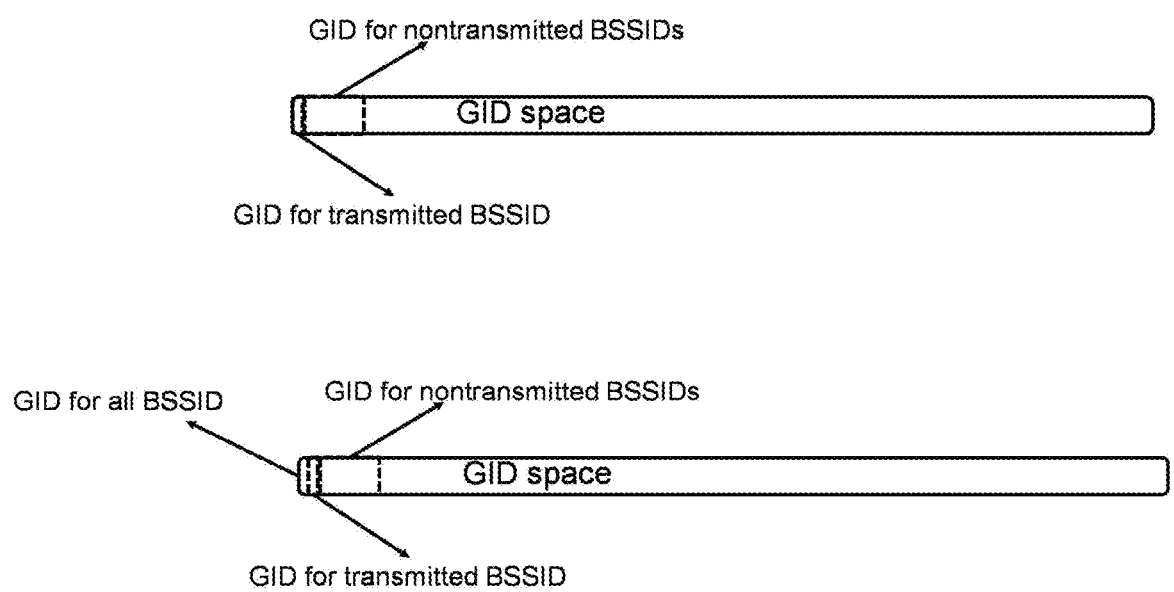
FIG. 18 illustrates a WUR group ID space according to an embodiment of the present invention.

Hereinafter, a method of determining the WUR group ID in the WUR identifier space according to another embodiment of the present invention will be described in detail with reference to FIG. 18. FIG. 18 illustrates a WUR group ID space (hereinafter referred to as "GID space") according to an embodiment of the present invention. According to an embodiment of the present invention, the WUR group ID may have a value in the GID space. Here, the GID space may be a region in the WUR identifier space configured based on the TXID of the base wireless communication terminal associated with the GID space. Here, the size of the GID space may be set to different values according to the base wireless communication terminal associated with the GID space. Furthermore, the size of the GID space may not be explicitly transmitted to the wireless communication terminal. According to an embodiment, when the ID field of a fixed-length wake-up frame includes a first WUR group ID, wake-up of all of the wireless communication terminals included in a first group identified by the first WUR group ID may be induced.

According to another embodiment, when the ID field of a variable-length wake-up frame includes a second WUR group ID, wake-up of at least some of one or more wireless communication terminals included in a second group identified by the second WUR group ID may be induced. Here, the wireless communication terminals to be induced to be woken up among the one or more wireless communication terminals included in the second group may be determined based on the Frame Body field of a wake-up frame. In this case, wireless communication terminals not included in the second group, among wireless communication terminals which have received the wake-up frame, may stop receiving the wake-up frame based on the ID field of the wake-up frame. In this manner, the wireless communication terminal may achieve an additional power saving effect.

According to an embodiment of the present invention, the base wireless communication terminal may induce wake-up of a plurality of terminals not included in a specific group. In this case, the base wireless communication terminal may transmit an individual wake-up frame to each wireless communication terminal. Alternatively, the base wireless communication terminal may transmit a VL wake-up frame having a variable length to induce wake-up of a plurality of terminals. Here, an identifier field of the VL wake-up frame may include an identifier for identifying all of the terminals associated with the base wireless communication terminal. For example, the identifier for identifying all of the terminals associated with the base wireless communication terminal may be inserted into an ID field. For example, the base wireless communication terminal may insert, into the ID field of the VL wake-up frame, any one of the TXID and ATXID of the base wireless communication terminal and NTXID for identifying each of a plurality of nontransmitted BSSs operated by the base wireless communication terminal. Furthermore, the Frame Body field of the VL wake-up frame may include a plurality of WUR STA IDs for identifying each of a plurality of wireless communication terminals to be induced to be woken up.

According to an additional embodiment, the base wireless communication terminal may manage an additional WUR group ID for the above-described situation. This is because it may be difficult to use the TXID, ATXID, and NTXID in the ID field of a wake-up frame since the TXID, ATXID, and NTXID are WUR identifiers used in a WUR beacon frame or a broadcast frame. In this case, the GID space may be utilized using a method that is the same as or equivalent to the methods of determining TXID and NTXID described above with reference to FIGS. 15 to 17. For example, a TX group ID (TGID) for identifying a group including all of the wireless communication terminals associated with the base wireless communication terminal corresponding to the TXID, an NTX WUR group ID (NTGID) for identifying a group including all of the wireless communication terminals in a BSS identified by the NTXID, and an ATX group ID (ATGID) for identifying a group including all of the wireless communication terminals in a BSS identified by the ATXID may be managed. The TGID, NTGID, and ATGID may be allocated using a method that is the same as or equivalent to the above-described TXID allocation method. Furthermore, the TGID, NTGID, and ATGID associated with one base wireless communication terminal may have adjacent values in the WUR identifier space.

As described above with reference to FIG. 8, the wireless communication terminal may receive a WUR frame from the base wireless communication terminal through WURx. Here, the wireless communication terminal may determine whether the wireless communication terminal is the intended recipient of the received WUR frame. The wireless communication terminal may determine whether the wireless communication terminal is the intended recipient of the received WUR frame based on an identifier included in the received WUR frame. In detail, the wireless communication terminal may determine whether the wireless communication terminal is the intended recipient of the received WUR frame based on at least one of the Type field, ID field, or Frame Body field of the received WUR frame. Hereinafter, a method for the wireless communication terminal to determine whether the wireless communication terminal is the intended recipient of the received WUR frame will be described in detail.

According to an embodiment, the wireless communication terminal may determine whether the wireless communication terminal is the intended recipient of the received WUR frame based on an identifier of the WUR frame. For example, the wireless communication terminal may determine whether the wireless communication terminal is the intended recipient of the received WUR frame by comparing the ID field of the received WUR frame with the WUR identifier corresponding to the wireless communication terminal. In detail, the WUR identifier corresponding to the wireless communication terminal may include at least one of the WUR STA ID of the wireless communication terminal or the WUR group ID of a group to which the wireless communication terminal belongs. Furthermore, the WUR identifier corresponding to the wireless communication terminal may include the TXID of the base wireless communication terminal associated with the wireless communication terminal.

Meanwhile, when the base wireless communication terminal associated with the wireless communication terminal uses the multiple BSSID set, the WUR identifier corresponding to the wireless communication terminal may include an identifier for identifying a BSS to which the wireless communication terminal belongs. According to an embodiment of the present invention, when the wireless communication terminal receives a wake-up frame, the wireless communication terminal may determine whether the wireless communication terminal is the intended recipient of the received wake-up frame according to whether the base wireless communication terminal associated with the wireless communication terminal uses the multiple BSSID set.

For example, when the ID field of the received wake-up frame indicates the TXID of the base wireless communication terminal associated with the wireless communication terminal, it may be determined whether the wireless communication terminal is the intended recipient of the received WUR frame according to whether the base wireless communication terminal operates the multiple BSSID set. According to an embodiment, when the BSS to which the wireless communication terminal belongs does not correspond to the multiple BSSID set, the wireless communication terminal may determine that the wireless communication terminal is the intended recipient of the wake-up frame having ID field indicating the TXID. In this case, the wireless communication terminal may determine whether the WUR frame is valid using the FCS field.

According to another embodiment, when the base wireless communication terminal operates the multiple BSSID set, each of a plurality of wireless communication terminals associated with the base wireless communication terminal may be a terminal belonging to either a transmitted BSS or nontransmitted BSSs. Here, when the BSS to which the wireless communication terminal belongs is one of the nontransmitted BSSs, the wireless communication terminal may determine that the wireless communication terminal is not the intended recipient of the wake-up frame having the ID field indicating the TXID. On the contrary, when the BSS to which the wireless communication terminal belongs is the transmitted BSS, the wireless communication terminal may determine that the wireless communication terminal is not the intended recipient of the wake-up frame having the ID field indicating the TXID. In this case, the wireless communication terminal may stop receiving the WUR frame without determining whether the WUR frame is valid using the FCS field.

In detail, the base wireless communication terminal may use the multiple BSSID set, and a first wireless communication terminal associated with the base wireless communication terminal may be a terminal belonging to the nontransmitted BSS. Here, the wireless communication terminal may receive the WUR frame having the ID field indicating the TXID of the base wireless communication terminal. When the frame type of the WUR frame is a wake-up frame, and the ID field of the WUR frame indicates the TXID of the base wireless communication terminal, the first wireless communication terminal may determine that the first wireless communication terminal is not the intended recipient of the WUR frame. In this case, the wireless communication terminal may stop receiving the WUR frame without determining whether the WUR frame is valid using the FCS field. On the contrary, when the frame type of the received WUR frame is a WUR beacon frame, the first wireless communication terminal may determine that the first wireless communication terminal is the intended recipient of the WUR beacon frame. The ID field of the WUR beacon frame will be described later in another portion of the present disclosure.

According to an embodiment, when the base wireless communication terminal uses the multiple BSSID set, each of a plurality of wireless communication terminals associated with the base wireless communication terminal may determine whether each of the plurality of wireless communication terminals is included in the intended recipient of a wake-up frame using the WUR identifier for identifying a BSS to which each of the plurality of wireless communication terminals belongs. Here, the wake-up fame may be a frame which is broadcast to all of the wireless communication terminals belonging to the corresponding BSS through WUR. For example, the first wireless communication terminal may determine whether the first wireless communication terminal is the intended recipient of the wake-up frame using a first NTXID that is a WUR identifier for identifying a first nontransmitted BSS to which the first wireless communication terminal belongs. That is, when a BSS to which the wireless communication terminal belongs is a nontransmitted BSS, the WUR identifier corresponding to the wireless communication terminal may include the NTXID for identifying the BSS to which the wireless communication terminal belongs. Here, as in the above-described method, the first wireless communication terminal may obtain the first NTXID based on the TXID. The first wireless communication terminal may determine whether the ID field of a received wake-up frame includes the first NTXID. Furthermore, when the ID field includes the first NTXID, the first wireless communication terminal may wake up the PCR transceiver of the first wireless communication terminal based on the wake-up frame.

On the contrary, when the base wireless communication terminal does not use the multiple BSSID set, and the ID field of the WUR frame indicates the TXID, a second wireless communication terminal may determine that the second wireless communication terminal is the intended recipient of the WUR frame. In this case, the wireless communication terminal may determine whether the WUR frame is valid using the FCS field. Furthermore, when the WUR frame is valid, the second wireless communication terminal may be woken up based on the wake-up frame including the TXID for identifying the base wireless communication terminal associated with the second wireless communication terminal.

Meanwhile, when the base wireless communication terminal uses the multiple BSSID set, the base wireless communication terminal may transmit a WUR beacon frame using a WUR identifier common to all BSSs corresponding to the multiple BSSID set. The WUR beacon frame may not include individual information about a WUR service but may include TSF information. This is because it may be inefficient to generate and transmit WUR beacon frames into which different identifiers are inserted for each BSS.

According to an embodiment, the common WUR identifier may be a WUR identifier corresponding to a representative BSSID (or representative BSS) that represents the multiple BSSID set. For example, the common WUR identifier may be the TXID of the base wireless communication terminal. The base wireless communication terminal may insert the TXID into the ID field of the WUR beacon frame of all BSSs operated by the base wireless communication terminal. The WUR beacon frame will be described in detail with reference to FIG. 19. In this case, the wireless communication terminal may determine whether the wireless communication terminal is the intended recipient of a received WUR frame based on the frame type of the WUR frame. In detail, the wireless communication terminal may determine, according to the frame type of the WUR frame, whether the wireless communication terminal is the intended recipient of the WUR frame including the TXID as an identifier.

According to an embodiment of the present invention, the base wireless communication terminal and the wireless communication terminal may use the multiple BSSID set, and the wireless communication terminal may be a terminal belonging to a nontransmitted BSS. In this case, the wireless communication terminal may determine whether the wireless communication terminal is the intended recipient of the WUR frame based on whether the WUR frame type is a WUR beacon frame that is periodically transmitted.

For example, when the frame type of the WUR frame is a WUR beacon frame, the wireless communication terminal may be the intended recipient of the WUR frame including the TXID as an identifier. When the wireless communication terminal receives the WUR beacon frame including the TXID as an identifier, the wireless communication terminal may determine that the wireless communication terminal is the intended recipient of the received WUR frame. When the frame type of the received WUR frame is a beacon frame, and the ID field includes the TXID, the wireless communication terminal may determine that the wireless communication terminal is the intended recipient of the received WUR frame regardless of whether a BSS corresponds to the multiple BSSID set. In this case, the wireless communication terminal may determine whether the WUR frame is valid using the FCS field. Furthermore, when the WUR frame is valid, a follow-up operation indicated by the WUR beacon frame may be performed. For example, the wireless communication terminal may update time information about the wireless communication terminal based on the WUR beacon frame. When the frame type of the WUR frame is not a WUR beacon frame, the wireless communication terminal may not be the intended recipient of the WUR frame including the TXID as an identifier. In this case, the wireless communication terminal may stop receiving the WUR frame without determining whether the WUR frame is valid using the FCS field.

Alternatively, the wireless communication terminal may determine whether the wireless communication terminal is the intended recipient of the WUR frame based on whether the WUR frame type is a wake-up frame indicating wake-up of the wireless communication terminal. For example, when the frame type of the WUR frame is a wake-up frame, the wireless communication terminal may not be the intended recipient of the WUR frame including the TXID as an identifier.

According to an embodiment, when the received WUR frame is a variable-length frame, the wireless communication terminal may determine whether the wireless communication terminal is the intended recipient of the received WUR frame based on the frame body and ID field of the WUR frame. Here, the frame type of the WUR frame may be a wake-up frame. Furthermore, a transmission method of the WUR frame may be a broadcast or groupcast method. For example, the wireless communication terminal may determine whether the received WUR frame is a variable-length frame based on the Length Present field of the received WUR frame. The Frame body field of the WUR frame may include the WUR STA ID corresponding to at least one wireless communication terminal.

In detail, when the ID field includes the TXID, the Frame body field may include a WUR identifier for identifying at least some of a plurality of wireless communication terminals associated with the base wireless communication terminal indicated by the TXID. When the ID field includes the NTXID, the Frame body field may include a WUR identifier for identifying at least some of a plurality of wireless communication terminals belonging to a BSS indicated by the NTXID. When the ID field includes the WUR group ID, the Frame body field may include a WUR identifier for identifying at least some of a plurality of communication terminals of a group indicated by the WUR group ID.

The wireless communication terminal may determine whether to receive the Frame Body field based on the ID field. For example, when the received WUR frame is a variable-length frame, and the ID field of the WUR frame includes any one of TXID, NTXID, and WUR group ID associated with the wireless communication terminal, the wireless communication terminal may determine whether the wireless communication terminal is the intended recipient of the received WUR frame based on the WUR identifier included in the Frame body field. On the contrary, when the ID field of the WUR frame is not any one of TXID, NTXID, and WUR group ID associated with the wireless communication terminal, the wireless communication terminal may stop receiving the WUR frame.

As described above, the wireless communication terminal may determine whether the wireless communication terminal is the intended recipient of the received WUR frame. Next, the wireless communication terminal may perform a preset follow-up operation based on a determination result. The wireless communication terminal may determine, based on the determination result, whether to perform an operation of determining whether the WUR frame is valid through the FCS field. According to an embodiment, when the wireless communication terminal is the intended recipient of the WUR frame, the wireless communication terminal may determine whether the WUR frame is valid using the FCS

FIELD

In detail, the wireless communication terminal may generate an FCS value based on a plurality of field values included in the WUR frame. Furthermore, the wireless communication terminal may compare the generated FCS value with the value of the received FCS field to determine whether the WUR frame has been successfully received. In addition, the wireless communication terminal may compare the generated FCS value with the value of the received FCS field to determine whether the embedded BSSID identifies the base wireless communication terminal associated with the wireless communication terminal. Here, the wireless communication terminal may generate the FCS value based on the BSSID of the base wireless communication terminal associated with the wireless communication terminal. On the contrary, when the wireless communication terminal is not the intended recipient of the WUR frame, the wireless communication terminal may not determine whether the WUR frame is valid using the FCS field. That is, the wireless communication terminal may not generate the FCS value based on the plurality of field values included in the WUR frame.

As described above, when the wireless communication terminal determines that the WUR frame has no error using the FCS field, the wireless communication terminal may perform a follow-up operation according to the WUR frame. For example, when the wireless communication terminal is the intended recipient of the WUR frame, the wireless communication terminal may perform a follow-up operation determined based on the WUR frame. Here, the follow-up operation determined based on the WUR frame may include an operation performed through the PCR transceiver of the wireless communication unit or an operation performed through WURx.

According to an embodiment, when the WUR frame is a WUR beacon frame, the wireless communication terminal may perform a follow-up operation indicated by the WUR beacon frame. For example, the wireless communication terminal may perform time synchronization based on TSF information included in the WUR beacon frame. Furthermore, when the WUR beacon frame includes an indicator for indicating reception of a PCR beacon frame, the wireless communication terminal may wake up the PCR transceiver to receive the PCR beacon frame. According to another embodiment, when the WUR frame is a wake-up frame, the wireless communication terminal may wake up the PCR transceiver of the wireless communication terminal based on the WUR frame.

Meanwhile, when the wireless communication terminal which communicates with the base wireless communication terminal through PCR is outside a transmission coverage of the base wireless communication terminal, the wireless communication terminal may determine that a connection to the base wireless communication terminal has been lost. Here, the wireless communication terminal may perform a scan procedure for associating with a new BSS. In detail, the wireless communication terminal may attempt to connect to a new base wireless communication terminal based on a beacon frame transmitted from the base wireless communication terminal.

In the PCR doze state, the wireless communication terminal is unable to receive a beacon frame transmitted through PCR. Furthermore, the wireless communication terminal is able to transmit no MAC frame through PCR unless the PCR transceiver is turned on upon reception of a wake-up frame or the PCR transceiver is turned on for PCR transmission. Therefore, it may be difficult for the wireless communication terminal which is in the PCR doze state to determine whether the wireless communication terminal is outside the transmission coverage of the base wireless communication terminal. Furthermore, the wireless communication terminal may maintain the PCR doze state even when the wireless communication terminal is outside the transmission coverage of the base wireless communication terminal. For efficient operation of the wireless communication terminal, the base wireless communication terminal may periodically transmit a WUR beacon frame through WUR. Hereinafter, a method of transmitting a WUR beacon frame will be described in detail with reference to FIG. 19, and, particularly, an operation of a wireless communication terminal related to a WUR identifier that may be included in the ID field of the WUR beacon frame will be described.

Figure 19:
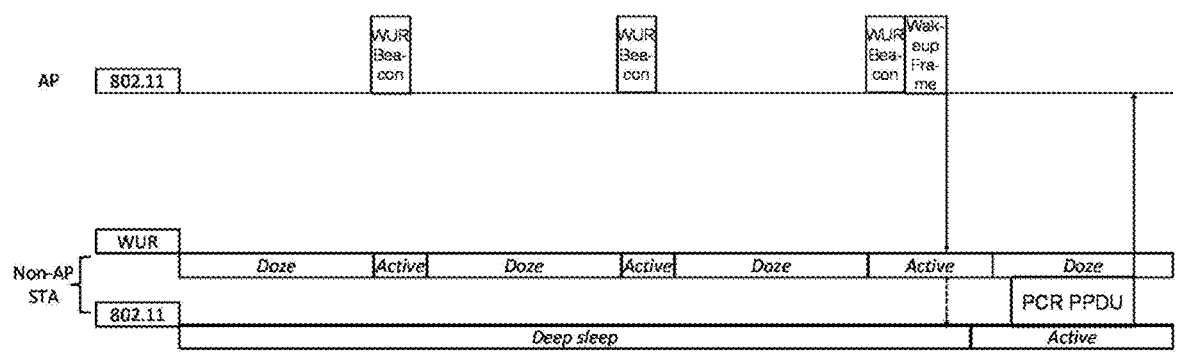
FIG. 19 is a diagram illustrating a method for a wireless communication terminal to receive a WUR beacon frame according to an embodiment of the present invention.

FIG. 19 is a diagram illustrating a method for a wireless communication terminal to receive a WUR beacon frame according to an embodiment of the present invention. As described above, the WUR beacon frame is a type of a WUR frame, and may be transmitted through WUR PPDU. The WUR beacon frame may include TSF information for enabling the wireless communication terminal which is in the PCR doze state to perform accurate time synchronization. Furthermore, the WUR beacon frame may be periodically transmitted. Here, a transmission period of the WUR beacon frame may be longer than a transmission period of the PCR beacon frame.

The WUR beacon frame may include the above-described information about BSS. For example, the WUR beacon frame may signal the same information as information signaled by the PCR beacon frame transmitted through PCR. Like a wake-up frame, the WUR beacon frame may include a legacy part and a WUR part. The legacy part of the WUR beacon frame may have the same role and function as the legacy part of the wake-up frame. The WUR part of the WUR beacon frame may include identifier information about the base wireless communication terminal.

Furthermore, the WUR beacon frame may not include an identifier of the intended recipient of the WUR beacon frame, but may include the TXID for identifying the base wireless communication terminal which transmits the WUR beacon frame. In detail, the ID field of the WUR beacon frame may indicate the TXID of the base wireless communication terminal which transmits the WUR beacon frame. Furthermore, when the wireless communication terminal receives the WUR beacon frame, the wireless communication terminal may not wake up the PCR transceiver. This is because the PCR transceiver may not be required to perform active scanning when the wireless communication terminal receives the WUR beacon frame.

When the wireless communication terminal which is in the PCR doze state has no data to be transmitted to the base wireless communication terminal, the wireless communication terminal may turn off WURx based on the transmission period of the WUR beacon frame. In detail, when the wireless communication terminal which is in the PCR doze state has no data to be transmitted to the base wireless communication terminal, the wireless communication terminal may maintain WURx in a turn-on state during a time interval in which the WUR beacon frame is transmitted and may turn off WURx during the remaining time interval. This operation of the wireless communication terminal is a WUR duty-cycle operation, and this operation mode of the wireless communication terminal may be referred to as a WUR duty-cycle mode.

Furthermore, the state in which the wireless communication terminal turns off WURx may be referred to as a WUR doze state or deep sleep state. When the base wireless communication terminal has data to be transmitted, through PCR, to the wireless communication terminal which is in the WUR duty-cycle mode, the base wireless communication terminal may transmit a wake-up frame to the wireless communication terminal immediately after transmitting the WUR beacon frame. Furthermore, when the base wireless communication terminal has data to be transmitted, through PCR, to the wireless communication terminal which is in the WUR duty-cycle mode, the base wireless communication terminal may transmit a traffic indication map (TIM) indicating presence of data to be downlink-transmitted through the WUR beacon frame.

When the wireless communication terminal fails to receive the WUR beacon frame for a certain time after the wireless communication terminal has entered the PCR doze state, the wireless communication terminal may wake up the PCR transceiver. Here, when the wireless communication terminal fails to receive the PCR beacon frame from the base wireless communication terminal connected to the wireless communication terminal through PCR, the wireless communication terminal may perform a scanning operation. In detail, the wireless communication terminal may transmit a probe request frame through PCR. When the TXID of the received WUR beacon frame is different from the TXID of the base wireless communication terminal associated with the wireless communication terminal, the wireless communication terminal may wake up the PCR transceiver.

In the embodiment of FIG. 19, the AP periodically transmits the WUR beacon frame. A station which is in the WUR duty-cycle mode maintains a turn-on state of WURx according to the transmission period of the WUR beacon frame, and maintains a WURx doze state during the other time. When the AP has data to be transmitted to the station through PCR, the AP transmits a wake-up frame to the station immediately after transmitting the WUR beacon frame. The station receives the wake-up frame, and wakes up the PCR transceiver.

Figures 20, 21:
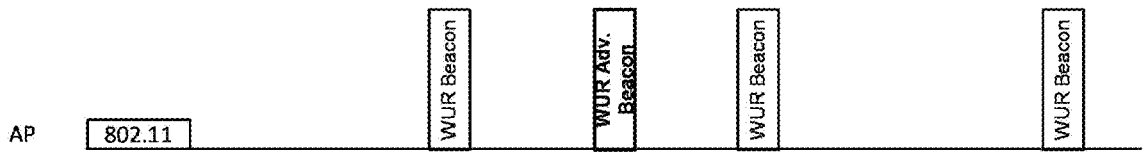
FIG. 20 is a diagram illustrating a method of transmitting a WUR A-beacon according to an embodiment of the present invention.
FIG. 21 is a diagram illustrating a method for a wireless communication terminal to report a duplicated WUR identifier according to an embodiment of the present invention.

FIG. 20 is a diagram illustrating a method of transmitting a WUR A-beacon according to an embodiment of the present invention. According to an embodiment, the wireless communication terminal may estimate WUR identifiers corresponding to an OBSS based on the TXID included in an OBSS WUR beacon frame which is transmitted by the base wireless communication terminal of the OBSS. This is because WUR identifiers for identifying wireless communication terminals of the OBSS may have values adjacent to the TXID of the base wireless communication terminal of the OBSS. Therefore, when the base wireless communication terminal of the OBSS uses the same TXID as that of the base wireless communication terminal of a BSS to which the wireless communication terminal belongs, the wireless communication terminal may report to the base wireless communication terminal that the TXID of the base wireless communication terminal overlaps with the TXID of another base wireless communication terminal. Furthermore, the wireless communication terminal may request to change the TXID or WUR STA ID.

It may be difficult for the wireless communication terminal to determine validity of an OBSS WUR beacon frame. This is because the wireless communication terminal is unable to recognize the embedded BSSID of the base wireless communication terminal of an OBSS based on the WUR beacon frame transmitted from the OBSS. According to an embodiment of the present invention, the base wireless communication terminal may also transmit the WUR beacon frame to wireless communication terminals belonging to an OBSS other than a BSS operated by the base wireless communication terminal. Here, the WUR beacon frame may include the TXID of the base wireless communication terminal. For example, the base wireless communication terminal may transmit, to wireless communication terminals belonging to the OBSS, a WUR advertisement beacon frame (hereinafter referred to as "WUR A-beacon") into which the TXID of the base wireless communication terminal is inserted.

The WUR A-beacon may not use the embedded BSSID or may use a preset embedded BSSID value (e.g., all zeros embedded BSSID) to include a CRC-executed FCS. This is because at least some of the wireless communication terminals may be unable to recognize the embedded BSSID value of the base wireless communication terminal that has transmitted the WUR A-beacon. Furthermore, the WUR A-beacon may include information for differentiating the A-beacon from the WUR beacon frame received by the wireless communication terminal from the BSS of the wireless communication terminal. For example, the WUR A-beacon may further include information indicating the type of the WUR A-beacon. The base wireless communication terminal may generate the WUR A-beacon by inserting a preset value into a portion of fields included in the WUR beacon frame. Furthermore, the base wireless communication terminal may transmit the WUR A-beacon to the wireless communication terminals of the OBSS. In detail, the base wireless communication terminal may insert a preset value (e.g., a value in which all bits are '0') other than partial TSF information into a location in which the partial TSF information included in the WUR beacon frame is inserted. The wireless communication terminal which has received the WUR A-beacon in which the preset value is inserted into the location of the partial TSF may determine validity of the WUR A-beacon through an FCS calculation. Furthermore, the wireless communication terminal may obtain the TXID of the base wireless communication terminal of the OBSS indicated by the WUR A-beacon. The WUR A-beacon may be transmitted continuously with the WUR beacon frame according to the transmission period of the WUR beacon frame of the base wireless communication terminal. According to another embodiment, at the time at which the WUR beacon frame which is in a predefined sequence is transmitted, the WUR A-beacon may be transmitted instead of the WUR beacon frame. According to another embodiment, the WUR A-beacon may be transmitted based on an additional WUR A-beacon period regardless of the period of the WUR beacon frame. Alternatively, the base wireless communication terminal, when necessary, may transmit the WUR A-beacon at an arbitrary time. Additionally, when the base wireless communication terminal uses two or more TXIDs, the base wireless communication terminal may insert, into the WUR A-beacon, all TXIDs used by the base wireless communication terminal and may transmit the WUR A-beacon.

FIG. 21 is a diagram illustrating a method for a wireless communication terminal to report a duplicated WUR identifier according to an embodiment of the present invention. As described above with reference to FIG. 20, the wireless communication terminal may obtain the OBSS TXID of the base wireless communication terminal of an OBSS. Furthermore, the wireless communication terminal may obtain range information about a WUR identifier used in the OBSS based on the OBSS TXID. Based on the range information about a WUR identifier used in the OBSS, the wireless communication terminal may determine whether WUR identifiers used in the OBSS overlap with the WUR identifier used in a BSS to which the wireless communication terminal belongs. Furthermore, the wireless communication terminal may report duplication information to the base wireless communication terminal based on a determination result. For example, when at least some of the WUR identifiers used in the OBSS overlap with the WUR identifier used in the BSS to which the wireless communication terminal belongs, the wireless communication terminal may report a duplicated WUR identifier to the base wireless communication terminal. The wireless communication terminal may report the duplicated WUR identifier to the base wireless communication terminal to induce the base wireless communication terminal to change the WUR identifier associated with the base wireless communication terminal. When the base wireless communication terminal receives a report about the duplicated WUR identifier, the base wireless communication terminal may change the WUR identifier associated with the base wireless communication terminal.

According to an embodiment, the duplication information may be transmitted through an event report frame. In detail, the wireless communication terminal may generate the event report frame including the duplication information by inserting information indicating WUR ID duplication into an Event Type field of the event report frame. Furthermore, the wireless communication terminal may transmit the event report frame including the duplication information to the base wireless communication terminal. Furthermore, an event report element of the event report frame may include at least one duplicated WUR ID determined to be duplicated.

According to another embodiment, the event report element of the event report frame may include a TXID bitmap indicating TXIDs. Here, the TXID bitmap may be a bitmap in which the OBSS TXID included in at least one WUR A-beacon received by the wireless communication terminal is indicated. Alternatively, the TXID bitmap may be a bitmap in which the BSSID of an OBSS received by the wireless communication terminal through the PCR transceiver is indicated. Meanwhile, the base wireless communication terminal which has received the event report frame may respond with a response frame Ack. Furthermore, the base wireless communication terminal may request a specific wireless communication terminal among a plurality of wireless communication terminals associated with the base wireless communication terminal to transmit the event report frame. Here, the request for and transmission of the event report frame may be transmitted/received through PCR.

Figure 22:
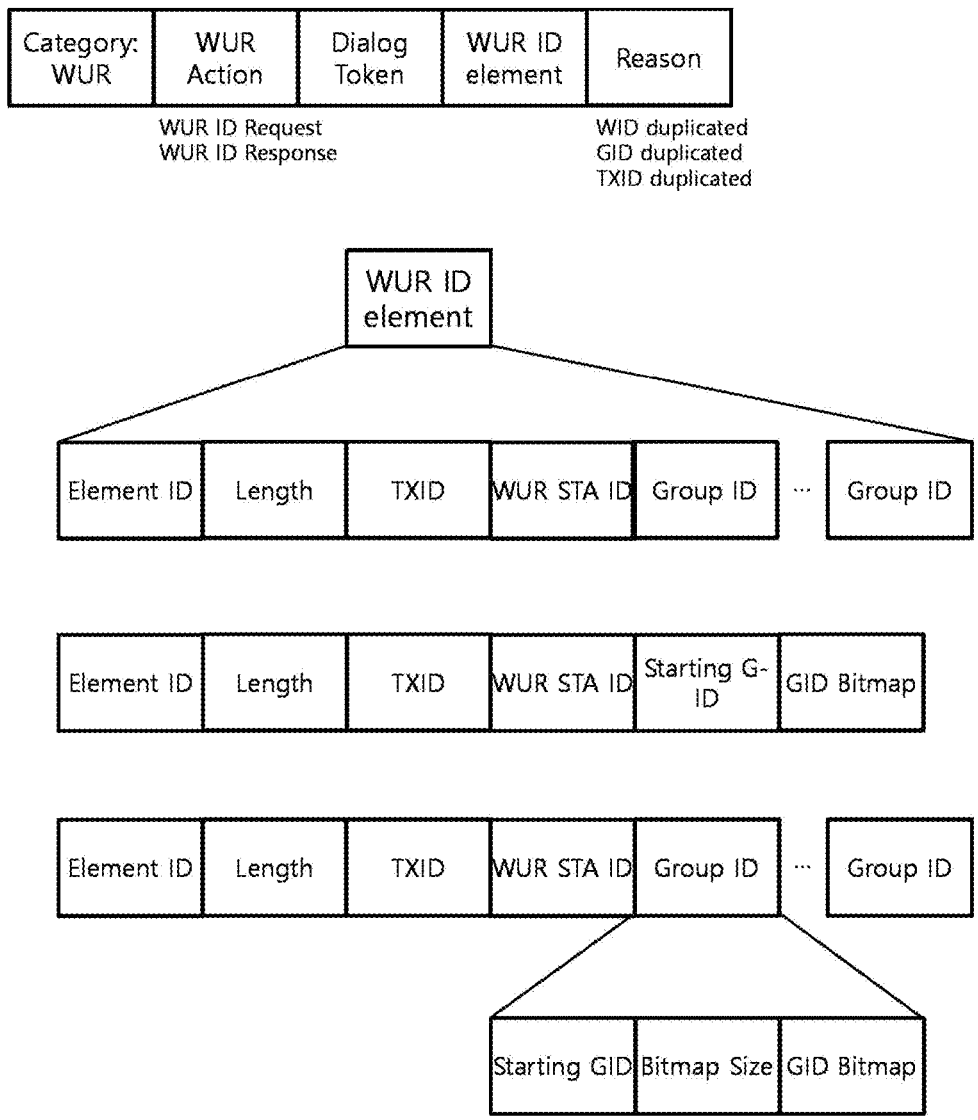
FIG. 22 illustrates a structure of a WUR ID element according to an embodiment of the present invention.

FIG. 22 illustrates a structure of a WUR ID element according to an embodiment of the present invention. During a WUR mode negotiation process, the wireless communication terminal may obtain the WUR STA ID of the wireless communication terminal, the WUR group ID for identifying a group to which the wireless communication terminal belongs, and the TXID of the base wireless communication terminal associated with the wireless communication terminal. Thereafter, when it is necessary to change a WUR identifier, the wireless communication terminal and the base wireless communication terminal may update the WUR identifier using an action frame (e.g., WUR ID Action Frame). In detail, the WUR ID Action frame may include a WUR ID element. Furthermore, the WUR ID Action frame may include a Reason field indicating a reason why the frame is transmitted. For example, the Reason field of the WUR ID Action frame may include information indicating that a WUR identifier having a value that overlaps with the WUR identifier in the corresponding BSS is used in an OBSS. Furthermore, the Reason field may include information indicating which of the WUR group ID, the WUR STA ID, and the TXID of the BSS is a duplicated WUR identifier.

The WUR ID element may comply with a format of a general extension element of a 802.11 standard. Furthermore, the WUR ID element may include fields indicating TXID, WUR STA ID, and WUR group ID after an Element ID field and a Length field. According to an embodiment, the WUR group ID field indicating a WUR group ID may include at least one WUR group ID to which the wireless communication terminal belongs. According to another embodiment, the WUR group ID field may include a starting group ID and a group ID bitmap. Here, as described above, the group ID bitmap may have a form indicating a bit corresponding to the WUR group ID of a group to which the wireless communication terminal belongs. Furthermore, the wireless communication terminal may determine the size of the group ID bitmap based on a Length value of the action frame. According to another embodiment, the WUR group ID field may include a plurality of group ID bitmaps. In this case, one starting group ID may include the WUR group ID field. In this manner, the size of one group ID bitmap may be prevented from excessively increasing.

The wireless communication terminal operating in the WUR mode may detect an external attack targeting the WUR STA ID of the wireless communication terminal or the WUR group ID in which the wireless communication terminal is included, or may detect that an external WUR BSS uses an WUR identifier which is the same as the WUR identifiers associated with the wireless communication terminal. In this case, the wireless communication terminal may transmit, to the base wireless communication terminal through the PCR transceiver, a WUR ID Request Action frame in which a WUR Action field is set to WUR ID Request. Here, the WUR ID Request Action frame may not include the WUR ID element. The WUR ID Request Action frame may include a WUR identifier for requesting a change, instead of the WUR ID element. The WUR STA ID may be periodically changed while the wireless communication terminal is operating in the WUR mode, and, when a WUR STA ID change period arrives, the wireless communication terminal may transmit the WUR ID Request Action frame for changing the WUR STA ID.

When the base wireless communication terminal receives the WUR ID Request Action frame from the wireless communication terminal, the base wireless communication terminal may instantly transmit the response frame Ack. Next, the base wireless communication terminal may transmit a WUR ID Response Action frame to the wireless communication terminal through TXOP of a later time. The WUR ID Response Action frame may include a WUR ID element. Furthermore, the WUR ID element may include changed WUR identifiers for all of the WUR identifiers requested to be changed and included in the WUR ID Request Action frame. Upon receiving the WUR ID Response Action frame from the base wireless communication terminal, the wireless communication terminal may instantly respond with the response frame Ack. Furthermore, the wireless communication terminal may update WUR identifiers based on the received WUR ID element.

Furthermore, the base wireless communication terminal may detect an external attack on the wireless communication terminal corresponding to a specific WUR STA ID or WUR group ID, or may detect that an external WUR BSS uses an WUR identifier which is the same as the WUR identifiers used in a BSS operated by the base wireless communication terminal. In this case, the base wireless communication terminal may transmit the WUR ID Response Action including a changed WUR identifier to the corresponding wireless communication terminals. The above-described WUR ID element may be transmitted/received through PCR, like the above-described other action frames. Therefore, an operation of inducing wake-up of the wireless communication terminal may be performed in advance.

Hereinafter, power save operations of the wireless communication terminal according to an embodiment of the present invention will be described by classifying the operations into an operation based on a power management subfield and an operation in which WUR is used.

Figure 23:
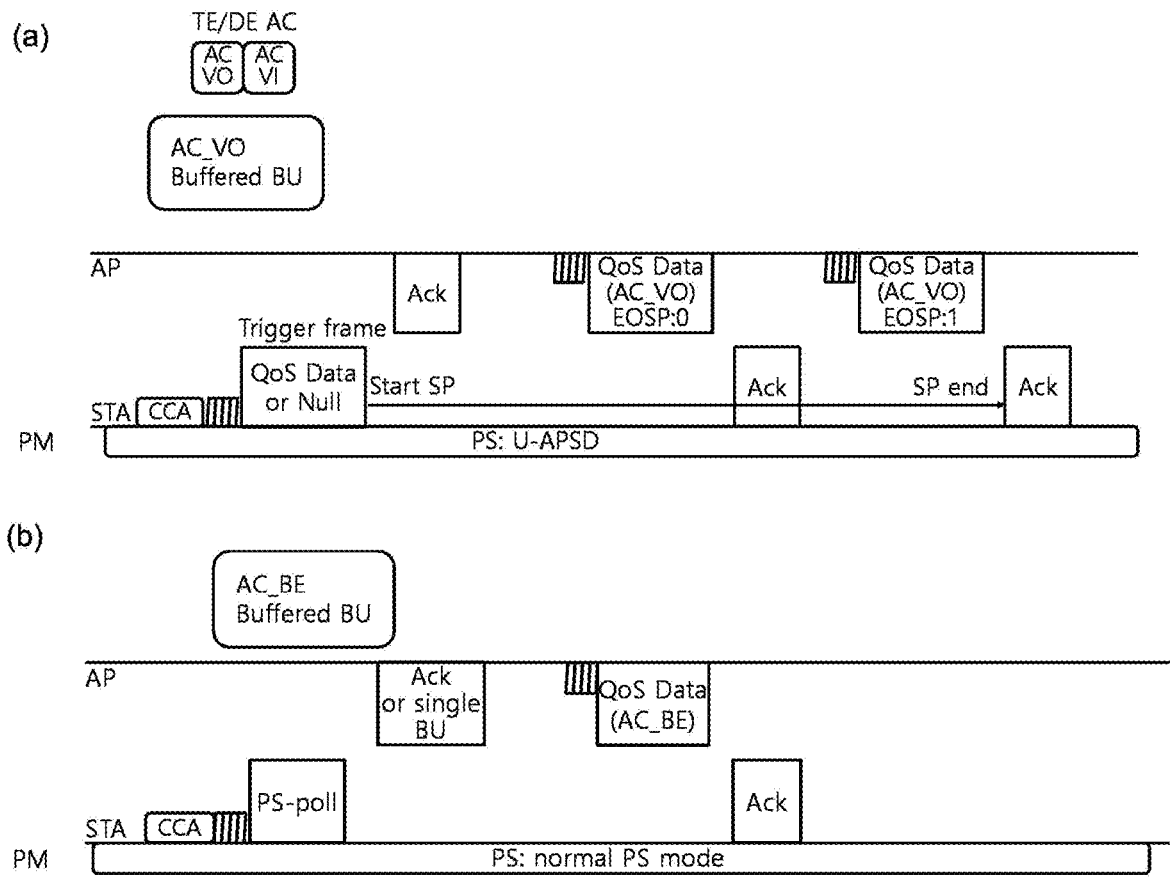
FIG. 23 is a diagram illustrating a power save operation of a wireless communication terminal according to an embodiment of the present invention.

FIG. 23 is a diagram illustrating a power save operation of a wireless communication terminal according to an embodiment of the present invention. In cases when a wireless communication terminal uses a power management function in a conventional wireless LAN, the terminal may operate in two modes, i.e., an active mode and a power save (PS) mode. In the active mode, the wireless communication terminal always maintains an awake state. Since the wireless communication terminal is unable to receive frames transmitted from the base wireless communication terminal when the wireless communication terminal is in the PCR doze state, the base wireless communication terminal is required to determine whether the wireless communication terminal is in the PCR doze state. Therefore, the base wireless communication terminal may record information indicating in which mode among the active mode and the PS mode the wireless communication terminal connected to the base wireless communication terminal operates. To this end, when the wireless communication terminal switches a power management mode, the wireless communication terminal may signal the switching of the power management mode by setting a value of a power management (PM) subfield of the Frame Control field of data which is transmitted by the wireless communication terminal.

The wireless communication terminal may switch the power management mode after completing a transmission sequence initiated by the wireless communication terminal. Furthermore, the wireless communication terminal may be limited to switching the power management mode using a transmission sequence that requests an instant response. When the wireless communication terminal transmits data in which the PM subfield is set to 1 and receives an instant response (e.g., ACK frame, BA frame) to the data, the wireless communication terminal may initiate a power save mode operation. Furthermore, when the wireless communication terminal transmits data in which the PM subfield is set to 0 and receives an instant response (e.g., ACK frame, BA frame) to the data, the wireless communication terminal may initiate an active mode operation.

According to an existing wireless LAN standard, a plurality of detailed protocols are defined for the power save mode operation. A normal power save mode and unscheduled automatic power save delivery (U-APSD) among the plurality of detailed protocols do not require an additional scheduling process.

In the power save mode, uplink transmission of the wireless communication terminal may not be restricted. In the power save mode, the wireless communication terminal may switch from the PCR doze state to a PCR awake state at any time to attempt to perform uplink transmission. However, a downlink transmission cannot be received if the wireless communication terminal is in the PCR does state when the base wireless communication terminal performs downlink transmission. Therefore, both the normal power save mode and the U-APSD define operation of the wireless communication terminal and the base wireless communication terminal based on a downlink transmission situation.

When the wireless communication terminal switches from the active mode to the PS mode in the normal power save mode, the base wireless communication terminal is unable to instantly transmit data to the corresponding wireless communication terminal. The base wireless communication terminal stores, in a buffer, data to be transmitted to the corresponding wireless communication terminal. Thereafter, the base wireless communication terminal uses a TIM element of a beacon frame to signal to the corresponding terminal that there is data to be transmitted to the corresponding terminal. The wireless communication terminal which is in the PS mode may receive the beacon frame in an awake state, and, when a bit of the TIM element, which corresponds to the AID of the wireless communication terminal, indicates that there is data to be transmitted, the wireless communication terminal may transmit a PS-poll frame to the base wireless communication terminal. Here, the wireless communication terminal may perform transmission of the PS-poll frame through an EDCS backoff scheme with AC_BE class. The base wireless communication terminal which has received the PS-poll frame may transmit either an ACK frame or DL-buffered bufferable unit (BU) to the corresponding wireless communication terminal. The wireless communication terminal which has received the ACK frame is required to maintain an awake state until the base wireless communication terminal transmits a BU in a new transmit opportunity (TXOP). When a More Data field of the BU transmitted from the base wireless communication terminal is activated, the wireless communication terminal is required to retransmit the PS-poll frame. The wireless communication terminal is required to check a beacon frame at intervals of a period specified with a delivery traffic indication map (DTIM) period.

Information indicating whether the wireless communication terminal uses the U-APSD may be configured for each AC in a link configuration step such as a (re)connection step. The AC of the wireless communication terminal which uses the U-APSD is set to trigger-enabled AC. The corresponding AC of the base wireless communication terminal is regarded as deliver-enabled AC. The wireless communication terminal may not check the AC corresponding to the trigger-enabled AC in the TIM element. The wireless communication terminal may transmit a trigger frame at any time to start a service period and trigger DL-buffered BU transmission. Here, the trigger frame is one of QoS data or null frame transmitted from the trigger-enabled AC. From the time at which an instant response to the trigger frame transmitted from the wireless communication terminal is received, the service period for the wireless communication terminal is started. In the service period, the base wireless communication terminal may transmit a buffered BU. Therefore, the wireless communication terminal is required to maintain an awake state until the time at which an end of service period (EOSP) is activated in the BU transmitted from the base wireless communication terminal or the end time of the service period. When the wireless communication terminal uses the U-APSD for partial AC, the TIM does not indicate whether there is a buffered BU of the AC. The TIM only indicates presence/absence of the buffered BU of the AC for which the U-APSD is not used. Therefore, the wireless communication terminal is required to check the TIM to receive the buffered BU of the AC for which the U-APSD is not used, and is required to follow an operation of the normal power save mode.

In the embodiment of FIG. 23A, the station receives data corresponding to AC_VO and AC_VI using the U-APSD. The station transmits the trigger frame to the AP to start the service period. The station receives, from the AP, the ACK frame for the trigger frame. The AP transmits, to the station, QoS data corresponding to AC_VO and QoS data corresponding to AC_VI. The station maintains an awake state until the service period is ended.

In the embodiment of FIG. 23B, the station receives data corresponding to AC_BE through the normal PS mode. The station receives a beacon frame from the AP, and confirms that the bit of the TIM which corresponds to the AID of the station is activated. The station transmits the PS-poll frame to the AP, and receives a BU or ACK frame from the AP. When the station receives the ACK frame for the PS-poll frame, the station maintains an awake state until QoS data is received from the AP. When the QoS data is received, the station may enter the PCR doze state again after transmitting the ACK frame.

Figure 24:
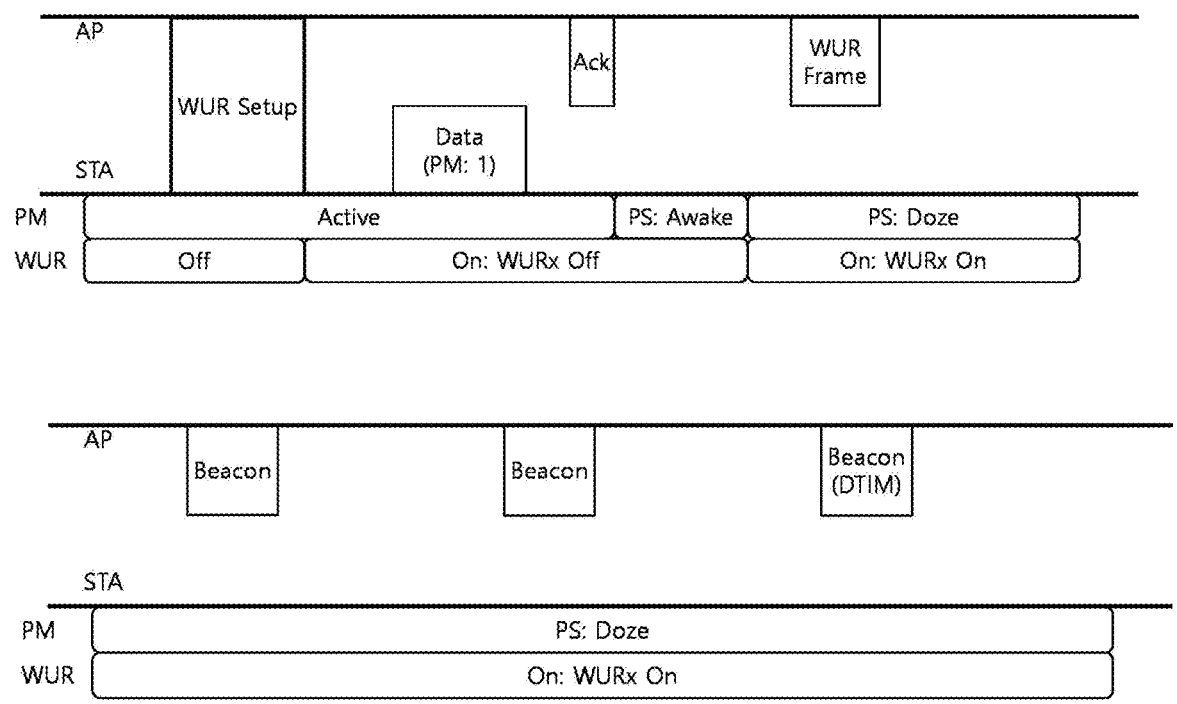
FIG. 24 is a diagram illustrating, in detail, a wake-up operation of a wireless communication terminal according to an embodiment of the present invention.

FIG. 24 is a diagram illustrating, in detail, a wake-up operation of a wireless communication terminal according to an embodiment of the present invention. The wireless communication terminal which is in the PCR doze state is unable to detect a frame transmitted through PCR. Therefore, when the wireless communication terminal which is in the PCR doze state is woken up in the PCR doze state, the wireless communication terminal may access a channel without considering a hidden node. Therefore, after the wireless communication terminal is woken up in the PCR doze state, the wireless communication terminal may attempt to transmit after a PPDU or a frame capable of configuring NAV is detected. In a specific embodiment, after the wireless communication terminal is woken up in the PCR doze state, the wireless communication terminal may suspend a transmission attempt until a frame capable of configuring NAV is detected or a pre-specified time passes. Here, the pre-specified time may be referred to as NAVSyncDelay. For example, after the wireless communication terminal is woken up in the PCR doze state, the wireless communication terminal may attempt to transmit if a frame capable of configuring NAV is not detected until a pre-specified time point after performing clear channel assessment (CCA) until a pre-specified time point. The transmission attempt may indicate access to a channel according to a channel access procedure. According to an embodiment, the wireless communication terminal receives, from the base wireless communication terminal, a wake-up frame in the PCR doze state. The wireless communication terminal turns on the PCR transceiver upon reception of the wake-up frame. The wireless communication terminal may attempt to transmit after performing the CCA until the elapse of NAVSyncDelay after a frame capable of configuring NAV is received or after the wireless communication terminal is woken up.

The wireless communication terminal which attempts to transmit after being woken up in the PCR doze state may be required to perform a backoff operation according to an enhanced distributed channel access (EDCA) rule. In the case of an existing wireless LAN operation, the wireless communication terminal receives a primitive, i.e., MA-UNITDATA.request, from an upper layer, and starts a backoff operation according to the EDCA rule. With regard to the wireless communication terminal which attempts to transmit after being woken up in the PCR doze state, a WUR MAC layer which operates separately from a PCR MAC layer may receive the MA-UNITDATA.request from an upper layer. Therefore, the PCR MAC layer may be unable to receive the MA-UNITDATA.request primitive. The WUR MAC layer may store the MA-UNITDATA.request primitive until the PCR transceiver is turned on, and may transfer the MA-UNITDATA.request primitive to the PCR MAC layer. In another specific embodiment, there may be a MAC service access point (SAP) connecting the PCR MAC layer and the WUR MAC layer. Here, when the PCR MAC layer is woken up, the MAC SAP may transfer the MA-UNITDATA.request to the PCR MAC layer.

According to an embodiment, the wireless communication terminal may perform unsolicited uplink (UL) transmission without receiving a wake-up frame from the base. In this case, it may be difficult for the base wireless communication terminal to recognize that the wireless communication terminal is in a PCR operation state during the PCR switch delay of the wireless communication delay and the time required for accessing a channel. The time required for accessing a channel may include the time required for EDCA contention procedure and initial NAV configuration after wake-up. Therefore, when downlink data to be transmitted to the corresponding wireless communication terminal within a corresponding period is buffered in the base wireless communication terminal, the base wireless communication terminal may transmit a wake-up frame to the wireless communication terminal. Here, when the power of WURx of the wireless communication terminal is turned off, the wireless communication terminal may receive the wake-up frame transmitted from the base wireless communication terminal. Furthermore, an additional overhead may occur due to a failure of transmission of the wake-up frame. The wireless communication terminal according to an embodiment of the present invention may maintain the power of WURx of the wireless communication terminal at least before receiving a response of the base wireless communication terminal to uplink transmission.

According to an embodiment, when uplink data transmitted from the wireless communication terminal is a data frame that does not require an instant response, the wireless communication terminal may maintain the power of WURx until transmission of the uplink data is completed. Alternatively, the wireless communication terminal may maintain the power of WURx until transmission of the uplink data is started by accessing a channel. According to another embodiment, when the wireless communication terminal is in the WUR duty-cycle mode, the above-described rule may be excluded. Furthermore, when the above-described WURx power maintaining condition overlaps with a WUR duty-cycle on duration, the wireless communication terminal may maintain the power of WURx until the later time point among the time point at which the on duration is ended and the time point at which power maintaining according to the WURx power maintaining condition is ended.

Figure 25:
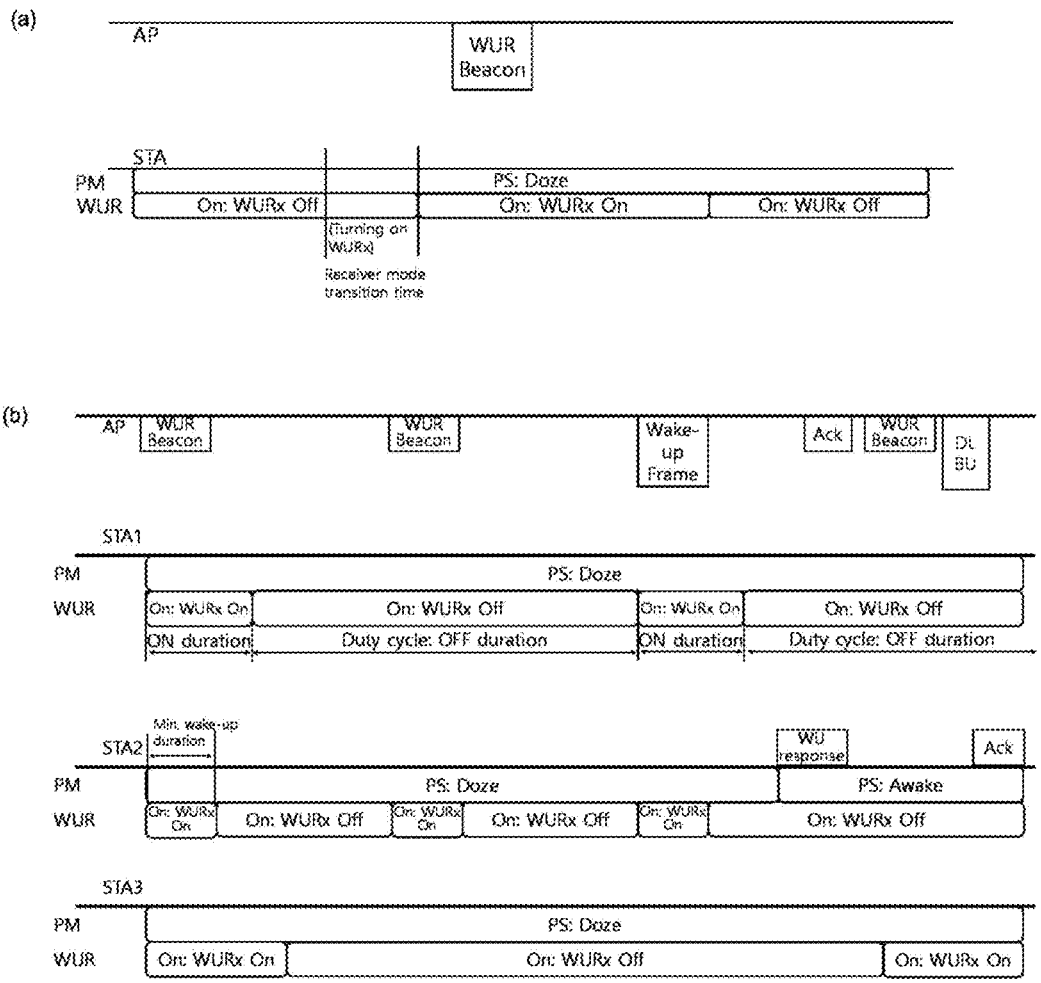
FIG. 25 is a diagram illustrating a WUR duty-cycle operation of a wireless communication terminal according to an embodiment of the present invention.

Hereinafter, the WUR duty-cycle operation of the wireless communication terminal will be described in detail with reference to FIG. 25. FIG. 25 is a diagram illustrating a WUR duty-cycle operation of a wireless communication terminal according to an embodiment of the present invention. As described above, the wireless communication terminal may specify a duty cycle of WURx to maintain a turn-on state of WURx during the on-duration agreed with the base wireless communication terminal. Furthermore, during an off-duration, the wireless communication terminal may maintain both the PCR transceiver and WURx in a turn-off state. The wireless communication terminal may maintain the duty cycle in a WUR-based power save mode.

In the embodiment of FIG. 25A, the station performs a WUR duty-cycle operation. When the AP transmits a WUR beacon frame, the station maintains the on-duration to receive the WUR beacon frame. Since a certain time is required for the station to turn on WURx, the station may transfer a turn-on command to WURx before the on-duration is started in consideration of the time required for turning on WURx.

Furthermore, the base wireless communication terminal and the wireless communication terminal may exchange information about a duty-cycle parameter. This is because the base wireless communication terminal may transmit a WUR frame to the wireless communication terminal during the on-duration of the wireless communication terminal. In detail, the wireless communication terminal and the base wireless communication terminal may exchange the information about a duty-cycle parameter using the WUR mode element. The information about a duty-cycle parameter may include at least one of the above-described duty-cycle basic unit information, minimum wake time information, duty-cycle on duration information, duty-cycle interval information, and duty-cycle start time information. The duty-cycle on duration may be longer than or equal to the minimum wake time.

The period of the duty cycle may vary for each wireless communication terminal. The period of the duty cycle may be set to a multiple of a basic unit. Here, the basic unit may be determined by the base wireless communication terminal. In another specific embodiment, the basic unit may be a pre-specified value. Furthermore, the basic unit may be configured based on the transmission period of the WUR beacon frame. Since the wireless communication terminal receives the WUR beacon frame according to the duty-cycle period, the wireless communication terminal may not receive all of the WUR beacon frames transmitted from the base wireless communication terminal. Furthermore, since the duty-cycle period may vary for each wireless communication terminal, a set of wireless communication terminals which maintain the on-duration to receive the WUR beacon frame may vary each time the WUR beacon frame is transmitted.

When the wireless communication terminal receives a WUR frame transmitted to another wireless communication terminal or the wireless communication terminal during the on-duration during which the WUR beacon frame is expected to be received, the wireless communication terminal may regard reception of the WUR frame as reception of the WUR beacon frame.

In the embodiment of FIG. 25B, a first station STA1, a second station STA2, and a third station STA3 operate in the WUR duty-cycle mode. The duty-cycle periods of the first station STA1, the second station STA2, and the third station STA3 are different. When the AP transmits a first WUR beacon frame, the first station STA1, the second station STA2, and the third station STA3 receive the WUR beacon frame. When the AP transmits a second beacon frame, the second station STA2 receives the WUR beacon frame. When the AP transmits a third beacon frame, the third station STA3 receives the WUR beacon frame. Furthermore, when the AP transmits a wake-up frame to the second station STA2, the first station STA1 maintains the on-duration. The first station STA2 regards the wake-up fame transmitted to the second station STA2 as the WUR beacon frame.

The above-mentioned description of the present invention is for illustrative purposes only, and it will be understood that those of ordinary skill in the art to which the present invention belongs may make changes to the present invention without altering the technical ideas or essential characteristics of the present invention and the invention may be easily modified in other specific forms. Therefore, the embodiments described above are illustrative and are not restricted in all aspects. For example, each component described as a single entity may be distributed and implemented, and likewise, components described as being distributed may also be implemented in an associated fashion.

The scope of the present invention is defined by the appended claims rather than the above detailed description, and all changes or modifications derived from the meaning and range of the appended claims and equivalents thereof are to be interpreted as being included within the scope of present invention.

The invention claimed is:

1. A wireless communication terminal for performing communication wirelessly, the wireless communication terminal comprising:
a first wireless transceiver, which transmits/receives a signal through a first waveform;
a second wireless receiver, which receives a signal through a second waveform different from the first waveform, wherein the second waveform is a waveform based on on-off keying (OOK); and
a processor,
wherein the processor is configured to:
receive, via the second wireless receiver, a first wake-up radio (WUR) frame for waking up from a base wireless communication terminal,
determine that the wireless communication terminal is an intended recipient of the first WUR frame when an identifier field of the first WUR frame indicates a transmitter ID for identifying the base wireless communication terminal, the wireless communication terminal is associated to the base wireless communication terminal, and a basic service set (BSS) to which the wireless communication terminal belongs does not correspond to a multiple BSS identifier (BSSID) set,
determine that the wireless communication terminal is not the intended recipient of the first WUR frame when the identifier field of the first WUR frame indicates the transmitter ID for identifying the base wireless communication terminal and the BSS to which the wireless communication terminal belongs corresponds to any one of one or more nontransmitted BSSIDs included in the multiple BSSID set, and
wake up the first wireless transceiver based on the first WUR frame when the wireless communication terminal is the intended recipient of the first WUR frame,
wherein the multiple BSSID set includes each BSSID of a plurality of BSSs operated by one base wireless communication terminal,
wherein the multiple BSSID set is configured with one transmitted BSSID and one or more nontransmitted BSSIDs, the transmitted BSSID is a representative BSSID used to transmit a management frame to all of the plurality of BSSs operated by the base wireless communication terminal, and
wherein a transmission of the management frame is performed through the first waveform, and the one or more nontransmitted BSSIDs are BSSIDs except for transmitted BSSID among BSSIDs included in the multiple BSSID set.

2. The wireless communication terminal of claim 1, wherein the processor is configured to obtain a nontransmitted ID for identifying the BSS to which the wireless communication terminal belongs, based on the transmitter ID.

3. The wireless communication terminal of claim 2, wherein the processor is configured to:
receive, via the first wireless transceiver, BSSID index information corresponding to the BSS to which the wireless communication terminal belongs, and
obtain the nontransmitted ID based on the transmitter ID and the BSSID index information corresponding to the BSS to which the wireless communication terminal belongs.

4. The wireless communication terminal of claim 3, wherein the BSSID index information corresponding to the BSS to which the wireless communication terminal belongs indicates any one of integers from 1 to K, and
wherein, when the identifier field of the first WUR frame indicates a value obtained by adding the value indicated by the BSSID index information to the transmitter ID, the processor is configured to determine that the wireless communication terminal is the intended recipient of the first WUR frame.

5. The wireless communication terminal of claim 4, wherein the K indicates a number of the nontransmitted BSSIDs among the BSSIDs included in the multiple BSSID set.

6. The wireless communication terminal of claim 5, wherein the processor is configured to obtain the transmitted BSSID via the first wireless transceiver, and obtain the transmitter ID based on the transmitted BSSID.

7. The wireless communication terminal of claim 6, wherein the transmitter ID has a value set based on a preset number of least significant bits (LSBs) among a plurality of bits included in the transmitted BSSID.

8. The wireless communication terminal of claim 1, wherein the processor is configured to:
receive, via the second wireless receiver, a second WUR frame transmitted periodically,
determine whether the wireless communication terminal is an intended recipient of the second WUR frame based on an identifier field of the second WUR frame and the transmitter ID when a frame type field of the second WUR frame indicates a beacon, and
perform a follow-up operation indicated by the second WUR frame based on the second WUR frame when the wireless communication terminal is the intended recipient of the second WUR frame.

9. The wireless communication terminal of claim 8, wherein the processor is configured to:
determine that the wireless communication terminal is the intended recipient of the second WUR frame when the identifier field of the second WUR frame includes the transmitter ID, and
update time information about the wireless communication terminal when the wireless communication terminal is the intended recipient of the second WUR frame.

10. The wireless communication terminal of claim 1, wherein, when the identifier field of the first WUR frame indicates a nontransmitted ID, the first WUR frame is one broadcast, through the second waveform, from the BSS to which the wireless communication terminal belongs.

11. The wireless communication terminal of claim 1, wherein the identifier field of the first WUR frame includes one identifier expressed as a preset number of bits, and
the first WUR frame is a fixed-length frame which does not include an additional field including another identifier in addition to the identifier field.

12. The wireless communication terminal of claim 11, wherein the preset number is 12.

13. The wireless communication terminal of claim 1, wherein the processor is configured to:
stop receiving the first WUR frame when the wireless communication terminal is not the intended recipient of the first WUR frame,
generate a frame check sequence (FCS) value based on values of a plurality of fields included in the first WUR frame when the wireless communication terminal is the intended recipient of the first WUR frame,
determine whether the first WUR frame is valid based on the generated FCS value and a value included in an FCS field of the first WUR frame, and
wake up the first wireless transceiver based on the first WUR frame when the first WUR frame is valid.

14. An operation method of a wireless communication terminal which transmits/receives a signal through a first waveform and receives a signal through a second waveform different from the first waveform, the operation method comprising the steps of:
receiving, via the second waveform, a wake-up radio (WUR) frame for waking up from a base wireless communication terminal;
determining that the wireless communication terminal is an intended recipient of the first WUR frame when an identifier field of a first WUR frame indicates a transmitter ID for identifying the base wireless communication terminal, the wireless communication terminal is associated to the base wireless communication terminal, and a basic service set (BSS) to which the wireless communication terminal belongs does not correspond to a multiple BSS identifier (BSSID) set;
determining that the wireless communication terminal is not the intended recipient of the first WUR frame when the identifier field of the first WUR frame indicates the transmitter ID for identifying the base wireless communication terminal and the BSS to which the wireless communication terminal belongs corresponds to any one of one or more nontransmitted BSSIDs included in the multiple BSSID set; and
waking up the wireless communication terminal based on the WUR frame when the wireless communication terminal is the intended recipient of the WUR frame,
wherein the multiple BSSID set includes each BSSID of a plurality of BSSs operated by one base wireless communication terminal,
wherein the multiple BSSID set is configured with one transmitted BSSID and one or more nontransmitted BSSIDs, the transmitted BSSID is a representative BSSID used to transmit a management frame to all of the plurality of BSSs operated by the base wireless communication terminal, and
wherein a transmission of the management frame is performed through the first waveform, and the one or more nontransmitted BSSIDs are BSSIDs except for transmitted BSSID among BSSIDs included in the multiple BSSID set,
wherein the second waveform is a waveform based on on-off keying (OOK).

15. The operation method of claim 14, comprising obtaining a nontransmitted ID for identifying the BSS to which the wireless communication terminal belongs, based on the transmitter ID.

16. The operation method of claim 15, wherein the obtaining the nontransmitted ID comprises the steps of:
receiving, through the first waveform, BSSID index information corresponding to the BSS to which the wireless communication terminal belongs; and obtaining the nontransmitted ID based on the transmitter ID and the BSSID index information corresponding to the BSS.

\* \* \* \* \*